US008219347B2

(12) United States Patent
Suzuki et al.

(10) Patent No.: US 8,219,347 B2
(45) Date of Patent: Jul. 10, 2012

(54) ORIENTATION CALCULATION APPARATUS AND STORAGE MEDIUM HAVING ORIENTATION CALCULATION PROGRAM STORED THEREIN

(75) Inventors: Ichiro Suzuki, Kyoto (JP); Keizo Ohta, Kyoto (JP); Kenta Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 480 days.

(21) Appl. No.: 12/493,434

(22) Filed: Jun. 29, 2009

(65) Prior Publication Data

US 2009/0326848 A1    Dec. 31, 2009

(30) Foreign Application Priority Data

Jun. 30, 2008 (JP) ................................. 2008-171518
Jun. 30, 2008 (JP) ................................. 2008-171519
Apr. 8, 2009 (JP) ................................. 2009-093985
May 12, 2009 (JP) ................................. 2009-115156

(51) Int. Cl.
*G01C 17/38* (2006.01)
*G01C 9/00* (2006.01)
*G01C 17/00* (2006.01)
*G01C 19/00* (2006.01)
*G01P 15/00* (2006.01)

(52) U.S. Cl. ........................... 702/94; 702/141; 702/150
(58) Field of Classification Search .................. 702/94, 702/141, 150

See application file for complete search history.

(56) References Cited

U.S. PATENT DOCUMENTS

| 7,405,725 | B2 | 7/2008 | Mohri et al. | 345/156 |
| 2002/0188416 | A1* | 12/2002 | Zhou et al. | 702/151 |
| 2003/0115930 | A1* | 6/2003 | Kappi et al. | 73/1.37 |
| 2005/0270494 | A1 | 12/2005 | Banning | |
| 2006/0287085 | A1* | 12/2006 | Mao et al. | 463/37 |
| 2007/0002015 | A1* | 1/2007 | Mohri et al. | 345/157 |
| 2007/0176899 | A1 | 8/2007 | Yoo et al. | |
| 2007/0257885 | A1 | 11/2007 | Liberty | |
| 2007/0259717 | A1 | 11/2007 | Mattice et al. | |
| 2008/0105050 | A1 | 5/2008 | Kraetz | |
| 2008/0125223 | A1 | 5/2008 | Ohta | |
| 2008/0174550 | A1 | 7/2008 | Laurila et al. | |
| 2008/0278445 | A1 | 11/2008 | Sweetser et al. | |

FOREIGN PATENT DOCUMENTS

| EP | 1 762 287 | 3/2007 |
| EP | 1 839 714 | 10/2007 |
| EP | 1 927 383 | 6/2008 |
| EP | 1 933 226 | 6/2008 |
| JP | 11-085387 | 3/1999 |
| JP | 2000-97637 | 4/2000 |
| JP | 2000-308756 | 11/2000 |
| JP | 2004-264892 | 9/2004 |

* cited by examiner

*Primary Examiner* — Mohamed Charioui
*Assistant Examiner* — Janet Suglo
(74) *Attorney, Agent, or Firm* — Nixon & Vanderhye P.C.

(57) ABSTRACT

A game apparatus calculates a gravitational vector Vg, which represents a gravitational direction viewed from an input device, based on operation data. Then, a motion acceleration vector VA, which represents an acceleration applied by a motion of the input device, is calculated based on an acceleration represented by acceleration data and the gravitational vector Vg. The gravitational vector Vg is corrected such that the motion acceleration vector VA approaches a motion acceleration (vector VA') satisfying a relationship with an angular rate (vector Vω) represented by angular rate data, the relationship being predefined between the motion acceleration and the angular rate for the input device making a predetermined motion (rotational motion). Furthermore, the game apparatus calculates an orientation of the input device corresponding to the corrected gravitational vector.

42 Claims, 19 Drawing Sheets

ORIENTATION CALCULATION APPARATUS AND STORAGE MEDIUM HAVING ORIENTATION CALCULATION PROGRAM STORED THEREIN

CROSS REFERENCE TO RELATED APPLICATION

The disclosures of Japanese Patent Application Nos. 2008-171518 and 2008-171519, both filed Jun. 30, 2008, 2009-093985, filed Apr. 8, 2009, and 2009-115156, filed May 12, 2009, are incorporated herein by reference.

BACKGROUND

1. Field

Example embodiments of the present invention relate to orientation calculation apparatuses and programs, and more particularly to an orientation calculation apparatus and program for calculating an orientation (gravitational direction) of an input device.

2. Description of the Background Art

Until now, there have been devised techniques for calculating an orientation of an input device using an acceleration sensor and a gyroscope. For example, Patent Document 1 (Japanese Laid-Open Patent Publication No. 2000-308756) discloses a game apparatus using an input control device including an acceleration sensor and a gyroscope. This game apparatus controls a sword held by a game character in accordance with movement of the input control device. Specifically, data representing an action of wielding the sword is generated based on an output from the acceleration sensor, and data representing an orientation of the sword is generated based on an output from the gyroscope.

When the orientation is calculated using the gyroscope as described in Patent Document 1, some error may occur between the calculated orientation and an actual orientation of the input control device. For example, when the movement of the input control device is slow, the gyroscope may fail to detect an angular rate of the input control device, whereas when the movement of the input control device is vigorous, the angular rate of the input control device may be outside a range in which the gyroscope is allowed to detect the angular rate. Further, also when the angular rate abruptly changes in a period shorter than an interval between outputs of angular rate data, some error may occur. In addition, as for the gyroscope, an error called "drift" may occur in its output due to some factors including temperature. The error of the angular rate is cumulatively added to the orientation calculated based on the angular rate over the passage of time, and therefore the error of the orientation may be increased. In Patent Document 1, the error of the orientation calculated by the gyroscope is not considered, and therefore the orientation may not be accurately calculated.

SUMMARY

Therefore, one aspect of an example embodiment of the present invention is to provide an orientation calculation apparatus capable of accurately calculating an orientation of an input device using a gyroscope, or a storage medium having stored therein an orientation calculation program for accurately calculating an orientation of an input device using a gyroscope.

An example embodiment of the present invention has the following features to attain the object mentioned above. Here, the reference numerals, the supplementary description and the like in the parentheses indicate a correspondence with the embodiment described below in order to aid in understanding the present invention and are not intended to limit, in any way, the scope of the present invention.

An example embodiment of the present invention is directed to an orientation calculation apparatus (game apparatus 3) for calculating an orientation of an input device (8) based on operation data (62) acquired from the input device, the input device including at least an angular rate sensor (gyroscope 55, 56) and an acceleration sensor (37), the operation data including angular rate data (63) and acceleration data (64). The orientation calculation apparatus includes gravitational direction calculation means (CPU 10 performing step S11; hereinafter, only step numbers will be indicated), motion acceleration calculation means (S24), first correction means (S34), and first orientation calculation means (S15). The gravitational direction calculation means calculates based on the operation data a gravitational vector (Vg) representing a gravitational direction viewed from the input device. The motion acceleration calculation means calculates a motion acceleration vector (VA) based on an acceleration (detected acceleration vector Va) represented by the acceleration data and the gravitational vector (Vg), the motion acceleration vector representing an acceleration applied by a motion of the input device (FIG. 10). The first correction means corrects the gravitational vector such that the motion acceleration vector approaches a motion acceleration (vector VA' shown in FIG. 11) satisfying a relationship (equation (7) or (15)) with the angular rate represented by the angular rate data (FIGS. 11 and 12), the relationship being predefined between the motion acceleration and the angular rate for the input device making a predetermined motion (rotational motion). The first orientation calculation means calculates an orientation of the input device corresponding to the gravitational vector corrected by the first correction means.

According to the above description, the orientation calculation apparatus allows a gravitational vector, based on which a motion acceleration vector is calculated, to be corrected such that the motion acceleration vector satisfies a relationship between the angular rate and the motion acceleration for the input device making a predetermined motion. Thus, even when the input device is in motion, a gravitational vector can be accurately corrected based on acceleration data and angular rate data. Furthermore, an orientation of the input device is calculated based on an accurate gravitational vector, making it possible to accurately calculate the orientation.

Also, the orientation calculation apparatus may further include second orientation calculation means (S4) for calculating an orientation (first orientation) of the input device from the angular rate data. In this case, the gravitational direction calculation means calculates the gravitational vector based on the orientation calculated by the second orientation calculation means. The first orientation calculation means corrects the orientation calculated by the second orientation calculation means, based on the gravitational vector corrected by the first correction means, thereby calculating the orientation of the input device.

According to the above description, an orientation of the input device calculated from angular rate data, which is a detection result by the gyroscope, can be corrected based on an accurate gravitational vector. Thus, the orientation of the input device can be accurately calculated using the gyroscope.

The predetermined motion may be a rotational motion about a predetermined position. In this case, the first correction means includes perpendicular vector calculation means (S3, S42) and vector correction means (S34). The perpendicular vector calculation means calculates based on the angular rate data a perpendicular vector (Vω or W) perpendicular to a direction of the motion acceleration of the input device making the rotational motion. The vector correction means corrects the gravitational vector based on the relationship between the motion acceleration and the angular rate of the input device, the relationship exhibiting the motion acceleration vector perpendicular to the perpendicular vector (equation (7) or (15)).

According to the above description, an orientation of the input device making a rotational motion can be readily calculated based on the relationship in which the motion acceleration vector is perpendicular to the perpendicular vector when the input device is in rotational motion.

The perpendicular vector calculation means may calculate an angular acceleration based on a transition of the angular rate data acquired from the input device, and may also calculate the perpendicular vector based on the angular rate represented by the angular rate data and the angular acceleration.

According to the above description, a perpendicular vector can be readily calculated from angular rate data.

The predetermined motion may be a rotational motion about the predetermined position at a constant angular rate. In this case, the perpendicular vector calculated by the perpendicular vector calculation means is an angular rate vector representing a central axis of the rotational motion.

According to the above description, the predetermined motion is a rotational motion at a constant angular rate, so that an angular rate vector can be used as a perpendicular vector. Thus, the perpendicular vector can be readily calculated, making it possible to readily perform a gravitational vector correction process.

The vector correction means may correct the gravitational vector such that an inner product of the perpendicular vector and the motion acceleration vector is small.

According to the above description, a gravitational vector can be corrected while assessing the magnitude of an inner product of a perpendicular vector and a motion acceleration vector, making it possible to readily make a correction.

The first correction means may correct the gravitational vector such that the lower the amount of correction of the gravitational vector is, the lower the angular rate is represented by the angular rate data (S32).

According to the above description, when the angular rate of the input device is low, the amount of correction of a gravitational vector is low, and when the angular rate is high, the amount of correction of a gravitational vector is high. Here, when the angular rate is low, it is highly likely that the input device is not in rotational motion, and therefore the correction by the first correction means might be inaccurate. Specifically, according to the above description, when it is highly likely that the correction by the first correction means is inaccurate, the amount of correction is set to be low, and therefore the first correction means can be prevented from making an inaccurate correction. Thus, the gravitational vector can be accurately corrected, making it possible to accurately calculate an orientation of the input device.

The first correction means may correct the gravitational vector such that an the lower the of correction of the gravitational vector is, the higher the amount of change (jerk J) per unit time for the acceleration is represented by the acceleration data (S33).

According to the above description, when the jerk of the input device is high, the amount of correction of a gravitational vector is low, and when the jerk is low, the amount of correction of a gravitational vector is high. Here, when the jerk is high, it is highly likely that the input device is not in rotational motion, and therefore the correction by the first correction means might be inaccurate. Specifically, according to the above description, when it is highly likely that the correction by the first correction means is inaccurate, the amount of correction is set to be low, and therefore the first correction means can be prevented from making an inaccurate correction. Thus, the gravitational vector can be accurately corrected, making it possible to accurately calculate an orientation of the input device.

The first correction means may correct the gravitational vector so as to rotate in such a direction that, when the gravitational vector is rotated by a predetermined angle, a motion acceleration vector calculated from a post-rotation gravitational vector approaches closest to the motion acceleration satisfying the predefined relationship with the angular rate represented by the angular rate data.

According to the above description, it is simply necessary to determine a direction in which the gravitational vector is to be corrected, and therefore the gravitational vector can be readily corrected. In addition, if a correction is made such that a post-correction gravitational vector coincides with a gravitational vector allowing a motion acceleration vector to satisfy the aforementioned relationship, the amount of correction for a single round of correction is increased, which might result in a sudden change of the gravitational vector. If the gravitational vector is suddenly changed, an orientation of the input device to be calculated is suddenly changed as well, which might reduce operability of the input device especially when an input operation is performed in accordance with an orientation of the input device. On the other hand, according to the above description, the amount of correction for a single round of correction can be limited to a given quantity or less, and therefore it is possible to prevent sudden change of a gravitational vector as well as reduction in operability of the input device.

Also, the orientation calculation apparatus may further include second correction means (S12) for correcting the gravitational vector so as to approach a direction of the acceleration (detected acceleration vector Va) represented by the acceleration data. In this case, the first orientation calculation means calculates the orientation of the input device based on the gravitational vector corrected by the first correction means and the second correction means.

According to the above description, a gravitational vector is corrected so as to approach a direction of an acceleration represented by acceleration data. Here, when the input device is at rest, the acceleration is oriented to the direction of gravity, making it possible to allow the gravitational vector to accurately coincide with the direction of gravity. Thus, according to the above description, a gravitational vector can be accurately corrected not only when the input device is in motion but also when it is at rest, making it possible to accurately calculate an orientation of the input device.

The second correction means may correct the gravitational vector such that the lower the amount of correction of the gravitational vector is, the higher the angular rate is represented by the angular rate data (S23).

According to the above description, the greater the angular rate of the input device, the lower the amount of correction of a gravitational vector to be corrected by the second correction means. Here, when the angular rate increases, it becomes more likely that the input device is in motion, and therefore an acceleration detected by the acceleration sensor is estimated to less accurately represent the direction of gravity. Therefore, according to the above description, when it is highly likely that the correction by the second correction means is inaccurate, the amount of correction is set to be low, making it possible to prevent the second correction means from making an inaccurate correction. Thus, a gravitational vector can be accurately corrected, making it possible to accurately calculate an orientation of the input device.

Also, where both the first correction means and the second correction means change the amount of correction of a gravitational vector in accordance with the magnitude of the angular rate, there are advantages as described below. Specifically, in such a case, the first correction means makes a correction mainly during a period in which the angular rate is high, whereas the second correction means makes a correction mainly during a period in which the angular rate is low. Therefore, the gravitational vector is corrected regardless whether the angular rate is high or low, which increases opportunities to make a correction. Thus, a gravitational vector can be accurately calculated, making it possible to accurately calculate an orientation of the input device.

The second correction means may correct the gravitational vector such that the lower the amount of correction of the gravitational vector is, the higher the amount of change (jerk J) per unit time for the acceleration is represented by the acceleration data (S26).

According to the above description, the higher the jerk of the input device, the lower the amount of correction of the gravitational vector. Here, when the jerk increases, it becomes more likely that the input device is in motion, and therefore an acceleration detected by the acceleration sensor is estimated to less accurately represent the direction of gravity. Therefore, according to the above description, when it is highly likely that the correction by the second correction means is inaccurate, the amount of correction is set to be low, making it possible to prevent the second correction means from making an inaccurate correction. Thus, a gravitational vector can be accurately corrected, making it possible to accurately calculate an orientation of the input device.

An example embodiment of the present invention is also directed to an orientation calculation apparatus (game apparatus 3) for sequentially calculating a gravitational vector (Vg) representing a gravitational direction viewed from an input device (8) based on angular rate data (63) and acceleration data (64) sequentially acquired from the input device, the input device including at least an angular rate sensor (gyroscope 55, 56) and an acceleration sensor (37). The orientation calculation apparatus includes gravitational vector calculation means (CPU 10 performing step S11; hereinafter, only step numbers will be indicated), first correction means (S12), second correction means (S13), and third correction means (S14). The gravitational vector calculation means calculates the gravitational vector based on an angular rate represented by the angular rate data. The first correction means corrects the gravitational vector so as to approach at a first rate (first correction rate A) an acceleration vector represented by the acceleration data. The second correction means corrects the gravitational vector so as to approach at a second rate (second correction rate B) a gravitational direction estimated based on a relationship (equation (7) or (15)) between the acceleration data and the angular rate data, the relationship being predefined for the input device making a predetermined motion. The third correction means corrects the gravitational vector so as to approach at a third rate (third correction rate C3) an average of acceleration vectors during a predetermined period.

According to an example embodiment of the present invention, the orientation calculation apparatus allows a gravitational vector, which is calculated based on angular rate data, to be corrected by three different methods. Thus, a gravitational vector can be accurately calculated, making it possible to more accurately calculate an orientation of the input device.

Also, the first correction means may set the first rate such that the higher the first rate is, the closer the magnitude of the acceleration represented by the acceleration data is to the magnitude of the gravitational acceleration (S22).

According to the above configuration, the first rate is set in accordance with the difference in magnitude between an acceleration and a gravitational acceleration. By referencing the difference, it is possible to estimate the rate at which the input device is moved and also to determine the reliability of an acceleration represented by acceleration data (the rate representing whether or not the acceleration is reliable as a value representing the direction of gravity). Thus, by calculating a first rate in accordance with the aforementioned difference, it becomes possible to set an appropriate first rate and thereby to accurately calculate an orientation of the input device.

Also, the orientation calculation apparatus may further include motion acceleration calculation means (S24) for calculating a motion acceleration vector based on the acceleration data and the gravitational vector, the motion acceleration vector representing an acceleration applied by a motion of the input device. In this case, the second correction means corrects the gravitational vector so as to approach at the second rate a gravitational vector allowing the predefined relationship to be satisfied between the angular rate represented by the angular rate data and the motion acceleration vector.

According to the above configuration, the orientation calculation apparatus allows a gravitational vector, based on which a motion acceleration vector is calculated, to be corrected such that the motion acceleration vector satisfies a relationship between the angular rate and the motion acceleration for the input device making a predetermined motion. Thus, even when the input device is in motion, the gravitational vector can be accurately corrected based on acceleration data and angular rate data. Thus, an orientation of the input device can be accurately calculated.

Also, the third correction means may set the third rate to a value (0.001) lower than maximum values (0.03) of the first and second rates.

According to the above configuration, the correction rate for the third correction means is set to be low compared to those for the first and second correction means. The correction by the third correction means can be made regardless of the kinetic state of the input device, but due to, for example, some detection error by the acceleration sensor during a period in which an average calculation is carried out, a motion acceleration during that period might not be appropriately cancelled out, resulting in an inaccurate correction. On the other hand, according to the above configuration, the third rate is set to be lower than the first and second rates, so that the correction by the third correction means is used as a supplementary to the corrections by the first and second correction means. As a result, when the correction by the third correction means is inaccurate, the orientation calculation apparatus prevents the correction from being deeply reflected in an orientation of the input device, making it possible to accurately calculate an orientation of the input device.

Also, the first correction means may change the first rate in accordance with at least one of the acceleration data and the angular rate data (S22, S23, S25), and the second correction means may change the second rate in accordance with at least one of the acceleration data and the angular rate data (S32, S33). In this case, the third correction means sets the third rate as a fixed value (S57).

According to the above configuration, correction rates for the first and second correction means are changed in accordance with acceleration data and/or angular rate data, i.e., the kinetic state of the input device (e.g., whether at rest or in motion). Here, as for the corrections by the first and second correction means, correction accuracy varies in accordance with the kinetic state of the input device (e.g., whether at rest or in motion). Thus, the orientation calculation apparatus makes it possible to make an appropriate correction while changing the correction rate in accordance with the kinetic state of the input device. However, depending on the kinetic state of the input device, both the first and second rates might be set to be low, so that the first and second correction means might fail to make a sufficient correction. On the other hand, as for the correction by the third correction means, correction accuracy does not change in accordance with the kinetic state of the input device. Therefore, by setting a third rate as a fixed value, the orientation calculation apparatus allows the third correction means to constantly make a correction. That is, even if neither the first correction means nor the second correction means makes a correction, the orientation calculation apparatus allows a gravitational vector to be reliably corrected by the third correction means.

Also, the orientation calculation apparatus may further include acceleration data storage means (main memory) and block average calculation means (S52). The acceleration data storage means sequentially stores acquired acceleration data. The block average calculation means calculates a block average vector being an average of acceleration vectors represented by a block of acceleration data, the block consisting of plural pieces of acceleration data. In this case, the third correction means corrects the gravitational vector so as to approach at the third rate an overall average vector being an average of block average vectors for a predetermined number of blocks in reverse chronological order (S57).

According to the above configuration, the orientation calculation apparatus allows calculation of a block average vector for a block consisting of a predetermined number of pieces of acceleration data. Also, an average of block average vectors is used as an average of acceleration vectors during a predetermined period. Accordingly, the orientation calculation apparatus is not required to store all acceleration data during a predetermined period, and a predetermined number of pieces of acceleration data and data representing each block average vector may be simply stored. Thus, according to the above configuration, it is possible to reduce the memory capacity required for the correction process by the third correction means.

Also, the orientation calculation apparatus may further include vector correction means (S55) for correcting each of the block average vectors by rotating the block average vector in a direction opposite to the angular rate represented by the angular rate data. In this case, the third correction means calculates the overall average vector based on the block average vectors corrected by the vector correction means.

According to the above configuration, a block average vector is corrected in accordance with an angular rate represented by angular rate data. This correction is a process for fixing a block average vector (acceleration vector), which is expressed with respect to the input device, to the space (i.e., the process rendering the direction invariable in the space). Here, according to the above configuration, the orientation calculation apparatus allows the above correction to be performed on a block average vector, rather than on acceleration vectors for calculating the block average vector. Thus, the number of times to perform the calculation process for the above correction can be reduced, making it possible to perform the correction process at high speed.

Also, an example embodiment of the present invention may be embodied as a storage medium having stored therein an orientation calculation program for causing a computer of an information processing apparatus to function as the respective means described above.

According to an example embodiment of the present invention, a gravitational vector calculated based on angular rate data is corrected by three different methods, making it possible to accurately calculate a gravitational vector. Thus, the orientation calculation apparatus makes it possible to more accurately calculate an orientation of the input device.

These and other features, aspects and advantages of example embodiments of the present invention will become more apparent from the following detailed description of example embodiments of the present invention when taken in conjunction with the accompanying drawings.

DESCRIPTION OF THE EXAMPLE EMBODIMENTS

[Entire Structure of Game System]

Figure 1:
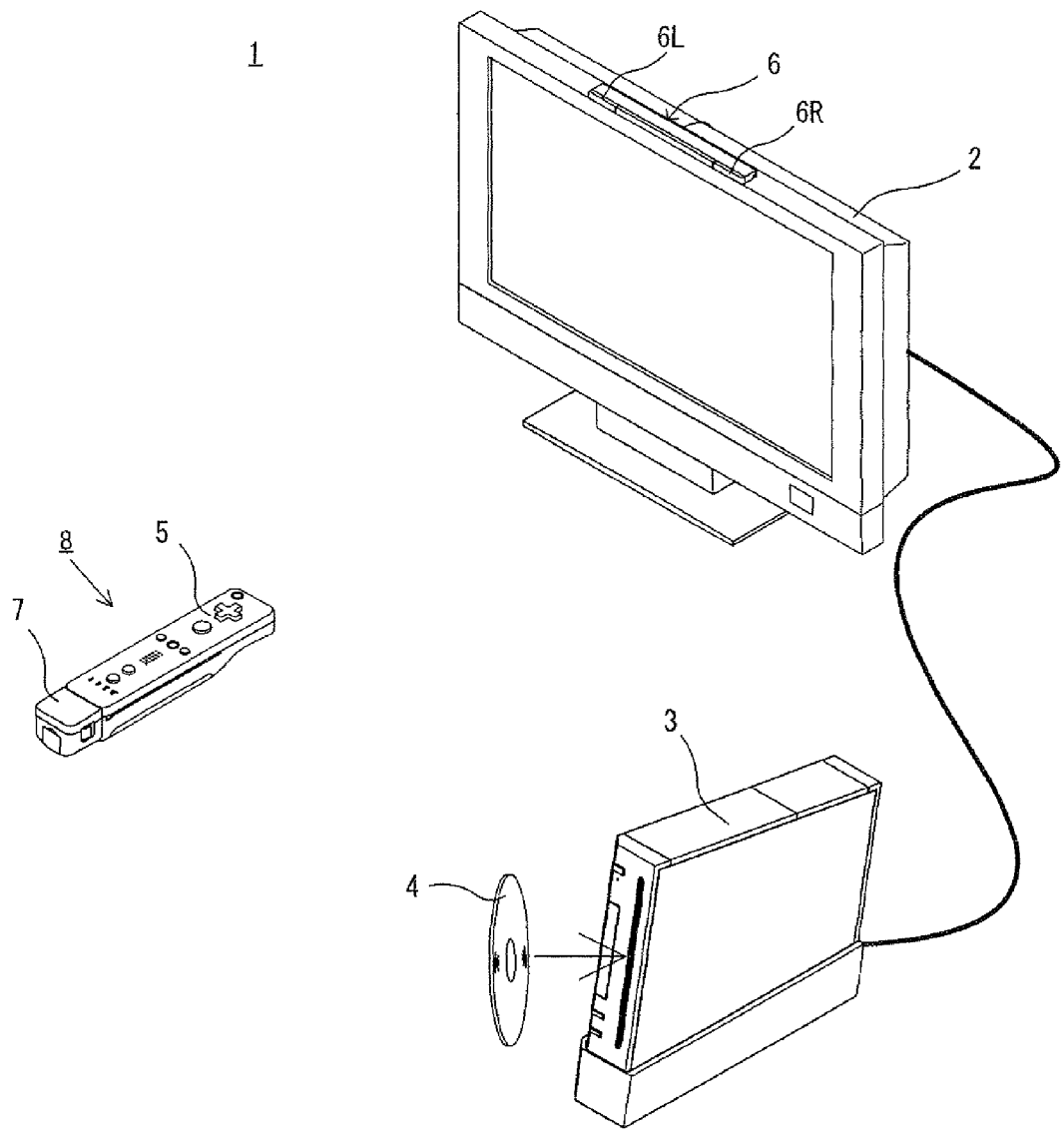
FIG. 1 is an external view of a game system.

With reference to FIG. 1, a game system 1 including a game apparatus typifying an orientation calculation apparatus according to an embodiment of the present invention will be described. FIG. 1 is an external view of the game system 1. In the following description, a stationary game apparatus is taken as an example for describing a game apparatus and a game program of the present embodiment. As shown in FIG. 1, the game system 1 includes a television receiver (hereinafter, simply referred to as a "television") 2, a game apparatus 3, an optical disc 4, an input device 8, and a marker section 6. In this system, the game apparatus 3 performs a game process based on a game operation using the input device 8.

In the game apparatus 3, the optical disc 4 typifying an information storage medium used for the game apparatus 3 in a replaceable manner is detachably inserted. A game program executed by the game apparatus 3 is stored in the optical disc 4. The game apparatus 3 has, on the front surface thereof, an insertion opening for the optical disc 4. The game apparatus 3 reads and executes the game program stored in the optical disc 4 which is inserted through the insertion opening, so as to perform the game process.

The game apparatus 3 is connected to the television 2, which is an exemplary display device, through a connecting cord. A game image obtained as a result of the game process performed by the game apparatus 3 is displayed on the television 2. Further, the marker section 6 is provided on the periphery (in FIG. 1, on a portion above a screen) of a screen of the television 2. The marker section 6 includes two markers 6R and 6L on both ends thereof. Specifically, the marker 6R (as well as the marker 6L) includes one or more infrared LEDs, and emits an infrared light forward from the television 2. The marker section 6 is connected to the game apparatus 3, and the game apparatus 3 is able to control each infrared LED of the marker section 6 so as to light up each infrared LED.

The input device 8 provides the game apparatus 3 with operation data representing the content of an operation performed on the input device 8 itself. In the present embodiment, the input device 8 includes a controller 5 and a gyroscope unit 7. As described in detail below, the input device 8 is structured such that the gyroscope unit 7 is detachably connected to the controller 5. Radio communication is made between the controller 5 and the game apparatus 3. In the present embodiment, the radio communication between the controller 5 and the game apparatus 3 is made using, for example, the Bluetooth (Registered Trademark) technology. In another embodiment, the connection between the controller 5 and the game apparatus 3 may be a wired connection.

[Internal Structure of Game Apparatus 3]

Figure 2:
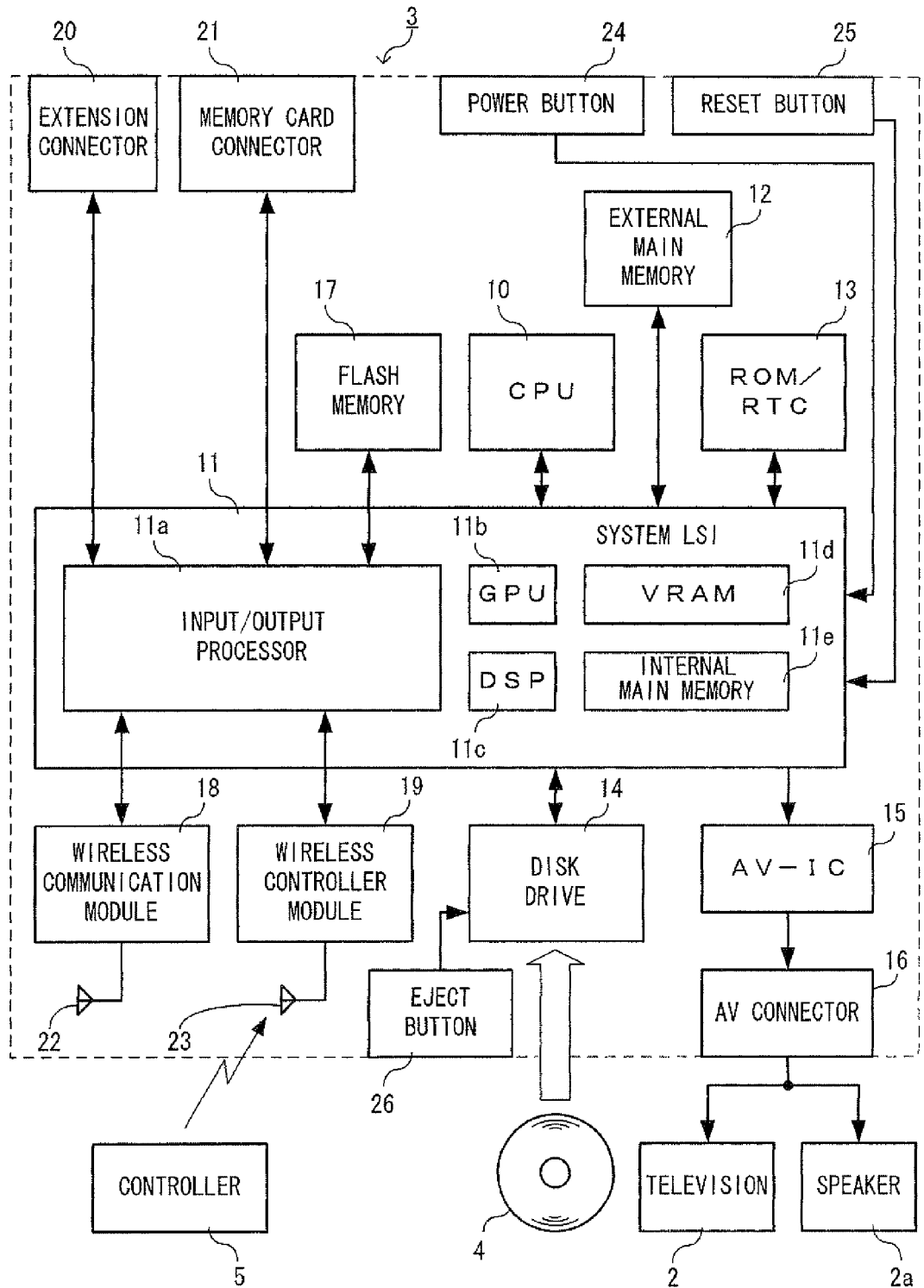
FIG. 2 is a functional block diagram of a game apparatus.

Next, an internal structure of the game apparatus 3 will be described with reference to FIG. 2. FIG. 2 is a block diagram illustrating a structure of the game apparatus 3. The game apparatus 3 includes a CPU 10, a system LSI 11, an external main memory 12, a ROM/RTC 13, a disk drive 14, an AV-IC 15, and the like.

The CPU 10, functioning as a game processor, performs game processes by executing the game program stored in the optical disc 4. The CPU 10 is connected to the system LSI 11. To the system LSI 11, the external main memory 12, the ROM/RTC 13, the disk drive 14, and the AV-IC 15 as well as the CPU 10 are connected. The system LSI 11 performs processes for controlling data transmission between the respective components connected thereto, generating an image to be displayed, acquiring data from an external device, and the like. The internal structure of the system LSI will be described below. The external main memory 12 of a volatile type stores a program such as a game program read from the optical disc 4 and a game program read from a flash memory 17, and various data, and the external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disk drive 14 reads program data, texture data, and the like from the optical disk 4, and writes the read data into an internal main memory 11e to be described below or the external main memory 12.

Further, the system LSI 11 includes an input/output processor (I/O processor) 11a, a GPU (Graphics Processor Unit) 11b, a DSP (Digital Signal Processor) 11c, a VRAM 11d, and the internal main memory 11e. These components 11a, 11b, 11c, 11d, and 11e are connected with each other through an internal bus, which is not shown.

The GPU 11b, acting as a part of rendering means, generates an image in accordance with a graphics command (rendering command) from the CPU 10. The VRAM 11d stores data (data such as polygon data and texture data) necessary for the GPU 11b to execute the graphics command. When an image is generated, the GPU 11b generates image data using data stored in the VRAM 11d.

The DSP 11c, functioning as an audio processor, generates audio data using sound data and sound waveform (tone quality) data stored in the internal main memory 11e or the external main memory 12.

The image data and the audio data generated as described above are read by the AV-IC 15. The AV-IC 15 outputs the read image data to the television 2 through an AV connector 16, and outputs the read audio data to a speaker 2a incorporated in the television 2. Thus, an image is displayed on the television 2, and a sound is outputted from the speaker 2a.

The input/output processor 11a performs data transmission to and data reception from the components connected thereto, and download of data from an external device. The input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, so as to communicate with another game apparatus and various servers connected to the network. The input/output processor 11a regularly accesses the flash memory 17, and detects the presence or absence of any data which needs to be transmitted to the network, and when detected, transmits the data to the network through the wireless communication module 18 and the antenna 22. Further, the input/output processor 11a receives data transmitted from another game apparatus, and/or downloads data from a download server, through the network, the antenna 22, and the wireless communication module 18, and the received data and/or the downloaded data are stored to the flash memory 17. The CPU 10 executes a game program so as to read data stored in the flash memory 17 and use the data on the game program. The flash memory 17 may store saved data (game result data or intermediate-stage data) of a game played using the game apparatus 3 in addition to data transmitted from the game apparatus 3 to another game apparatus or the various servers, and data received by the game apparatus 3 from another game apparatus or the various servers.

The input/output processor 11a receives operation data transmitted from the controller 5 through the antenna 23 and the wireless controller module 19, and (temporarily) stores the received operation data to a buffer area of the internal main memory 11e or the external main memory 12.

Further, the input/output processor 11a is connected to the extension connector 20 and the memory card connector 21. The extension connector 20 is a connector for an interface, such as USB or SCSI, and allows communication with the network by connecting thereto a medium such as an external storage medium, connecting thereto another peripheral device such as a controller, and/or connecting thereto a wired communication connector, without using the wireless communication module 18. The memory card connector 21 is a connector for connecting thereto an external storage medium such as a memory card. For example, the input/output processor 11a accesses an external storage medium through the extension connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied to the respective components of the game apparatus 3 through an AC adaptor not shown. When the reset button 25 is pressed, the system LSI 11 reboots a boot program of the game apparatus 3. The eject button 26 is connected to the disk drive 14. When the eject button 26 is pressed, the optical disc 4 is ejected from the disk drive 14.

[Structure of Input Device 8]

Figure 3:
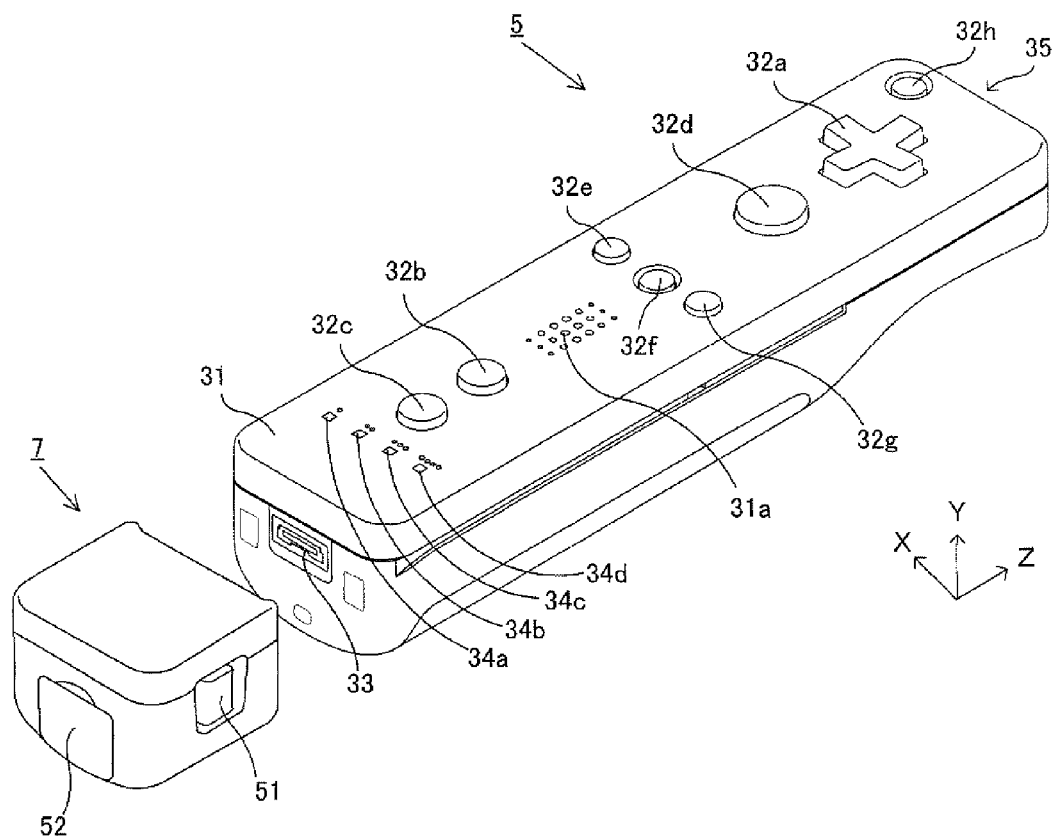
FIG. 3 is a perspective view illustrating an external structure of an input device.
Figure 4:
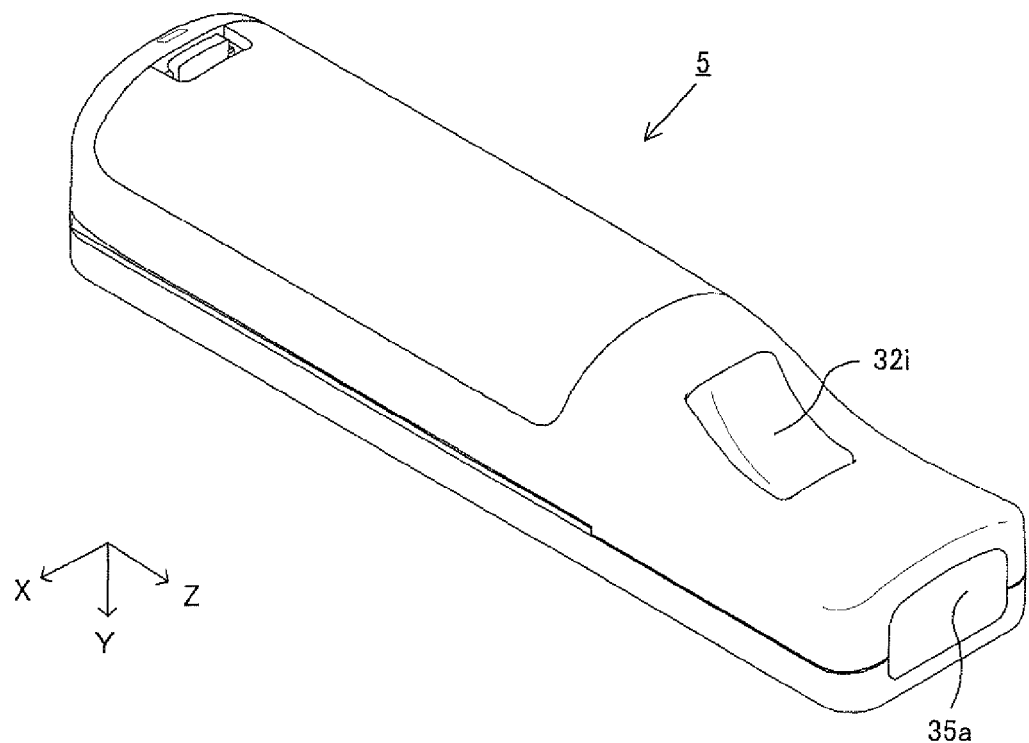
FIG. 4 is a perspective view illustrating an external structure of a controller.

Next, with reference to FIGS. 3 to 6, the input device 8 will be described. FIG. 3 is a perspective view illustrating an external structure of the input device 8. FIG. 4 is a perspective view illustrating an external structure of the controller 5. The perspective view of FIG. 3 shows the controller 5 as viewed from the top rear side thereof, and the perspective view of FIG. 4 shows the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. A player can perform game operations by pressing buttons provided on the controller 5, and moving the controller 5 to change the position and the orientation thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In an example embodiment of the present invention, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the player.

On the rear surface of the housing 31, the connector 33 is provided. The connector 33 is used for connecting the controller 5 to another device (for example, the gyroscope unit 7 or another controller). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 is assigned a controller type (number) so as to be distinguishable from another main controller. The LEDs 34a, 34b, 34c, and 34d are each used for informing the player of the controller type which is currently being set for the controller 5 being used, and for informing the player of remaining battery power of the controller 5, for example. Specifically, when a game operation is performed using the controller 5, one of the plurality of LEDs 34a, 34b, 34c, and 34d corresponding to the controller type is lit up.

The controller 5 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of a material transmitting therethrough at least infrared light outputted from the markers 6R and 6L.

On the top surface of the housing 31, sound holes 31a for externally outputting a sound from a speaker 49 (shown in FIG. 5) incorporated in the controller 5 is provided between the first button 32b and the home button 32f.

Figure 5:
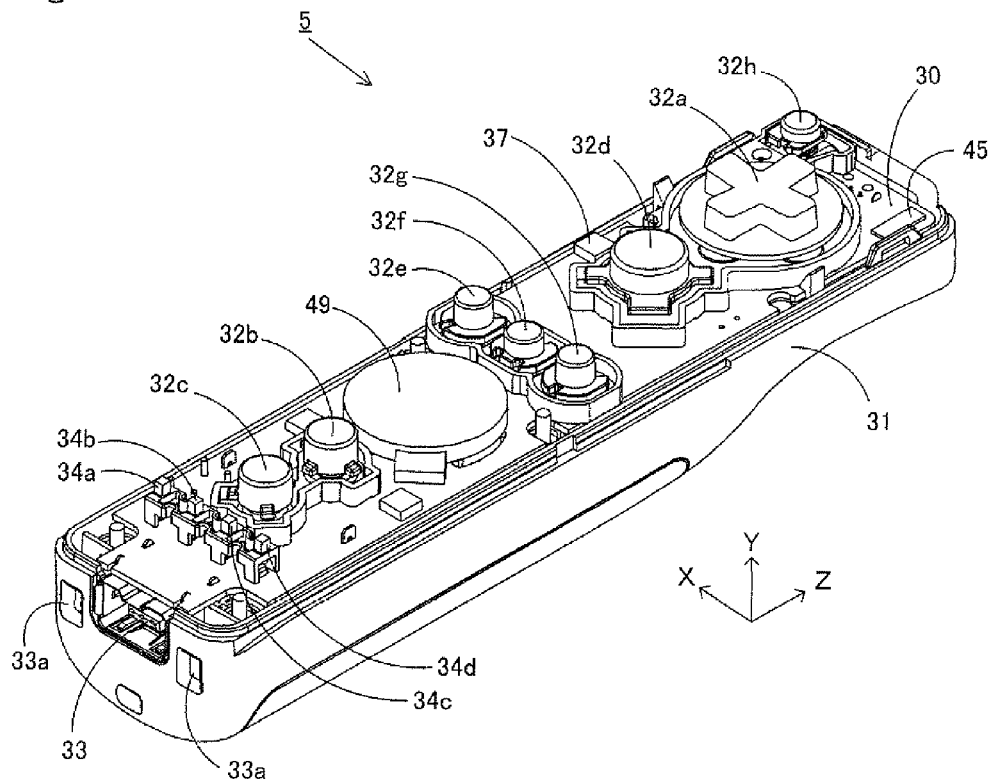
FIG. 5 is a diagram illustrating an internal structure of the controller.
Figure 6:
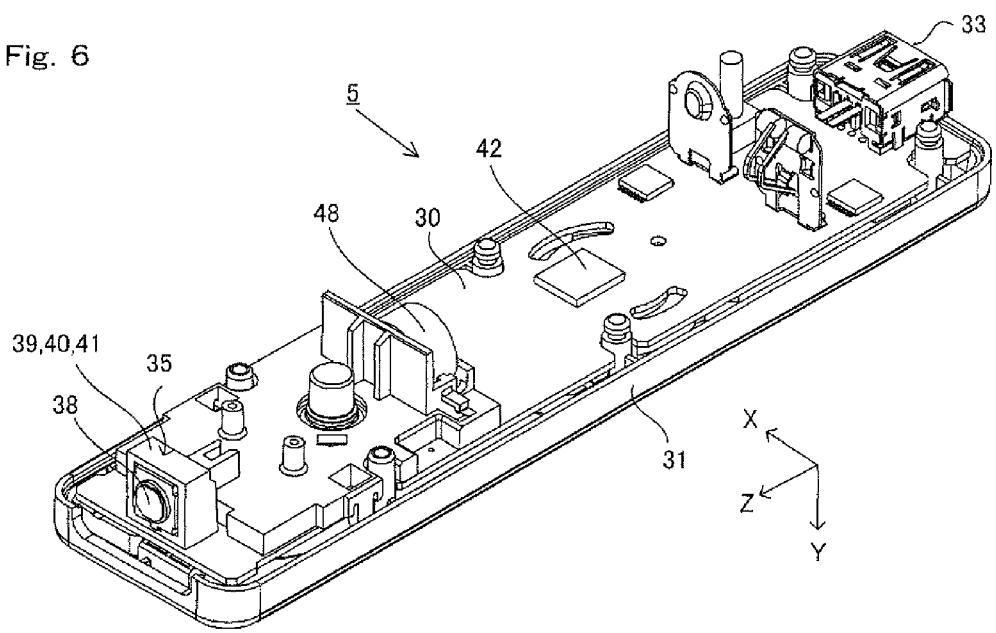
FIG. 6 is another diagram illustrating an internal structure of the controller.

Next, with reference to FIGS. 5 and 6, an internal structure of the controller 5 will be described. FIG. 5 and FIG. 6 are diagrams illustrating the internal structure of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated around the Z-axis may be facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, an image pickup element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by actuation of the vibrator 48 based on a command from the microcomputer 42. Therefore, the vibration is conveyed to the player's hand holding the controller 5, and thus a so-called vibration-feedback game is realized. In the present embodiment, the vibrator 48 is disposed slightly toward the front of the housing 31. That is, the vibrator 48 is positioned offset from the center toward the end of the controller 5, and therefore the vibration of the vibrator 48 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

Further, the gyroscope unit 7 includes gyroscopes (gyroscopes 55 and 56 shown in FIG. 7) for detecting angular rates around three axes, respectively. The gyroscope unit 7 is detachably attached to the connector 33 of the controller 5. The gyroscope unit 7 has, at the front edge (an edge portion oriented to the Z-axis positive direction shown in FIG. 3), a plug (a plug 53 shown in FIG. 7) connectable to the connector 33. Further, the plug 53 has hooks (not shown) on both sides, respectively. In a state where the gyroscope unit 7 is attached to the controller 5, the plug 53 is connected to the connector 33, and the hooks engage with the fastening holes 33a, respectively, of the controller 5. Therefore, the controller 5 and the gyroscope unit 7 are securely fixed to each other. Further, the gyroscope unit 7 has a button 51 on each side surface (surfaces oriented to the X-axis direction shown in FIG. 3). When the button 51 is pressed, the hook is disengaged from the fastening hole 33a. Therefore, when the plug 53 is removed from the connector 33 while the button 51 is being pressed, the gyroscope unit 7 can be disconnected from the controller 5.

Further, a connector having the same shape as the connector 33 is provided at the rear edge of the gyroscope unit 7. Therefore, another device which can be attached to (the connector 33 of) the controller 5 can be attached as well to the connector of the gyroscope unit 7. In FIG. 3, a cover 52 is detachably provided over the connector.

FIGS. 3 to 6 show only examples of the shape of the controller 5 and the gyroscope unit 7, the shape of each operation button, the number and the positions of acceleration sensors and vibrators, and so on. The present invention can be realized with other shapes, numbers, and positions. Further, although in the present embodiment the imaging direction of the image pickup means is the Z-axis positive direction, the imaging direction may be any direction. That is, the imaging information calculation section 35 (the light incident surface 35a through which a light is incident on the imaging information calculation section 35) of the controller 5 may not necessarily be provided on the front surface of the housing 31, but may be provided on any other surface on which a light can be received from the outside of the housing 31.

Figure 7:
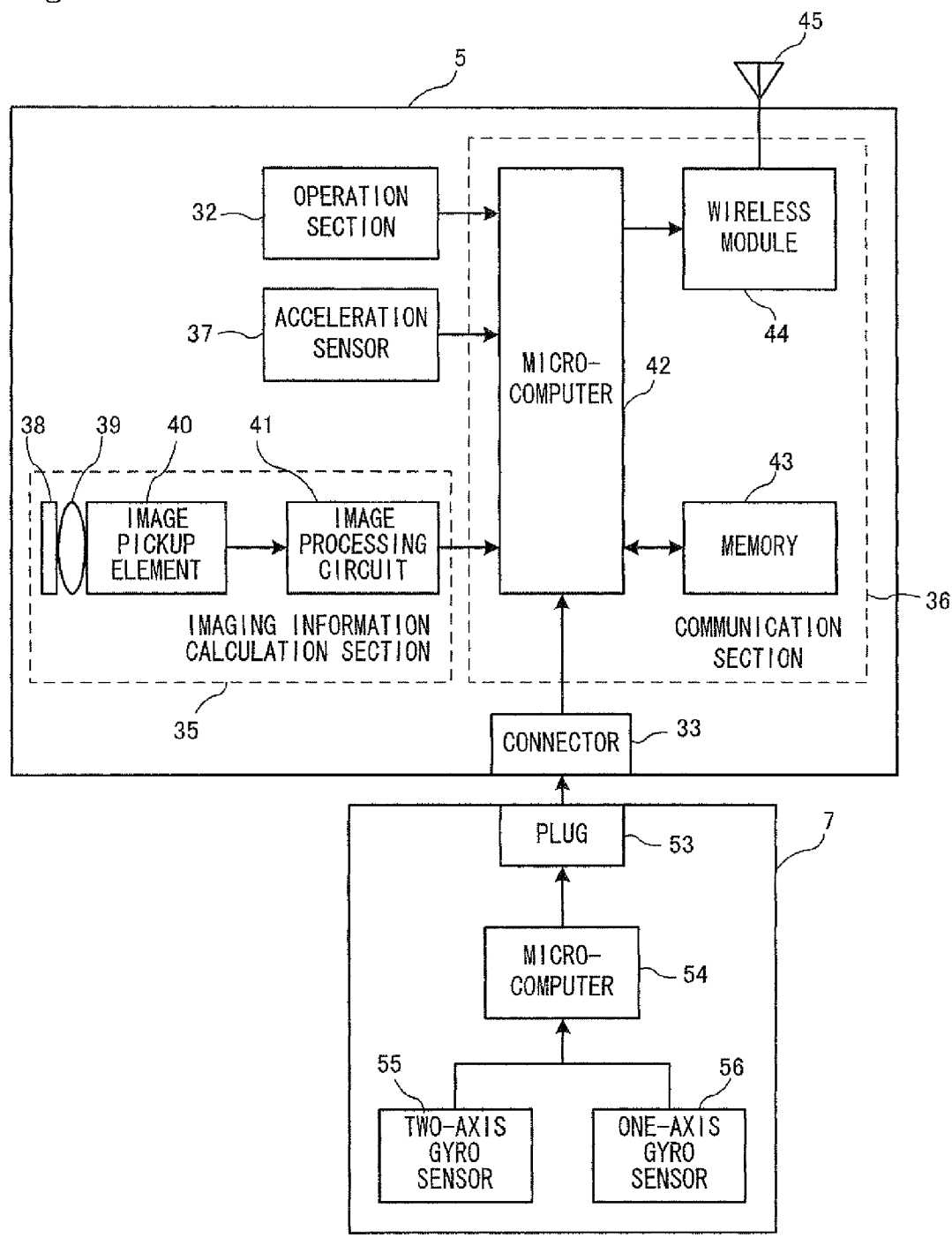
FIG. 7 is a block diagram illustrating a structure of the input device.

FIG. 7 is a block diagram illustrating a structure of the input device 8 (the controller 5 and the gyroscope unit 7). The controller 5 includes an operation section 32 (the operation buttons 32a to 32i), the connector 33, the imaging information calculation section 35, a communication section 36, and the acceleration sensor 37. The controller 5 transmits, as operation data, data representing the content of an operation performed on the controller 5 itself, to the game apparatus 3.

The operation section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The imaging information calculation section 35 is a system for analyzing image data taken by the image pickup means and calculating, for example, the centroid and the size of an area having a high brightness in the image data. The imaging information calculation section 35 has a maximum sampling period of, for example, about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image pickup element 40. The image pickup element 40 is a solid-state imaging device such as, for example, a CMOS sensor or a CCD sensor, which receives the infrared light collected by the lens 39, and outputs an image signal. The markers 6R and 6L of the marker section 6 provided near the display screen of the television 2 each include an infrared LED for outputting an infrared light forward from the television 2. Therefore, the infrared filter 38 enables the image pickup element 40 to receive only the infrared light transmitted through the infrared filter 38 and generate image data, so that an image of each of the markers 6R and 6L can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, the positions of subjects to be imaged (the marker 6R and the marker 6L). The image processing circuit 41 outputs data representing coordinate points of the calculated positions, to the microcomputer 42 of the communication section 36. The data representing the coordinate points is transmitted as operation data to the game apparatus 3 by the microcomputer 42. Hereinafter, the coordinate points are referred to as "marker coordinate points". The marker coordinate point changes depending on the orientation (angle of tilt) and/or the position of the controller 5 itself, and therefore the game apparatus 3 is allowed to calculate the orientation and the position of the controller 5 using the marker coordinate point.

In another embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. For example, the three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects an acceleration in the straight line direction along each axis, and an output from the acceleration sensor 37 represents a value of the linear acceleration for each of the three axes. In other words, the detected acceleration is represented as a three-dimensional vector (ax,ay,az) in an XYZ-coordinate system (controller coordinate system) defined relative to the input device 8 (controller 5). Hereinafter, a vector representing components of the acceleration values detected for the three axes, respectively, by the acceleration sensor 37 is referred to as an acceleration vector. Also, the acceleration vector may be referred to below as the "detected acceleration vector" so as to be clearly distinguishable from the motion acceleration vector to be described later.

Data (acceleration data) representing the acceleration detected by the acceleration sensor 37 is outputted to the communication section 36. The acceleration detected by the acceleration sensor 37 changes depending on the orientation (angle of tilt) and the movement of the controller 5, and therefore the game apparatus 3 is allowed to calculate the orientation and the movement of the controller 5 using the acceleration data. In the present embodiment, the game apparatus 3 determines the orientation of the controller 5 based on the acceleration data.

The data (acceleration data) representing the acceleration (acceleration vector) detected by the acceleration sensor 37 is outputted to the communication section 36. In the present embodiment, the acceleration sensor 37 is used as a sensor for outputting data for determining the angle of tilt of the controller 5.

When a computer such as a processor (for example, the CPU 10) of the game apparatus 3 or a processor (for example, the microcomputer 42) of the controller 5 processes an acceleration signal outputted from the acceleration sensor 37, additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the orientation of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding angle of tilt (or another preferable parameter).

The communication section 36 includes the microcomputer 42, a memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33. Data transmitted from the gyroscope unit 7 is inputted to the microcomputer 42 through the connector 33. Hereinafter, a structure of the gyroscope unit 7 will be described.

The gyroscope unit 7 includes the plug 53, a microcomputer 54, the two-axis gyroscope 55, and the one-axis gyroscope 56. As described above, the gyroscope unit 7 detects angular rates around three axes (X-, Y-, and Z-axes in the present embodiment), respectively, and transmits data (angular rate data) representing the detected angular rates, to the controller 5.

The two-axis gyroscope 55 detects an angular rate (per unit time) around each of the X-axis and the Y-axis. Further, the one-axis gyroscope 56 detects an angular rate (per unit time) around the Z-axis. In an example embodiment of the present invention, the directions of rotation around the X-axis, the Y-axis, and the Z-axis relative to the imaging direction (the Z-axis positive direction) of the controller 5 are referred to as a roll direction, a pitch direction, and a yaw direction, respectively. That is, the two-axis gyroscope 55 detects angular rates in the roll direction (the direction of rotation around the X-axis) and the pitch direction (the direction of rotation around the Y-axis), and the one-axis gyroscope 56 detects an angular rate in the yaw direction (the direction of rotation around the Z-axis).

In the present embodiment, the two-axis gyroscope 55 and the one-axis gyroscope 56 are used to detect the angular rates around the three axes. However, in another embodiment, the number of gyroscopes and a combination thereof to be used may be optionally selected, provided that the angular rates around the three axes can be detected.

Further, in the present embodiment, the three axes around which the gyroscopes 55 and 56 detect the angular rates are set to correspond to three axes (X-, Y-, and Z-axes), respectively, for which the acceleration sensor 37 detects accelerations, such that calculation in the orientation calculation process described below is facilitated. However, in another embodiment, the three axes around which the gyroscopes 56 and 57 detect the angular rates may not necessarily correspond to the three axes for which the acceleration sensor 37 detects accelerations.

Data representing the angular rates detected by the gyroscopes 56 and 57 are outputted to the microcomputer 54. That is, data representing the angular rates around the three axes, i.e., the X-, Y-, and Z-axes, are inputted to the microcomputer 54. The microcomputer 54 transmits the data representing the angular rates around the three axes, as angular rate data, to the controller 5 through the plug 53. The transmission from the microcomputer 54 to the controller 5 is sequentially performed at a predetermined cycle, and the game is typically processed at a cycle of 1/60 seconds (corresponding to one frame time), and the transmission is preferably performed at a cycle shorter than a cycle of 1/60 seconds.

The controller 5 will be described again. Data outputted from the operation section 32, the imaging information calculation section 35, and the acceleration sensor 37 to the microcomputer 42, and data transmitted from the gyroscope unit 7 to the microcomputer 42 are temporarily stored to the memory 43. The data are transmitted as the operation data to the game apparatus 3. At the time of the transmission to the wireless controller module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The wireless controller module 19 of the game apparatus 3 receives the low power radio wave signal. The game apparatus 3 demodulates or decodes the received low power radio wave signal to obtain the operation data. Based on the obtained operation data and the game program, the CPU 10 of the game apparatus 3 performs the game process. The wireless transmission from the communication section 36 to the wireless controller module 19 is sequentially performed at a predetermined time interval. Since the game process is generally performed at a cycle of 1/60 sec. (corresponding to one frame time), data is preferably transmitted at a cycle of a shorter time period. The communication section 36 of the controller 5 outputs, to the wireless controller module 19 of the game apparatus 3, the respective operation data at intervals of 1/200 seconds, for example.

When the controller 5 is used, the player can perform not only a conventionally typical game operation of pressing the respective operation buttons, but also an operation of tilting the controller 5 at a desired angle of tilt. Other than these operations, the player can perform an operation of designating a desired position on a screen using the controller 5, or perform an operation of moving the controller 5 itself.

[Outline of Orientation Calculation Process]

Next, the orientation calculation process performed by the game apparatus 3 for calculating an orientation of the input device 8 will be outlined. The present embodiment assumes a game in which the input device 8 is used to perform a game operation for paddling a canoe. Specifically, in the game apparatus 3 of the present embodiment, the player plays the game of paddling a canoe in a virtual game space by using and moving the input device 8 as if he/she is propelled through water with a paddle. More concretely, the game apparatus 3 calculates an orientation of the input device 8, and changes an orientation of the paddle in the game space in accordance with the orientation of the input device 8.

In the present embodiment, the game apparatus 3 acquires operation data from the input device 8 including the gyroscopes 55 and 56, the acceleration sensor 37, the image pickup means (image pickup element 40), and calculates an orientation of the input device 8. While in the present embodiment, the input device 8 includes the gyroscopes 55 and 56, the acceleration sensor 37, and the image pickup element 40, in another embodiment, the input device 8 may include at least the gyroscopes and the acceleration sensor.

The game apparatus 3 calculates the orientation of the input device 8 based on an angular rate detected by the gyroscopes 55 and 56. Hereinafter, the orientation of the input device 8 calculated based on the angular rate is referred to as the "first orientation". The first orientation may differ from the actual orientation due to some error in the detection result by the gyroscopes 55 and 56. Accordingly, in the present embodiment, the game apparatus 3 corrects the first orientation based on an acceleration detected by the acceleration sensor 37. The first orientation is also corrected by an image (pickup image) taken by the image pickup element 40.

Hereinafter, the correction process based on the acceleration detected by the acceleration sensor 37 will be outlined with reference to FIGS. 8 to 12. The game apparatus 3 is capable of calculating the orientation of the input device 8 not only from the angular rate detected by the gyroscopes 55 and 56 but also from the acceleration detected by the acceleration sensor 37. Specifically, the acceleration sensor 37 detects a gravitational acceleration applied to the input device 8 (accelerations detected by the acceleration sensor 37 include a gravitational acceleration), so that the game apparatus 3 can calculate based on the detected acceleration a gravitational direction with respect to the input device 8, i.e., an inclination (orientation) of the input device 8 from the gravitational direction. Hereinafter, the orientation calculated based on the acceleration detected by the acceleration sensor 37 is referred to as the "second orientation". In the present embodiment, the first orientation based on the angular rate is corrected using the gravitational direction (second orientation) calculated based the acceleration.

Here, in the present embodiment, the game apparatus 3 performs three correction processes to achieve the acceleration-based correction: a static correction process; a dynamic correction process; and a long-term average correction process. The static correction process is a process for correcting the gravitational direction calculated based on the angular rate so as to approach the direction of the acceleration at a first rate. The static correction process is a correction process intended to correct the first orientation of the input device 8 mainly when the input device 8 is at or almost at rest. The dynamic correction process is a process for correcting the gravitational direction so as to approach at a second rate a gravitational direction estimated based on a predefined relationship between the acceleration and the angular rate for a predetermined motion of the input device 8. The dynamic correction process is a correction process intended to correct the first orientation of the input device 8 mainly when the input device 8 is in motion. In the present embodiment, both the static and dynamic correction processes are performed to allow the acceleration-based correction in both cases where the input device 8 is either at rest or in motion. Also, the long-term average correction process is a process for correcting the gravitational direction so as to approach at a third rate the direction of an average acceleration during a predetermined period (a period of about several seconds). The long-term average correction process is a correction process to be performed regardless of the kinetic state of the input device 8 (whether at rest or in motion). The long-term average correction process corrects the first orientation even when the static and dynamic correction processes are not performed. The static correction process, the dynamic correction process, and the long-term average correction process will be outlined below.

Figure 8:
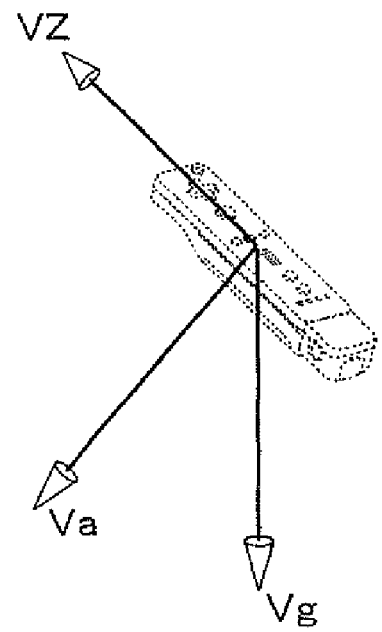
FIG. 8 is a diagram illustrating a gravitational vector and a detected acceleration vector for the input device.

First, the static correction process will be described with reference to FIGS. 8 and 9. FIG. 8 is a diagram illustrating a gravitational vector and a detected acceleration vector for the input device 8. The gravitational vector Vg shown in FIG. 8 represents a gravitational direction with respect to (viewed from) the input device 8. The gravitational direction is a vertically downward direction defined in the space, and therefore if the first orientation is calculated based on the angular rate, a gravitational direction with respect to the input device 8 can be calculated for the first orientation. Also, the detected acceleration vector Va shown in FIG. 8 represents the direction of the acceleration detected by the acceleration sensor 37. Note that the vector Vz shown in FIG. 8 is a vector representing the Z-axis positive direction in the controller coordinate system (XYZ-coordinate system) of the input device 8, i.e., the orientation of the input device 8.

In FIG. 8, when the input device 8 is at or almost at rest, the detected acceleration vector Va assumably represents the gravitational direction. Accordingly, in this case, the game apparatus 3 corrects the gravitational vector Vg calculated based on the angular rate, using the detected acceleration vector Va, which is assumed to more accurately represent the gravitational direction. FIG. 9 is a diagram illustrating the gravitational vector Vg being corrected by the static correction process. In FIG. 9, the vector Vg represents a pre-correction gravitational vector, and the vector Vg' represents a post-correction gravitational vector. As shown in FIG. 9, in the present embodiment, the pre-correction gravitational vector Vg is corrected so as to approach the detected acceleration vector Va. As a result, the gravitational vector is corrected so as to more accurately represent the gravitational direction, making it possible to accurately calculate the orientation of the input device 8 by correcting the first orientation based on the corrected gravitational vector.

As will be described in detail later, in the static correction process, the rate at which the gravitational vector Vg approaches the detected acceleration vector Va increases as the input device 8 becomes closer to the state of rest. That is, in the present embodiment, the more reliably the detected acceleration vector Va represents the gravitational direction, the closer the corrected gravitational vector Vg is to the detected acceleration vector Va. As a result, the orientation of the input device 8 can be more accurately calculated. Furthermore, in the present embodiment, when the input device 8 is far from the state of rest (i.e., the input device 8 is moved vigorously), the correction by the static correction process is not performed, which also makes it possible to more accurately calculate the orientation of the input device 8.

Note that when the input device 8 is at or almost at rest, only the gravitational acceleration is detected by the acceleration sensor 37, and therefore the gravitational direction can be accurately calculated by the static correction process. On the other hand, when the input device 8 is being moved by the player, not only the gravitational acceleration but also an acceleration induced by the motion of the input device 8 are detected by the acceleration sensor 37. For example, the accelerations to be detected by the acceleration sensor 37 include an acceleration by inertial force such as centrifugal force. Therefore, when the input device 8 is in motion, the gravitational direction might not be accurately determined by using an output from the acceleration sensor 37 as is, failing to accurately calculate the gravitational direction by the static correction process. Also, when the input device 8 is in motion, a conceivably employed method is to not perform the static correction process. However, in this method, for example, when it is assumed that the player performs the game operation by constantly moving the input device 8, as in the canoe game as mentioned above, there is no chance for the static correction process to be performed, so that the correction process is not performed for the gravitational direction. As a result, the orientation of the input device 8 cannot be accurately calculated. As described above, the static correction process, when used alone, might not be able to address the case where the input device 8 is in motion. Therefore, in the present embodiment, the dynamic correction process, along with the static correction process, is performed in order to allow the correction process to be performed for the gravitational direction even when the input device 8 is in motion. Hereinafter, the dynamic correction process will be described with reference to FIGS. 10 to 12.

Figure 10:
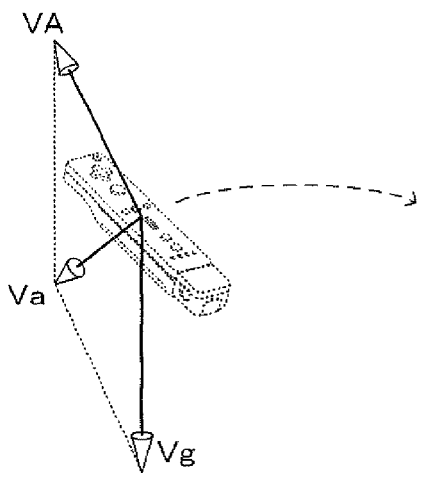
FIG. 10 is a diagram illustrating a gravitational vector, a detected acceleration vector, and a motion acceleration vector for the input device.

FIG. 10 is a diagram illustrating a gravitational vector, a detected acceleration vector, and a motion acceleration vector for the input device 8. The motion acceleration vector VA shown in FIG. 10 is a vector representing a motion acceleration of the input device 8. Here, the "motion acceleration" refers to an acceleration applied to the input device 8 due to its motion, including acceleration components corresponding to centrifugal force caused when the input device 8 is moving rotationally and inertial force caused when the input device 8 is moving at varying speeds. The motion acceleration vector VA is calculated as an acceleration vector obtained by excluding the gravitational acceleration from the acceleration detected by the acceleration sensor 37. That is, the motion acceleration vector VA is a vector corresponding to the detected acceleration vector Va minus the gravitational vector Vg. In this manner, the motion acceleration vector VA is determined based on the gravitational vector Vg. The gravitational vector Vg is calculated from the first orientation based on the angular rate, and therefore as in the case of the gravitational vector Vg, the motion acceleration vector VA might have a margin of error for the actual value due to, for example, erroneous detection by the gyroscopes 55 and 56.

Figure 11:
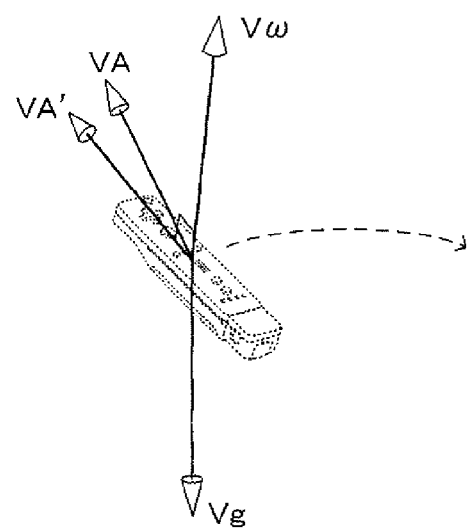
FIG. 11 is a diagram illustrating an angular rate vector and a motion acceleration vector for the input device.

FIG. 11 is a diagram illustrating an angular rate vector and a motion acceleration vector for the input device 8. The angular rate vector Vω shown in FIG. 11 can be obtained from the detection result by the gyroscopes 55 and 56, representing a rotation axis about which the input device 8 rotates at the angular rate detected by the gyroscopes 55 and 56. Here, when the input device 8 makes a specific motion, there is a predetermined relationship between the angular rate detected by the gyroscopes 55 and 56 and the motion acceleration. Here, when the player moves the input device 8 as if he/she is propelled through water with a paddle, as in the present embodiment, the input device 8 conceivably makes a rotational motion about a predetermined position. The motion for moving the input device 8 is often a rotational motion about the player's joint, such as an elbow or a shoulder, and the input device 8 can be considered to make a rotational motion (the input device 8 does not always make a rotational motion but can be considered to make a rotational motion for at least some period). As will be described in detail later, for example, when the input device 8 makes a rotational motion at a constant angular rate, the rotation axis (angular rate vector Vω) corresponding to the angular rate and the motion acceleration of the input device 8 are in such a relationship as to be perpendicular to each other. Accordingly, in FIG. 11, the motion acceleration is estimated to be perpendicular to the angular rate vector Vω, as indicated by vector VA'. For example, if the input device 8 is oriented such that the Y-axis positive direction of the controller coordinate system is a vertically upward direction, and the input device 8 makes a rotational motion toward the X-axis negative direction (see the arrows shown in FIGS. 10 to 12) about a rotation axis parallel to the Y-axis direction, the motion acceleration is estimated to be perpendicular to the Y-axis direction, as indicated by vector VA'.

Figure 12:
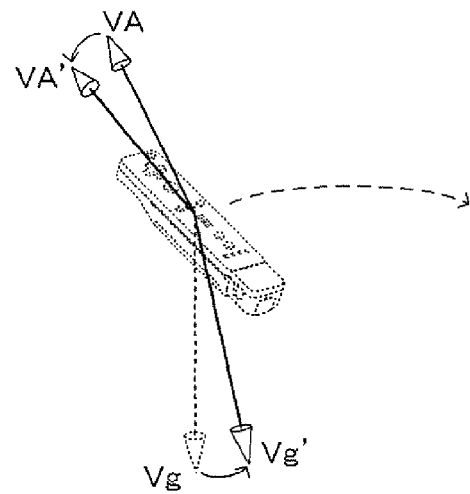
FIG. 12 is a diagram illustrating the gravitational vector being corrected by a dynamic correction process.

In the dynamic correction process, the game apparatus 3 corrects the gravitational vector Vg based on the above estimation. FIG. 12 is a diagram illustrating the gravitational vector being corrected by the dynamic correction process. As shown in FIG. 12, the game apparatus 3 corrects the gravitational vector Vg in such a direction as to cause the motion acceleration vector VA to approach the motion acceleration (vector VA') satisfying the aforementioned relationship with the current angular rate of the input device 8 (i.e., the angular rate vector Vω shown in FIG. 11). In other words, in the dynamic correction process, the gravitational vector Vg is corrected such that the motion acceleration (vector VA) calculated from the detected acceleration vector Va, which is the detection result by the acceleration sensor 37, approaches the motion acceleration (vector VA') determined from the angular rate vector Vω, which is the detection result by the gyroscopes 55 and 56.

As described above, in the dynamic correction process, it is assumed that the input device 8 makes a specific motion (here, a rotational motion at a constant angular rate), and a relationship between the angular rate and the motion acceleration is predefined for that motion (here, the relationship in which "the motion acceleration vector VA is perpendicular to the angular rate vector Vω"). Then, the gravitational vector Vg, based on which the motion acceleration vector VA is calculated, is corrected such that the motion acceleration vector VA satisfies such a relationship. Thus, even if the input device 8 is in motion, the gravitational direction can be corrected based on an acceleration detected by the acceleration sensor 37.

Next, the long-term average correction process will be described. As described above, accelerations detected by the acceleration sensor 37 include the gravitational acceleration and the motion acceleration. Here, when the input device 8 is at rest and then starts moving, the sum of motion accelerations during a period until the input device 8 stops moving and comes to rest again is conceivably "0". Accordingly, by calculating the sum of accelerations detected during a period of a certain length, motion accelerations within that period are cancelled out, so that the final sum only includes gravitational acceleration components. When the sum corresponds to a period of a certain length, if not to a period between resting states, most of the motion accelerations are cancelled out, and therefore any effect by uncancelled portions is negligible. Therefore, an average detected acceleration for the above period represents the gravitational acceleration. Thus, in the present embodiment, the game apparatus 3 calculates a long-term average (here, an average during about eight seconds) of detected acceleration vectors, and the calculated vector is considered to represent the gravitational direction and is used for correction. That is, the game apparatus 3 performs correction in such a manner that the gravitational vector Vg approaches the calculated vector. This correction can always be performed regardless whether the input device 8 is at rest or in motion.

In the present embodiment, the game apparatus 3 corrects the first orientation of the input device 8 based on the gravitational vector Vg corrected by the aforementioned three correction processes, i.e., the static correction process, the dynamic correction process, and the long-term average correction process. Specifically, the first orientation is corrected so as to approach an orientation (second orientation) corresponding to the gravitational vector Vg corrected by the three correction processes. According to the present embodiment, the gravitational vector is corrected by the static correction process when the input device 8 is at rest and by the dynamic correction process when the input device 8 is in motion, and the corrected gravitational vector is used to correct the first orientation. Accordingly, the first orientation of the input device 8 can be corrected regardless of whether the input device 8 is at rest or in motion, so that the orientation of the input device 8 can be accurately calculated. The present embodiment is advantageous particularly when it is assumed that the player performs an operation while constantly moving the input device 8 because the orientation can be corrected even when the input device 8 is in motion. Furthermore, in the present embodiment, the game apparatus 3 performs the long-term average correction process, which is always executable regardless of the kinetic state of the input device 8, and therefore even if the static correction process cannot be performed appropriately, the first orientation can be reliably corrected to some extent. Also, even if the dynamic correction process cannot be performed appropriately, the first orientation can be reliably corrected to some extent. Therefore, even if neither the static correction process nor the dynamic correction process can be performed appropriately, a certain degree of correction can be achieved by the long-term average correction process.

Note that in the present embodiment, after a correction process based on an acceleration detected by the acceleration sensor 37, another correction process is performed based on an image (pickup image) taken by the image pickup element 40. In the correction process based on the pickup image, the game apparatus 3 first calculates an orientation of the input device 8 based on the pickup image. Specifically, the orientation of the input device 8 is calculated from the position of a marker (marker coordinate point) within the pickup image. Hereinafter, an orientation of the input device 8 calculated based on a pickup image is referred to as a "third orientation". Next, the game apparatus 3 corrects the first orientation based on the angular rate so as to approach the third orientation calculated based on the pickup image. Also, in the present embodiment, the game apparatus 3 initially performs the correction process based on the acceleration, and then the correction process based on the pickup image, but in another embodiment, either the correction process based on the acceleration or the correction process based on the pickup image may be performed first.

As described above, in the present embodiment, a first orientation of the input device 8 which is calculated based on angular rates detected by the gyroscopes 55 and 56 is corrected using an acceleration detected by the acceleration sensor 37, and is further corrected using the pickup image taken by the image pickup means. Thus, error in an orientation calculated by the gyroscope can be reduced, and the orientation of the input device 8 can be calculated with enhanced accuracy.

A rotation (rotation in the yaw direction) around the direction of gravity cannot be detected based on a detection result from the acceleration sensor 37, and therefore the first correction means is not able to make any correction associated with the yaw direction. However, the correction based on the detection result from the acceleration sensor 37 is advantageous in that the correction can be made in any orientation of the input device 8 (because the acceleration can be always detected). On the other hand, when the marker section 6 is not positioned in the direction in which the input device 8 is allowed to take an image, the marker coordinate point is not detected, and therefore the second correction means might not be able to make the correction depending on the orientation of the input device 8. However, the correction using the pickup image is advantageous in that the accurate calculation of the orientation (particularly, the orientation associated with the roll direction) can be made. In the present embodiment, two types of corrections having the advantages different from each other enable an orientation of the input device 8 to be calculated with enhanced accuracy.

Note that in another embodiment, the game apparatus 3 may not necessarily perform the correction process based on the pickup image. In such a case, the input device 8 may be configured without including the imaging information calculation section 35.

[Details of the Process Performed by Game Apparatus 3]

Figure 13:
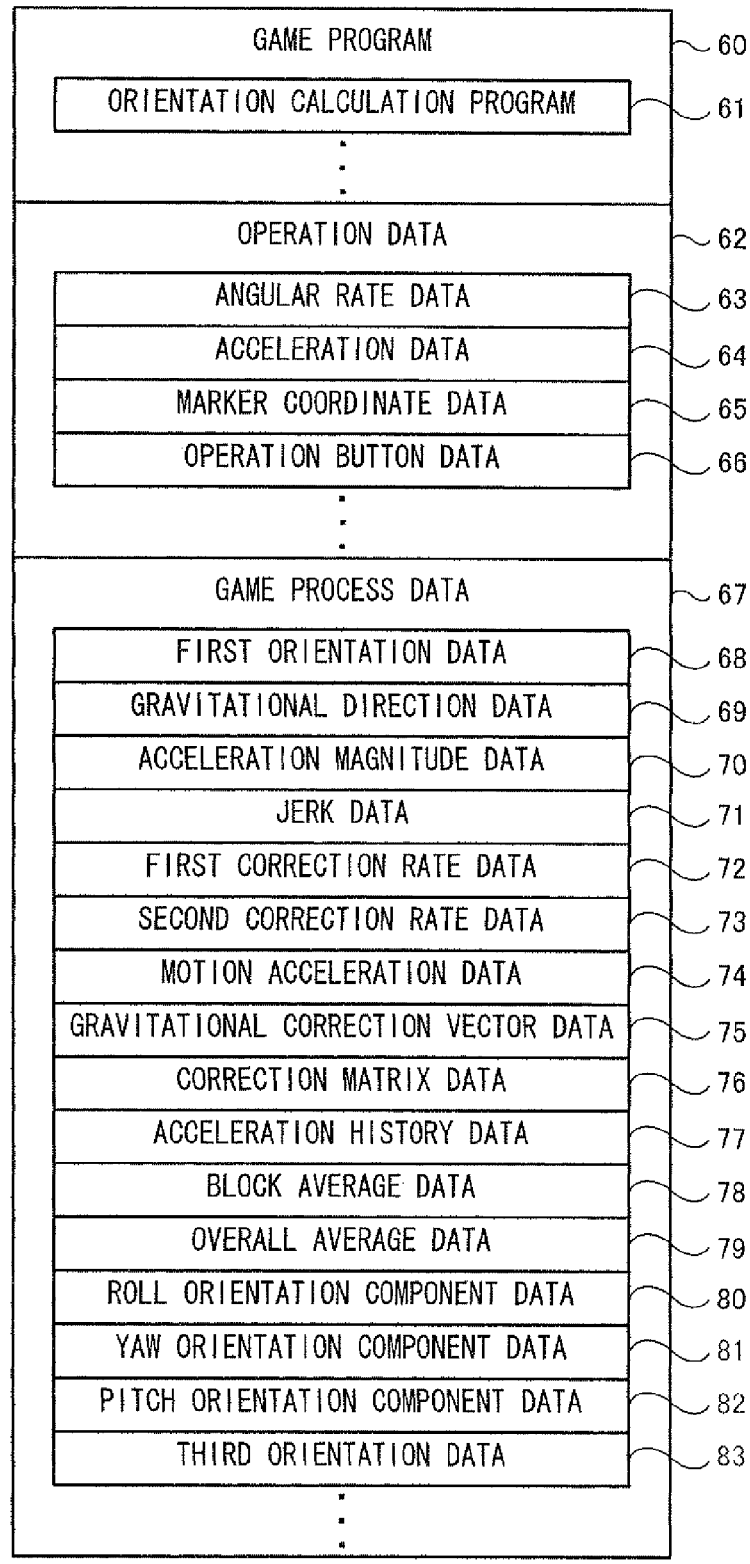
FIG. 13 is a diagram illustrating main data to be stored to a main memory of the game apparatus.

Next, the process performed by the game apparatus 3 will be described in detail. Firstly, main data used in the process performed by the game apparatus 3 will be described with reference to FIG. 13. FIG. 13 is a diagram illustrating main data to be stored in the main memory (the external main memory 12 or the internal main memory 11e) of the game apparatus 3. As shown in FIG. 13, a game program 60, operation data 62, and game process data 67 are stored in the main memory of the game apparatus 3. In addition to the data shown in FIG. 13, data necessary for the game process, such as image data of various objects appearing in a game, data representing various parameters of the objects, and the like, are stored in the main memory.

Part or all of the game program 60 is read from the optical disc 4 and stored to the main memory at an appropriate time after the game apparatus 3 is powered on. The game program 60 includes an orientation calculation program 61. The orientation calculation program 61 is a program for performing the process for calculating an orientation of the input device 8.

The operation data 62 is operation data transmitted from the controller 5 to the game apparatus 3. As described above, the operation data is transmitted from the controller 5 to the game apparatus 3 at intervals of 1/200 seconds, and the operation data 62 stored in the main memory is updated at the same intervals.

The operation data 62 includes angular rate data 63, acceleration data 64, marker coordinate data 65, and operation button data 66. The angular rate data 63 is data representing angular rates detected by the gyroscopes 55 and 56 of the gyroscope unit 7. The angular rate data 63 represents the angular rates around three axes of the XYZ-coordinate system shown in FIG. 3. When the magnitudes of the angular rates around the three axes (clockwise) are represented by three-dimensional vectors, the angular rate data 63 represents an angular rate vector Vω orientated perpendicular to the rotation plane (more specifically, the vector being orientated in a direction corresponding to the travel direction of a right-hand screw being rotated in the direction of the angular rate), the vector having a magnitude corresponding to the magnitude of the angular rate ω. Note that in the present embodiment, in order to calculate the angular acceleration of the input device 8, angular rate data included in operation data acquired immediately before the last acquired operation data is stored to the main memory as angular rate history data.

The acceleration data 64 is data representing an acceleration (detected acceleration vector) detected by the acceleration sensor 37. Here, the acceleration data 64 represents a three-dimensional acceleration vector having as its components accelerations in three axial directions, i.e., the directions of the X-, Y-, and Z-axes, shown in FIG. 3. Also, in the present embodiment, when the controller 5 is at rest, the magnitude of an acceleration vector detected by the acceleration sensor 37 is assumed to be "1". That is, the gravitational acceleration detected by the acceleration sensor 37 is "1".

The marker coordinate data 65 represents a coordinate point calculated by the image processing circuit 41 of the imaging information calculation section 35, that is, the data represents the marker coordinate point. The marker coordinate point is expressed by a two-dimensional coordinate system (x'y'-coordinate system shown in FIG. 17) for representing, in the plane, a position corresponding to the pickup image. When images of two markers 6R and 6L are taken by the image pickup element 40, two marker coordinate points are calculated. On the other hand, when one of the marker 6R or the marker 6L is not positioned within a range in which the image pickup element 40 is allowed to take an image, the image pickup element 40 only takes an image of one marker, and only one marker coordinate point is calculated. Further, when neither the marker 6R nor the marker 6L is positioned within the range in which the image pickup element 40 is allowed to take an image, the image pickup element 40 does not take any image of the markers, so that no marker coordinate point is calculated. Therefore, the marker coordinate data 65 may represent two marker coordinate points, one marker coordinate point, or no marker coordinate point.

The operation button data 66 is data representing an input state of each of the operation buttons 32a to 32i.

Figure 14:
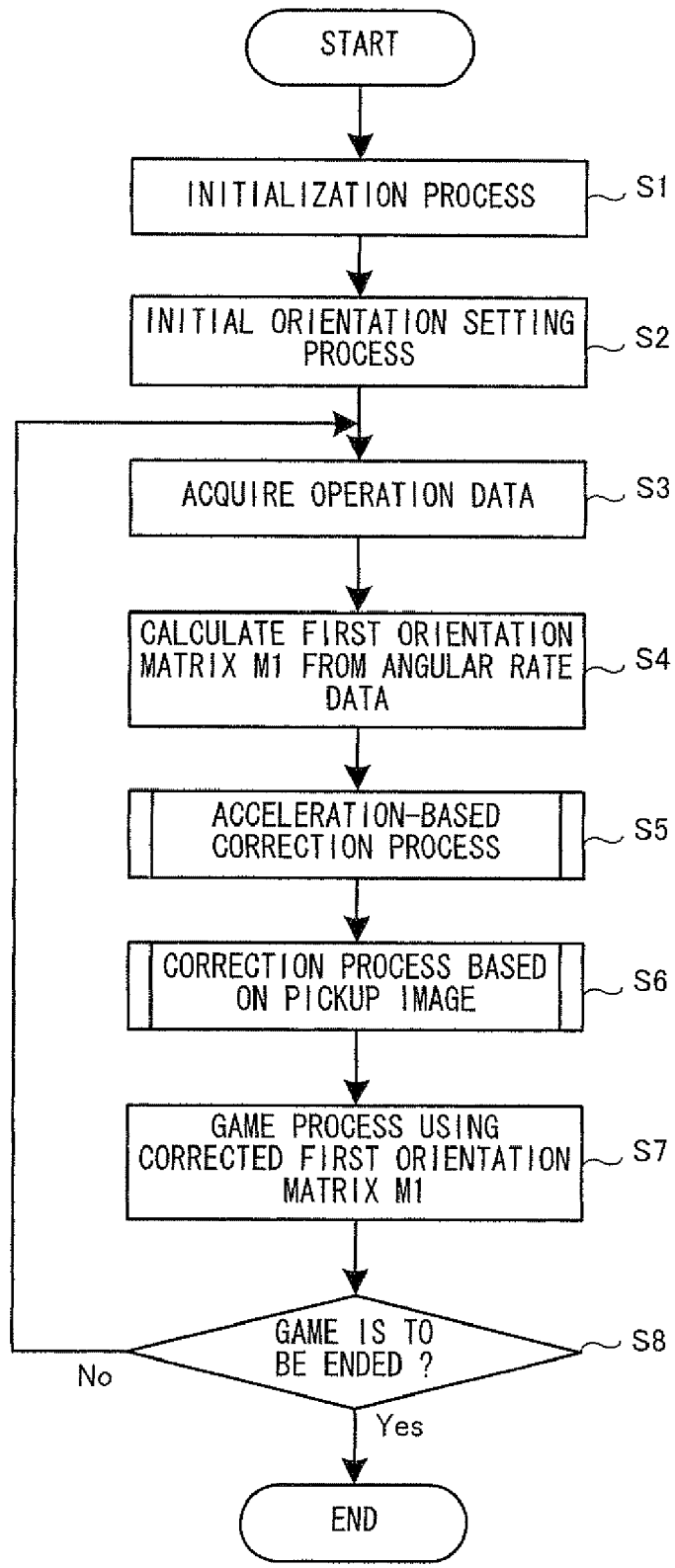
FIG. 14 is a main flow chart showing a flow of a process performed by the game apparatus.

The game process data 67 is data to be used in a game process which will be described later (FIG. 14). The game process data 67 includes first orientation data 68, gravitational direction data 69, acceleration magnitude data 70, jerk data 71, first correction rate data 72, second correction rate data 73, motion acceleration data 74, gravitational correction vector data 75, correction matrix data 76, acceleration history data 77, block average data 78, overall average data 79, roll orientation component data 80, yaw orientation component data 81, pitch orientation component data 82, and third orientation data 83. Note that the game process data 67 includes various data (e.g., data representing a game parameter) to be used in the game process, in addition to the data shown in FIG. 13.

The first orientation data 68 is data representing the first orientation of the input device 8 calculated using the angular rate data 63. In the present embodiment, the orientation of the input device 8 is represented as 3×3 matrix M1 shown in equation (1) as follows.

$$M1 = \begin{bmatrix} Xx & Yx & Zx \\ Xy & Yy & Zy \\ Xz & Yz & Zz \end{bmatrix} \quad (1)$$

The matrix M1 is a rotation matrix representing a rotation from a predetermined reference orientation to the current orientation of the input device 8. Hereinafter, the matrix M1 representing the first orientation is referred to as the "first orientation matrix M1". The orientation represented by the first orientation matrix M1 is an orientation in an xyz-coordinate system (the spatial coordinate system described above) having, as a reference point, a predetermined position in a space including the input device 8. In the xyz-coordinate system, under the assumption that the input device 8 is positioned in front of the marker section 6, the direction from the input device 8 toward the marker section 6 is defined as the z-axis positive direction, the vertically upward direction (the direction opposite to the direction of gravity) is defined as the y-axis positive direction, and the direction to the left of the input device 8 facing the marker section 6 is defined as the x-axis positive direction. Also, the predetermined reference orientation is an orientation in which the imaging direction of the input device 8 positioned in front of the marker section 6 faces the center of the marker section 6, and the button surface of the controller 5 faces vertically upward (that is, the predetermined reference orientation is an orientation in which the X-axis, the Y-axis, and the Z-axis based on the input device 8 correspond to the x-axis, the y-axis, and the z-axis, respectively). Accordingly, the rotation matrix M1 includes an arrangement of unit vectors representing the direction of the input device 8 with respect to the X-, Y-, and Z-axes in the xyz-coordinate system. Although in the present embodiment the orientation of the input device 8 is represented using the matrix, the orientation of the input device 8 may be represented by a third-order vector or three angles in another embodiment. Also, the orientation of the input device 8 may be represented by a coordinate system (xyz-coordinate system) fixed with respect to a space or a coordinate system (XYZ-coordinate system) fixed with respect to the input device 8. The orientation of the input device 8 may be represented by, for example, a gravitational vector representing the direction of gravity applied to the input device 8, the gravitational vector being represented by the coordinate system fixed with respect to the input device 8.

The gravitational direction data 69 is data representing the gravitational direction viewed from the input device 8, i.e., the gravitational vector Vg. The gravitational vector Vg is a unit vector representing a direction in the controller coordinate system (XYZ-coordinate system).

The acceleration magnitude data 70 is data representing a magnitude (length) L of the detected acceleration vector Va represented by the acceleration data 64.

The jerk data 71 is data representing an amount of change (jerk) J per unit time for the acceleration of the input device 8. In the present embodiment, the jerk is calculated as a difference between the last calculated motion acceleration vector and the motion acceleration vector calculated immediately therebefore. The jerk can be calculated as a three-dimensional vector, but in the present embodiment, only the magnitude of the jerk is used, and therefore the jerk data 71 represents a scalar quantity representing the magnitude of the jerk. The jerk data 71 is used for calculating first and second correction rates A and B to be described later.

The first correction rate data 72 is data representing a rate (first correction rate A) at which the gravitational vector Vg is corrected by the static correction process. Also, the second correction rate data 73 represents a rate (second correction rate B) at which the gravitational vector Vg is corrected by the dynamic correction process. As will be described in detail later, the amount of correction increases with the magnitude of each correction rate.

The motion acceleration data 74 is data representing the motion acceleration vector VA. As with the gravitational vector Vg, the motion acceleration vector VA is a vector representing a direction in the controller coordinate system (XYZ-coordinate system). The motion acceleration vector VA is calculated based on the acceleration data 64 and the gravitational direction data 69.

The gravitational correction vector data 75 is data representing a gravitational correction vector $\Delta Vg$ used for correcting the gravitational vector in the dynamic correction process. As will be described in detail later, a gravitational vector corrected by the dynamic correction process is oriented in a direction represented by a pre-correction gravitational vector to which the gravitational correction vector $\Delta Vg$ is added.

The correction matrix data 76 is data representing a correction matrix Ma. The correction matrix Ma is a rotation matrix used for correcting the first orientation of the input device 8 in the acceleration-based correction process. Specifically, in the correction process, the first orientation is corrected by multiplying the first orientation matrix M1 by the correction matrix Ma.

The acceleration history data 77 is data representing a history of the acceleration data 64. In the present embodiment, data indicating up to forty detected acceleration vectors in reverse chronological order is stored in the main memory as the acceleration history data 77 (see FIG. 22). Note that in the long-term average correction process, an average of acceleration vectors detected during a predetermined period (here, about eight seconds) is calculated. As will be described in detail later, in the present embodiment, the CPU 10 collectively manages a block of acceleration vectors detected during a predetermined period. Therefore, the game apparatus 3 is not required to save (store) all the acceleration vectors detected during the predetermined period as the history, and saves up to forty detected acceleration vectors (equivalent to a period of about 0.2 seconds).

The block average data 78 is data representing a vector (block average vector) for a block of detected acceleration vectors. Here, in the present embodiment, in order to reduce the amount of calculation and the memory region required for calculating an average of acceleration vectors detected during a predetermined period, the CPU 10 collectively manages a block of acceleration vectors detected during the predetermined period. Concretely, the CPU 10 collectively manages a block of forty detected acceleration vectors. The block average vector is an average of forty detected acceleration vectors included in a block. In the present embodiment, one acceleration vector is detected per $\frac{1}{200}$ seconds, and therefore the block average vector is an average of acceleration vectors detected in 0.2 seconds. Also, in the present embodiment, in order to calculate an average of acceleration vectors detected in about 8 seconds, an average for forty blocks is stored in the main memory (because 0.2 seconds×40=8 seconds). That is, the block average data 78 represents the block average vector for each of forty blocks (see FIG. 22).

The overall average data 79 is data representing an average (overall average vector) of acceleration vectors detected during the predetermined period. In the present embodiment, the overall average vector is calculated as an average of forty block average vectors indicated by the block average data 78. In the long-term average correction process, a gravitational direction corresponding to the first orientation is corrected based on a gravitational direction determined by the overall average vector.

The roll orientation component data 80 is data representing an orientation component (roll orientation component) M3r associated with the roll direction, among all orientation components included in the third orientation of the input device 8 calculated based on a pickup image. Further, the yaw orientation component data 81 is data representing an orientation component (yaw orientation component) M3y associated with the yaw direction, among the orientation components included in the third orientation, and the pitch orientation component data 82 is data representing an orientation component (pitch orientation component) M3p associated with the pitch direction, among the orientation components included in the third orientation. The roll direction, the yaw direction, and the pitch direction described above are rotation directions relative to the imaging direction (Z-axis positive direction) of the input device 8. In the present embodiment, the orientation components M3r, M3y, and M3p are each represented as a 3×3 matrix, as with the orientation represented by the first orientation data 68.

The third orientation data 83 is data representing the third orientation. In the present embodiment, the third orientation is represented as a 3×3 matrix M3, as with the first orientation. In the correction process of step S6 to be described later, the matrix M3 is used for correcting the first orientation matrix M1. Hereinafter, the matrix M3 representing the third orientation is referred to as the "third orientation matrix M3". In the present embodiment, the marker coordinate data is transmitted as the operation data from the input device 8, and the third orientation matrix M3 is calculated based on the marker coordinate data 65. Specifically, the third orientation matrix M3 is obtained by combining the orientation components M3r, M3y, and M3p.

Next, the process performed by the game apparatus 3 will be described in detail with reference to FIG. 14 to FIG. 17. FIG. 14 is a main flow chart showing a flow of the process performed by the game apparatus 3. When the game apparatus 3 is powered on, the CPU 10 of the game apparatus 3 executes a boot program stored in a boot ROM not shown, so as to initialize each unit, including the main memory. The game program stored in the optical disc 4 is loaded to the main memory, and the CPU 10 starts executing the game program. The flow chart of FIG. 14 illustrates a process performed when the processes described above are completed.

Firstly, in step S1, the CPU 10 executes an initialization process for the game. In the initialization process, values of various parameters used for the game process are initialized, a virtual game space is constructed, and a player object and other objects are arranged at initial positions in the game space. Following step S1, the process of step S2 is performed.

In step S2, the CPU 10 performs an initial orientation setting process. Specifically, a predetermined value is set for an initial orientation of the input device 8 in accordance with a predetermined operation performed by the player (for example, an operation of pressing the A button 32d). The reference orientation is an orientation in which the Z-axis is parallel to the vertical direction, and the imaging direction of the input device 8 is toward the center (the middle point between the markers 6R and 6L) of the marker section 6, and therefore it is preferable that the player performs the predetermined operation while holding the input device 8 such that the initial orientation is the reference orientation. However, when the input device is almost in static state, and an image of the marker section can be taken, the initial orientation can be calculated. When the predetermined operation is performed, the CPU 10 stores data of the matrix representing the initial orientation, as the first orientation data 68, to the main memory. Data representing a vector (−Xy,−Yy,−Zy), which is a gravitational vector at this point, is stored to the main memory as the gravitational direction data 69, the vector corresponding to the gravitational direction (0,−1,0) when expressed in the controller coordinate system. Following step S2, a process loop of steps S3 to S8 is repeatedly performed during the game play. One process loop is performed every frame time (for example, every 1/60 seconds).

Although in the present embodiment the initial orientation setting process (step S2) is performed once before the game is started (before the process loop of steps S3 to S8 is performed), the initial orientation setting process may be performed at any time while the game is being played, in another embodiment. That is, the CPU 10 may perform the initial orientation setting process each time the player performs the predetermined operation during the game play.

In step S3, the CPU 10 obtains the operation data. That is, the operation data transmitted from the controller 5 is received through the wireless controller module 19. The angular rate data, the acceleration data, the marker coordinate data, the operation button data included in the received operation data are stored to the main memory. Following step S3, the process of step S4 is performed.

In step S4, the CPU 10 calculates the first orientation (first orientation matrix M1) of the input device 8 based on the angular rate data 63 stored in the main memory. Although any method can be employed to calculate the first orientation from the angular rate, in the present embodiment, the first orientation is calculated based on the previous first orientation of the input device 8 (the orientation calculated by the previous process loop of steps S3 to S8) and the current angular rate (the angular rate acquired by the current process loop). Concretely, the CPU 10 reads the angular rate data 63 and the first orientation data 68 stored in the main memory, and acquires the previous orientation represented by the first orientation data 68 and the current angular rate represented by the angular rate data 63. Then, a new first orientation is obtained by rotating the previous orientation at the current angular rate for a unit time. Data representing the orientation (3×3 matrix) calculated in step S4 is stored to the main memory as new first orientation data 68. Following step S4, the process of step S5 is performed.

In step S5, the CPU 10 performs an acceleration-based correction process. The acceleration-based correction process is a process for correcting the first orientation of the input device 8 using the acceleration data. Hereinafter, the acceleration-based correction process will be described in detail with reference to FIG. 15.

Figure 15:
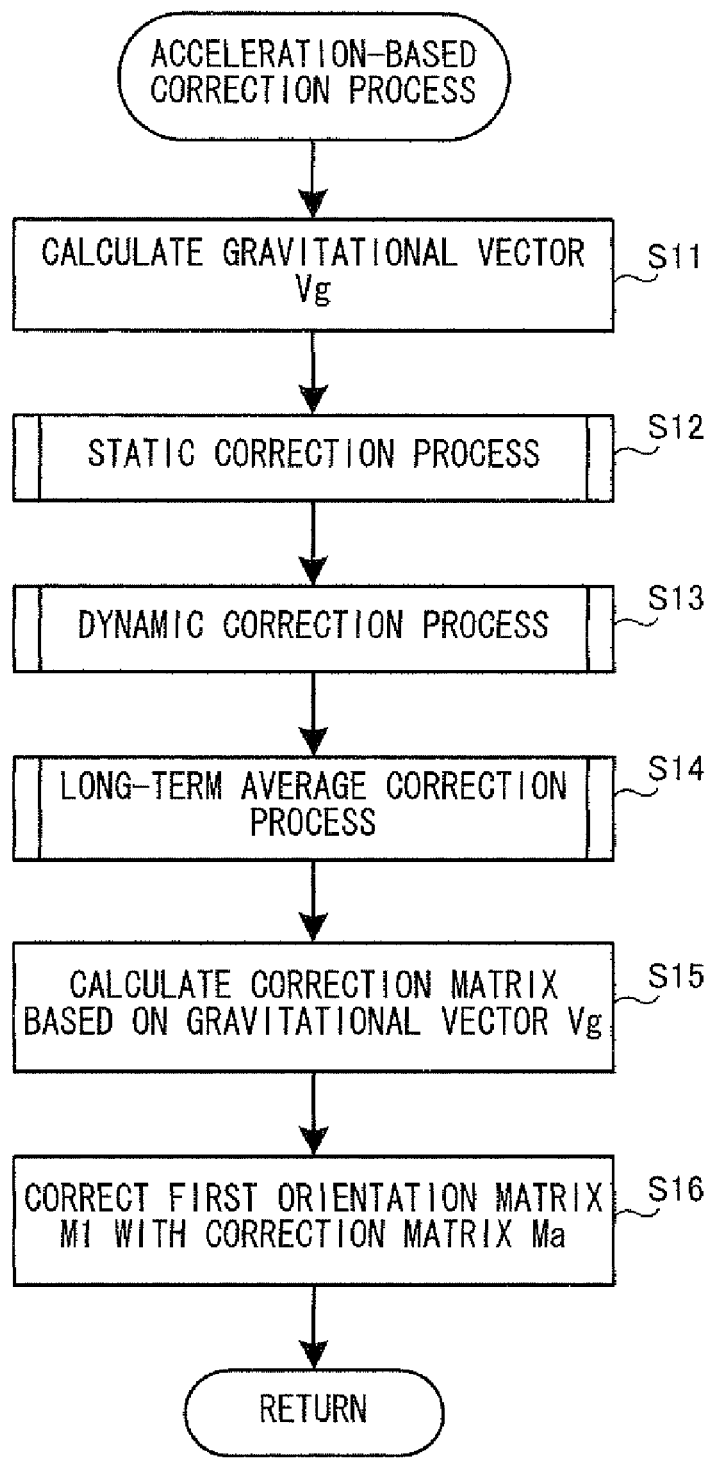
FIG. 15 is a flow chart illustrating a flow of an acceleration-based correction process (step S5) shown in FIG. 14.

FIG. 15 is a flow chart illustrating a flow of the acceleration-based correction process (step S5) shown in FIG. 14. In the acceleration-based correction process, initially, the CPU 10 calculates a gravitational vector Vg in step S11. The gravitational vector Vg is calculated based on the gravitational vector calculated by the previous process loop of steps S3 to S8 and the angular rate acquired by the current process loop of steps S3 to S8. Concretely, the CPU 10 reads the angular rate data 63 and the gravitational direction data 69 stored in the main memory, and acquires the current angular rate represented by the angular rate data 63 and the previous gravitational vector represented by the gravitational direction data 69. Thereafter, the previous gravitational vector is rotated for a unit time in a direction opposite to the rotation direction at the current angular rate, thereby calculating a new gravitational vector Vg. Data representing the new gravitational vector Vg is stored to the main memory as new gravitational direction data 69. Following step S11, the process of step S12 is performed.

While in the present embodiment, the orientation of the input device 8 is expressed in the spatial coordinate system, the gravitational vector is expressed in the controller coordinate system, and therefore a change in the orientation of the input device 8 in the spatial coordinate system results in a change in the direction of the gravitational vector in the spatial coordinate system. Specifically, when the orientation changes as a result of a new orientation being calculated in step S4 during the current process loop, the gravitational vector, which in reality does not change, is considered to change as well in accordance with the change of the orientation. The process of step S11 is a process for accurately expressing the gravitational vector by canceling out such a change of the gravitational vector taking place due to a change in the orientation of the input device 8.

In step S12, the CPU 10 performs the static correction process, which is a process for correcting the first orientation of the input device 8 being mainly at rest (or almost at rest). Hereinafter, the static correction process will be described in detail with reference to FIG. 16.

Figure 16:
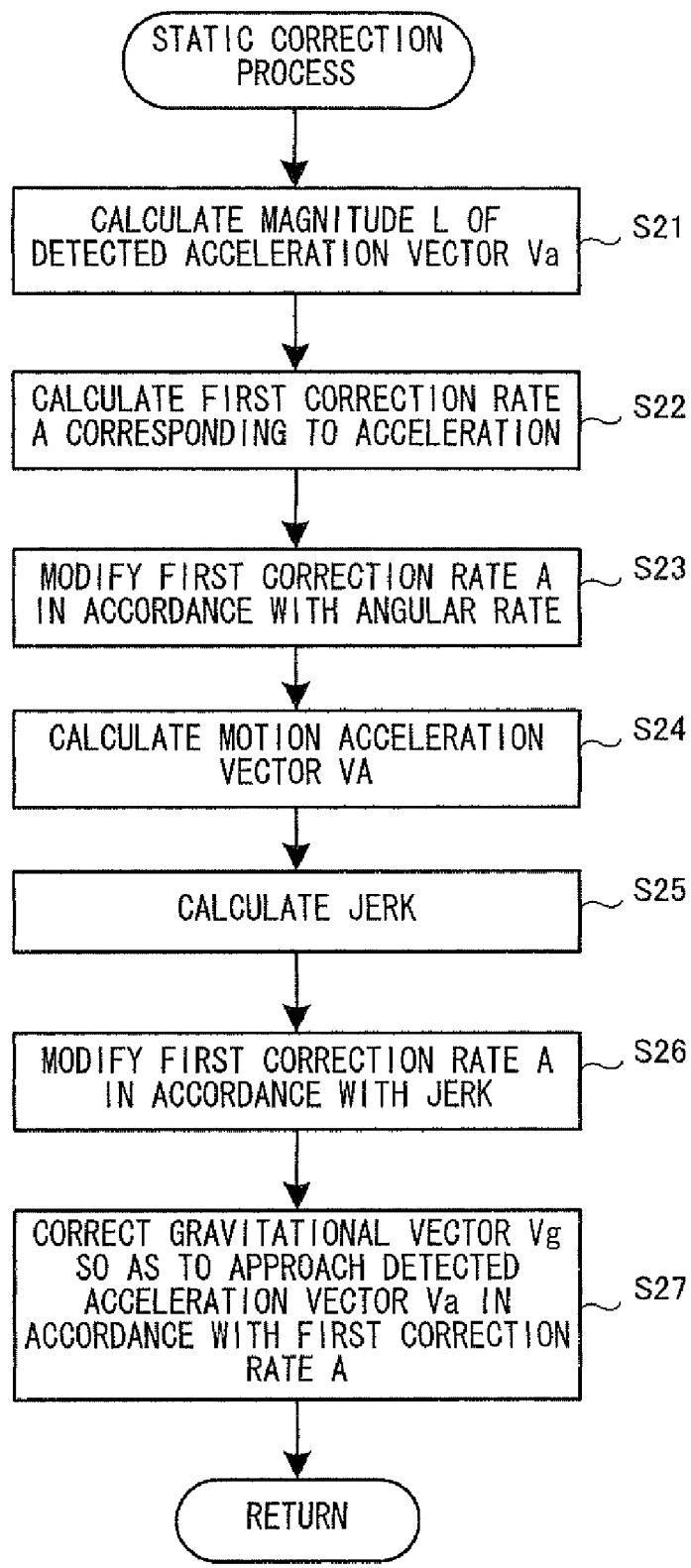
FIG. 16 is a flow chart illustrating a flow of the static correction process (step S12) shown in FIG. 15.

FIG. 16 is a flow chart illustrating a flow of the static correction process (step S12) shown in FIG. 15. In the static correction process, initially in step S21, the CPU 10 calculates the magnitude L of the acceleration detected by the acceleration sensor 37. Specifically, the acceleration data 64 stored in the main memory is read, and the magnitude L of the detected acceleration vector Va represented by the acceleration data 64 is calculated. Data representing the calculated magnitude L is stored to the main memory as acceleration magnitude data 70. Following step S21, the process of step S22 is performed.

In step S22, the CPU 10 calculates the first correction rate A representing a rate at which the orientation of the input device 8 is corrected in the static correction process. The first correction rate A is calculated based on the magnitude L of the detected acceleration vector Va calculated in step S21. Concretely, the CPU 10 reads the acceleration magnitude data 70 stored in the main memory. Thereafter, the first correction rate A is calculated based on the magnitude L represented by the acceleration magnitude data 70 in accordance with equation (2) as follows.

$$A = 1-(|L-1|/R), \text{ where } 0 \leq |L-1| \leq R,$$

$$A = 0, \text{ where } R < |L-1| \quad (2)$$

In equation (2), constant R is predetermined, e.g., R=0.4. Equation (2) is an equation for calculating the first correction rate A so as to increase as the magnitude L of the detected acceleration vector Va approaches the magnitude (=1) of the gravitational acceleration. That is, according to equation (2), an amount of correction of the gravitational vector increases as the magnitude L of the detected acceleration vector Va approaches the magnitude of the gravitational acceleration. Note that in another embodiment, a value obtained by further squaring the rate A calculated by equation (2) may be used as the first correction rate such that a greater weight is assigned as the magnitude L approaches 1. Data representing the first correction rate A calculated by equation (2) is stored to the main memory as first correction rate data 72. Note that the first correction rate A calculated in step S22 is a value to be used for further computation to obtain a final value, and the first correction rate A is corrected in subsequent steps S23 to S26, resulting in a final first correction rate A. Following step S22, the process of step S23 is executed.

Here, when the input device 8 is in motion, the acceleration sensor 37 detects any acceleration due to inertia caused by the motion of the input device 8, in addition to the gravitational acceleration. Accordingly, when the input device 8 is in motion, the magnitude L of the detected acceleration vector Va takes a value other than "1", so the more vigorously the input device 8 moves, the greater the aforementioned difference becomes. Also, when the input device 8 is in vigorous motion, the detected acceleration vector Va includes a high proportion of component (the acceleration component due to inertia) other than the gravitational acceleration, and therefore the detected acceleration vector Va is estimated to be unreliable as a value representing the gravitational direction. Conceivably, the greater the difference, the more unreliable the detected acceleration vector Va.

Therefore, in the present embodiment, by step S22, the amount of correction of the gravitational vector is caused to increase as the magnitude L of the detected acceleration vector Va approaches the magnitude (=1) of the gravitational acceleration. Also, the correction is performed only when the difference between the magnitude L of the detected acceleration vector and the magnitude of the gravitational acceleration is less than a predetermined reference (predetermined value R). As a result, the more reliable the detected acceleration vector Va is, the closer the gravitational vector is to the detected acceleration vector Va. Furthermore, the correction is not performed when the detected acceleration vector Va is unreliable. In this manner, according to the present embodiment, the amount of correction is determined in accordance with the reliability of the detected acceleration vector Va, and therefore the amount of correction of the gravitational vector Vg can be appropriately determined in accordance with the reliability. Thus, the game apparatus 3 makes it possible to accurately calculate the gravitational direction, so that the orientation of the input device 8 can be more accurately calculated.

In step S23, the CPU 10 modifies the value of the first correction rate A in accordance with the angular rate of the input device 8. Concretely, the CPU 10 reads the angular rate data 63 and the first correction rate data 72 stored in the main memory, and acquires the angular rate represented by the angular rate data 63 and the first correction rate A represented by the first correction rate data 72. Thereafter, a post-modification first correction rate A is calculated based on the angular rate in accordance with equation (3) as follows.

$$A = A' \times \{1-(\omega/T1)\}, \text{ where } 0 \leq |\omega| \leq T1,$$

$$A = 0, \text{ where } T1 < |\omega| \quad (3)$$

In equation (3), constant T1 is predetermined, e.g., T1=60 [degrees per second (deg/sec)]. Also, variable ω is a magnitude of an angular rate, i.e., a magnitude of an angular rate vector Vω. Equation (3) is intended to modify the first correction rate A so as to decrease as the angular rate increases. That is, according to equation (3), the amount of correction of the gravitational vector decreases as the angular rate increases. Note that in another embodiment, "$\{1-(\omega/T1)\}$" in equation (3) may be changed to "$\{1-(\omega/T1)\}^2$" such that a greater weight is assigned as the angular rate decreases. Data representing the first correction rate A modified by equation (3) is stored to the main memory as first correction rate data 72. Following step S23, the process of step S24 is performed.

Here, when the input device 8 has a high angular rate, it is implied that the input device 8 is being moved vigorously, and in such a case, the acceleration vector Va is conceivably unreliable as a value indicating the direction of gravity. On the other hand, when the angular rate is low, it is implied that the input device 8 is not being moved vigorously, and the acceleration vector Va is conceivably reliable. Accordingly, in step S23, as in step S22, the first correction rate A can be set to increase as the reliability of the detected acceleration vector Va increases (as the angular rate decreases). As a result, the amount of correction can be appropriately determined in accordance with the reliability of the detected acceleration vector Va, as described in conjunction with step S22, and furthermore, the gravitational direction and the orientation of the input device 8 can be more accurately calculated.

Also, in step S22, the degree of movement of the input device 8 (the reliability of the detected acceleration vector Va) is determined based on the acceleration of the input device 8, whereas in step S23, the degree is determined based on the angular rate of the input device 8. In this manner, the reliability is determined based on a variable different from that used in step S22, and therefore even in the case where the reliability cannot be accurately determined in step S22 (e.g., when the input device 8 is in motion and the detected acceleration vector Va happens to be equal in magnitude to the gravitational acceleration), the reliability can be accurately determined in step S23.

In step S24, the CPU 10 calculates the motion acceleration vector VA. As described above, the motion acceleration vector VA is calculated based on the detected acceleration vector Va and the gravitational vector Vg. Concretely, the CPU 10 reads the acceleration data 64 and the gravitational direction data 69 stored in the main memory, and calculates the motion acceleration vector VA by subtracting the gravitational vector Vg represented by the gravitational direction data 69 from the detected acceleration vector Va represented by the acceleration data 64. Data representing the calculated motion acceleration vector VA is stored to the main memory as motion acceleration data 74. Note that in the present embodiment, in order to calculate the jerk of the input device 8, data representing a motion acceleration vector VA calculated by the previous process loop is stored to the main memory as motion acceleration history data. Following step S24, the process of step S25 is performed.

In step S25, the CPU 10 calculates the jerk J of the input device 8. The jerk J is calculated as a difference between the motion acceleration vector calculated by the current process loop and the motion acceleration vector calculated by the previous process loop. Concretely, the CPU 10 reads the motion acceleration data 74 and the motion acceleration history data stored in the main memory, and calculates as (the magnitude of) the jerk J the magnitude of a vector obtained by subtracting the motion acceleration vector represented by the motion acceleration history data from the motion acceleration vector represented by the motion acceleration data 74. Data representing the calculated jerk is stored to the main memory as jerk data 71. Note that in another embodiment, the CPU 10 may calculate the jerk from an acceleration vector detected by the acceleration sensor 37, rather than from the motion acceleration vector. Specifically, the magnitude of a vector obtained by subtracting the detected acceleration vector acquired by the previous process loop of steps S3 to S8 from the detected acceleration vector acquired by the current process loop of steps S3 to S8 may be calculated as (the magnitude) of the jerk J. Following step S25, the process of step S26 is performed.

In step S26, the CPU 10 modifies the value of the first correction rate A in accordance with the jerk J of the input device 8. Concretely, the CPU 10 reads the jerk data 71 and the first correction rate data 72 stored in the main memory, and acquires the jerk J represented by the jerk data 71 and the first correction rate A represented by the first correction rate data 72. Thereafter, a post-modification first correction rate A is calculated based on the jerk J in accordance with equation (4) as follows.

$$A = A' \times \{1-(J/U1)\} \times C1, \text{ where } 0 \leq J \leq U1,$$

$$A = 0, \text{ where } U1 < J \tag{4}$$

In equation (4), constant U1 is predetermined, e.g., U1=40 [G/sec]. Also, constant C1 is appropriately set to adjust the amount of correction, e.g., C1=0.03. Equation (4) is intended to modify the first correction rate A so as to decrease as the jerk J increases. That is, according to equation (4), the amount of correction of the gravitational vector decreases as the jerk J increases. Note that in another embodiment, "$\{1-(J/U1)\}$" in equation (4) may be changed to "$\{1-(J/U1)\}^2$" such that a greater weight is assigned as the jerk J decreases. Data representing the first correction rate A modified by equation (4) is stored to the main memory as first correction rate data 72. By step S26, a final first correction rate A is calculated. Following step S26, the process of step S27 is performed.

Here, when the jerk J of the input device 8 is high, the input device 8 is estimated to be in vigorous motion, and the value of the detected acceleration vector Va is estimated to be unreliable, as described above. Conversely, when the value of the jerk J is low, the input device 8 is estimated to be not in vigorous motion, and the value of the detected acceleration vector Va is estimated to be reliable. Accordingly, as in the case of steps S22 and S23, by step S26, the value of the first correction rate A can be set so as to increase as the detected acceleration vector Va becomes more reliable (as the jerk J decreases). Consequently, as in the case of step S22, the amount of correction can be appropriately determined in accordance with the reliability of the detected acceleration vector Va, and therefore the gravitational direction and the orientation of the input device 8 can be more accurately calculated.

Also, in step S26, the degree of movement of the input device 8 (the reliability of the detected acceleration vector Va) is determined based on the jerk J, which is a variable different from those used in steps S22 and S23. Therefore, even when the reliability cannot be accurately determined in steps S22 and S23, so that the first correction rate A remains relatively high (e.g., when the input device 8 is being translated without rotation and the detected acceleration vector Va happens to be equal in magnitude to the gravitational acceleration), the first correction rate A can be changed to a lower value by the process of step S26, making it possible to accurately determine the reliability.

As described above, in the present embodiment, by steps S22, S23, and S26, the reliability of the detected acceleration vector Va is determined based on three different variables each representing the state of the input device 8. Thus, the reliability of the detected acceleration vector Va can be more accurately determined, and the amount of correction can be appropriately determined in accordance with the reliability. Therefore, the game apparatus 3 makes it possible to more accurately calculate the gravitational direction and the orientation of the input device 8. Note that in another embodiment, the CPU 10 does not have to perform all the processes of steps S22, S23, and S26, and may perform one or two of the processes of steps S22, S23, and S26.

Also, when steps S22, S23, or S26 results in the first correction rate A being "0", the CPU 10 may skip any subsequent process, thereby completing the static correction process. In such a case, correction of the gravitational vector is substantially not performed, and therefore the entire process can be shortened by omitting any subsequent process.

Figure 9:
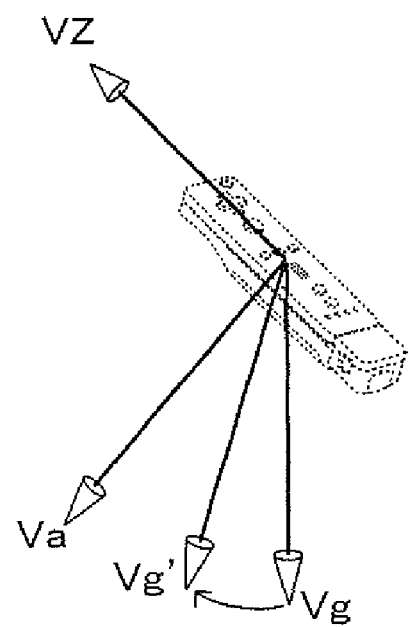
FIG. 9 is a diagram illustrating the gravitational vector being corrected by a static correction process.

In step S27, the CPU 10 corrects the gravitational vector Vg so as to approach the detected acceleration vector Va (see FIG. 9). In the present embodiment, a pre-correction gravitational vector Vg is caused to approach the detected acceleration vector Va at a rate in accordance with the magnitude of the first correction rate A, thereby calculating a post-correction gravitational vector Vg'. Concretely, the CPU 10 reads the acceleration data 64, the gravitational direction data 69, and the first correction rate data 72 stored in the main memory, and acquires the detected acceleration vector Va represented by the acceleration data 64, the (pre-correction) gravitational vector Vg represented by the gravitational direction data 69, and the first correction rate A represented by the first correction rate data 72. Thereafter, the pre-correction gravitational vector Vg is rotated by an angle of "A·θ1 [deg]" in a direction of the detected acceleration vector Va, where θ1 is an angle between the pre-correction gravitational vector Vg and the detected acceleration vector Va, thereby calculating the post-correction gravitational vector Vg'. Data representing the calculated gravitational vector Vg' is stored to the main memory as new gravitational direction data 69. Note that any method can be employed to calculate the post-correction gravitational vector Vg'. For example, in another embodiment, the post-correction gravitational vector Vg' may be obtained by calculating and normalizing a vector having an end point at which a line segment connecting from an end point of the pre-correction gravitational vector Vg to an endpoint of the detected acceleration vector Va is internally divided at a ratio of A:(1−A). By steps S21 to S27, the gravitational vector is corrected in the static correction process. Following step S27, the CPU 10 ends the static correction process.

Returning to the description of FIG. 15, in step S13, following step S12, the CPU 10 performs the dynamic correction process. The dynamic correction process is a process for correcting the orientation of the input device 8 being mainly in motion.

As described above, in the dynamic correction process, the CPU 10 estimates the input device 8 to make a rotational motion at a constant angular rate, and corrects the gravitational vector Vg based on the relationship between the angular rate and the motion acceleration for the rotational motion at the constant angular rate. Here, the motion acceleration vector for the input device 8 in rotational motion is generally expressed by equation (5) as follows.

$$VA = \frac{d}{dt}(V\omega \times Vr) = \dot{V}\omega \times Vr + V\omega \times (V\omega \times Vr) \quad (5)$$

In equation (5), vector Vω is an angular rate vector representing an angular rate detected by the gyroscopes 55 and 56, and vector Vr is a vector (position vector) pointing in a direction from the position of the input device 8, more strictly, the position of the acceleration sensor 37 to the center position of the rotation. Here, since the input device 8 is estimated to make a rotational motion at a constant angular rate, the first term on the right-hand side of equation (5) is "0", and furthermore, equation (5) is rearranged to obtain equation (6) as follows.

$$VA = (-V\omega^2[I] + V\omega V\omega^T)Vr \quad (6)$$

In equation (6), matrix [I] is a 3×3 unit matrix, and matrix $V\omega^T$ is a transposed matrix for vector Vω being considered as a 1×3 matrix. When calculating an inner product with vector Vω for each side of equation (6), the inner product for the right-hand side is "0", resulting in equation (7) as follows.

$$V\omega \cdot VA = 0 \quad (7)$$

Equation (7) expresses the angular rate vector Vω to be perpendicular to the motion acceleration vector VA. That is, when the input device 8 makes a rotational motion at a constant angular rate, a relationship is established in which the angular rate vector Vω and the motion acceleration vector VA are perpendicular to each other. In the following description, when the input device 8 makes a rotational motion, a vector perpendicular to the motion acceleration vector may be referred to as a "perpendicular vector". In the present embodiment, the angular rate vector Vω is a perpendicular vector.

By using the above relationship, the gravitational vector Vg can be corrected. Specifically, the motion acceleration vector VA is calculated from the gravitational vector Vg (see step S24), and therefore the gravitational vector Vg may be corrected such that the motion acceleration vector VA satisfies equation (7) with the angular rate vector Vω detected by the gyroscopes 55 and 56. Note that in the dynamic correction process of the present embodiment, the gravitational vector satisfying the aforementioned relationship is not obtained by a single round of correction process, and the single round of correction process achieves a correction for approaching the gravitational vector satisfying the aforementioned relationship, considering, for example, a possibility that the input device 8 might not make a rotational motion at an exactly constant angular rate, as well as prevention of the gravitational vector Vg being suddenly changed due to correction. Specifically, the gravitational vector Vg is corrected such that the motion acceleration vector VA becomes closer to be perpendicular to the angular rate vector Vω.

In order for the pre-correction gravitational vector Vg to approach the gravitational vector satisfying the aforementioned relationship, the gravitational vector Vg may be corrected such that the inner product of the perpendicular vector W and the motion acceleration vector VA is reduced. Specifically, the gravitational vector Vg may be obtained such that function ϕ=Vω·VA=Vω·(Va−Vg) is minimized where $|Vg|^2=1$. Although any method can be employed to obtain such a gravitational vector Vg, in the dynamic correction process of the present embodiment, the gravitational correction vector ΔVg is used. The gravitational correction vector ΔVg is a vector having a predetermined length and causing the gravitational vector Vg to rotate theretoward. The CPU 10 determines the direction of the gravitational correction vector ΔVg, i.e., the direction in which the gravitational vector Vg is rotated. Specifically, in the present embodiment, the correction is performed such that, when the gravitational vector Vg is rotated by a predetermined angle (by the length of the gravitational correction vector ΔVg), the gravitational vector Vg is rotated in such a direction as to cause a motion acceleration vector calculated from the rotated gravitational vector to be closest to the motion acceleration satisfying the aforementioned relationship.

Figure 17:
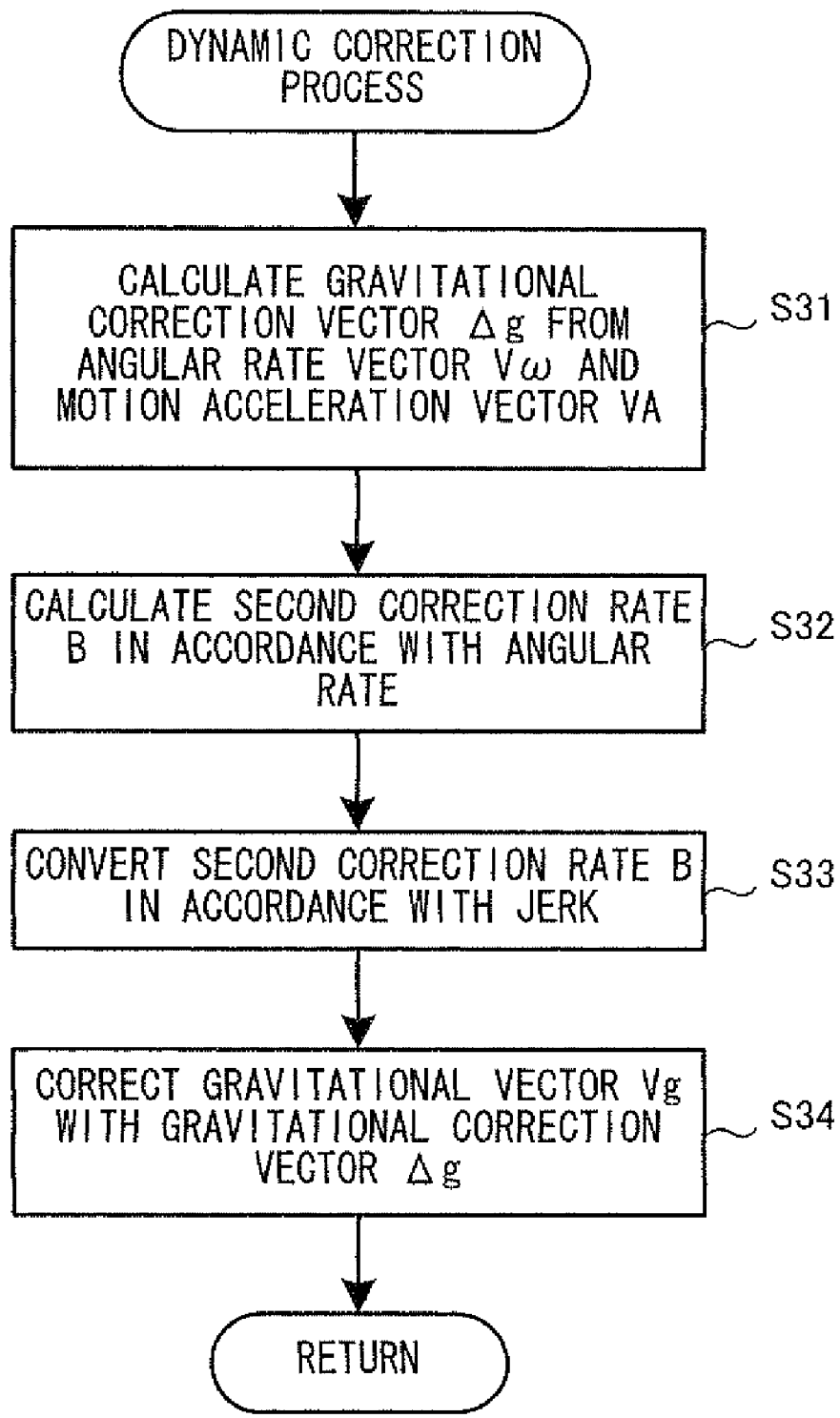
FIG. 17 is a flow chart illustrating a flow of the dynamic correction process (step S13) shown in FIG. 15.
Figure 18:
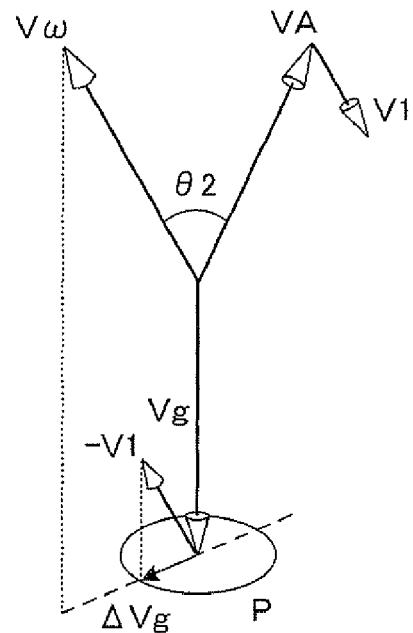
FIG. 18 is a diagram illustrating a method for calculating the gravitational correction vector in the dynamic correction process.

Referring to FIG. 17, the dynamic correction process will be described in detail below. FIG. 17 is a flow chart illustrating a flow of the dynamic correction process (step S13) shown in FIG. 15. In the dynamic correction process, initially in step S31, the CPU 10 calculates the gravitational correction vector ΔVg used for correcting the gravitational vector Vg. The gravitational correction vector ΔVg is calculated based on the angular rate vector Vω and the motion acceleration vector VA. Referring to FIG. 18, the method for calculating the gravitational correction vector ΔVg will be described below.

Figure 19:
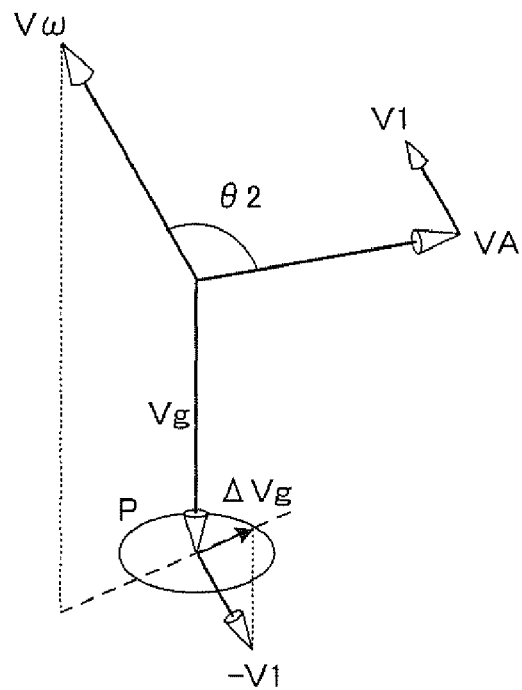
FIG. 19 is a diagram illustrating another method for calculating the gravitational correction vector in the dynamic correction process.

FIGS. 18 and 19 are diagrams illustrating the method for calculating the gravitational correction vector ΔVg in the dynamic correction process. In FIG. 18, an angle θ2 between the motion acceleration vector VA and the angular rate vector Vω is acute. When the angle θ2 is acute, in order to cause the motion acceleration vector VA to be perpendicular (or closer to be perpendicular) to the angular rate vector Vω, thereby satisfying the aforementioned relationship, the motion acceleration vector VA may be corrected so as to be rotated in a direction opposite to the angular rate vector Vω (in a direction away from the angular rate vector $V\omega$). That is, the end of the motion acceleration vector VA may be rotated in a direction opposite to the angular rate vector $V\omega$ (the direction being indicated by a vector V1). Correspondingly, the gravitational vector Vg may be rotated such that its end is oriented in the same direction as the angular rate vector $V\omega$. As a result, the gravitational correction vector $\Delta Vg$ can be calculated as a vector obtained by projecting a vector $-V1$ oriented in the same direction as the angular rate vector $V\omega$ onto a plane P perpendicular to the gravitational vector Vg. On the other hand, as shown in FIG. 19, when the angle $\theta 2$ between the motion acceleration vector VA and the angular rate vector $V\omega$ is obtuse, the end of the motion acceleration vector VA may be rotated in the same direction as the angular rate vector $V\omega$, as opposed to the case where the angle $\theta 2$ is acute. As a result, the gravitational correction vector $\Delta Vg$ can be calculated as a vector obtained by projecting a vector $-V1$ oriented in a direction opposite to the angular rate vector $V\omega$ onto the plane P.

Concretely, in the process of step S31, the CPU 10 initially calculates the vector V1 based on the angular rate vector $V\omega$ and the motion acceleration vector VA. The vector V1 is oriented in a direction opposite to the angular rate vector $V\omega$ when the angle between the motion acceleration vector VA and the angular rate vector $V\omega$ is acute, whereas the vector V1 is oriented in the same direction as the angular rate vector $V\omega$ when the angle is obtuse. Specifically, the CPU 10 reads the angular rate data 63 and the motion acceleration data 74 stored in the main memory, and acquires the angular rate vector $V\omega$ represented by the angular rate data 63 and the motion acceleration vector VA represented by the motion acceleration data 74. Thereafter, the vector V1 is calculated based on the angular rate vector $V\omega$ and the motion acceleration vector VA in accordance with equation (8) as follows.

$$V1=(V\omega \cdot VA)V\omega \tag{8}$$

Furthermore, in order to obtain a vector corresponding to the vector V1 calculated by equation (8) being projected onto the plane P (see FIG. 18), the CPU 10 calculates the gravitational correction vector $\Delta Vg$ in accordance with equation (9) as follows.

$$\Delta Vg=V1-(Vg \cdot V1)Vg \tag{9}$$

Equation (9) is intended to calculate a vector corresponding to the vector V1 from which any component parallel to the gravitational vector Vg is removed. Moreover, the CPU 10 normalizes the gravitational correction vector $\Delta Vg$ obtained by equation (9) before multiplication by a predetermined constant. The constant represents the amount of correction, and is set to, for example, 0.03. As a result, the gravitational correction vector $\Delta Vg$ having a predetermined length can be obtained. Data representing the gravitational correction vector $\Delta Vg$ thus calculated is stored to the main memory as gravitational correction vector data 75. Following step S31, the process of step S32 is performed.

Note that in the present embodiment, the direction of the gravitational correction vector $\Delta Vg$ is determined based on the direction of the angular rate vector $V\omega$. Here, in another embodiment, the CPU 10 may calculate a gravitational vector satisfying the relationship of equation (7), and may determine the direction of the gravitational correction vector $\Delta Vg$ such that a pre-correction gravitational vector approaches the calculated gravitational vector.

In step S32, the CPU 10 calculates the second correction rate B indicating a rate at which the orientation of the input device 8 is corrected in the dynamic correction process. The second correction rate B is calculated so as to have a magnitude in accordance with the angular rate of the input device 8. Concretely, the CPU 10 reads the angular rate data 63 stored in the main memory. Then, the second correction rate B is calculated based on the angular rate represented by the angular rate data 63 in accordance with equation (10) as follows.

$$B=\omega/T2, \text{ where } 0 \leq |\omega| \leq T2,$$

$$B=1, \text{ where } T2<|\omega| \tag{10}$$

In equation (10), constant T2 is predetermined, e.g., T2=10 [deg/sec]. Equation (10) is intended to calculate the second correction rate B so as to decrease with the magnitude of the angular rate $\omega$ (the magnitude of the angular rate vector $V\omega$). That is, according to equation (10), the amount of correction of the gravitational vector decreases with the angular rate $\omega$. Note that in another embodiment, "$\omega/T2$" in equation (10) may be changed to "$(\omega/T2)^2$" such that a greater weight is assigned as the angular rate $\omega$ increases. Data representing the second correction rate B calculated by equation (10) is stored to the main memory as second correction rate data 73. Following step S32, the process of step S33 is performed.

Here, when the angular rate of the input device 8 is low, the input device 8 is estimated to be not in reciprocating motion. The correction by the dynamic correction process is performed on the assumption that the input device 8 is in rotational motion (at a constant angular rate), but when the angular rate of the input device 8 is low, it is highly likely that the assumption is unacceptable. Therefore, in the present embodiment, when the angular rate of the input device 8 is low, the amount of correction is set to be low, considering a possibility that the correction by the dynamic correction process might be inaccurate. As a result, when accurate correction cannot be made because the input device 8 is not in rotational motion, it is possible to prevent the dynamic correction process from resulting in inaccurate correction. Thus, the gravitational vector can be accurately corrected by the dynamic correction process.

In step S33, the CPU 10 modifies the second correction rate B in accordance with the jerk J of the input device 8. Concretely, the CPU 10 reads the jerk data 71 and the second correction rate data 73 stored in the main memory, and acquires the jerk j represented by the jerk data 71 and the second correction rate B represented by the second correction rate data 73. Thereafter, a post-modification second correction rate B is calculated based on the jerk J in accordance with equation (11) as follows.

$$B=B' \times \{1-(J/U1)\}, \text{ where } 0 \leq J \leq U2,$$

$$B=0, \text{ where } U2<J \tag{11}$$

In equation (11), constant U2 is predetermined, e.g., U2=40 [G/sec]. Equation (11) is intended to modify the second correction rate B so as to decrease as the jerk J increases. That is, according to equation (11), the amount of correction of the gravitational vector decreases as the jerk J increases. Note that in another embodiment, "$\{1-(J/U2)\}$" in equation (11) may be changed to "$\{1-(J/U2)\}^2$" such that a greater weight is assigned as the jerk J decreases. Data representing the second correction rate B modified by equation (11) is stored to the main memory as second correction rate data 73. By step S33, a final second correction rate B is calculated. Following step S33, the process of step S34 is performed.

Here, the jerk j of the input device 8 is high, for example, when the input device 8 starts moving, the input device 8 (in motion) stops moving, or the input device 8 turns back during reciprocating motion. At such a time point, the input device 8 is estimated to be not in rotational motion. Accordingly, when the jerk J of the input device 8 is high, it is highly likely that the assumption that "the input device 8 is in rotational motion (at a constant angular rate)" is unacceptable, as in the case where the angular rate of the input device 8 is low. In such a case, the dynamic correction process might result in inaccurate correction. Therefore, in the present embodiment, when the jerk J of the input device 8 is high, the amount of correction is set to be low, considering a possibility that the correction by the dynamic correction process might be inaccurate. As a result, it is possible to prevent the dynamic correction process from resulting in inaccurate correction, as in the case of step S32. Thus, the gravitational vector can be accurately corrected by the dynamic correction process.

Also, in step S33, the jerk j, which is a variable different from that used in step S32, is used to determine whether or not the input device 8 is in rotational motion. As a result, the first correction rate A can be set to be low by the process of step S26 even when the second correction rate B remains relatively high because a determination as to whether or not the input device 8 is in rotational motion cannot be accurately made in step S32, and therefore the reliability can be accurately determined.

In step S34, the CPU 10 corrects the gravitational vector Vg using the gravitational correction vector ΔVg. Concretely, the CPU 10 reads the gravitational direction data 69 and the gravitational correction vector data 75 stored in the main memory, and adds the gravitational correction vector ΔVg represented by the gravitational correction vector data 75 to the gravitational vector Vg represented by the gravitational direction data 69. Furthermore, by normalizing a vector resulting from the addition, a post-correction gravitational vector Vg is calculated. Data representing the post-correction gravitational vector Vg is stored to the main memory as gravitational direction data 69. Thus, the gravitational vector Vg is corrected in the dynamic correction process. Following step S34, the CPU 10 ends the dynamic correction process.

According to the dynamic correction process, the CPU 10 predefines the relationship in which "the motion acceleration vector VA is perpendicular to the angular rate vector Vω" (equation (7)), assuming that the input device 8 makes a rotational motion at a constant angular rate. Then, the pre-correction gravitational vector Vg is corrected so as to approach a gravitational vector satisfying the aforementioned relationship. As a result, the game apparatus 3 makes it possible to correct the gravitational vector even when the input device 8 is in motion, so that the gravitational direction and the orientation of the input device 8 can be accurately calculated.

Also, in the canoe game as described in the present embodiment, the player moves the input device 8 as if he/she is propelled through water with a paddle, and therefore it is assumed that there is a period in which the input device 8 is in rotational motion. On the other hand, there are periods of starting and stopping the swing of the input device 8, and also there might be some period in which the input device 8 is in almost reciprocating motion resulting from inaccurate rotational motion. Therefore, in the present embodiment, the angular rate and the jerk of the input device 8 are used to determine whether or not the input device 8 is in rotational motion. If it is highly likely that the input device 8 is in rotational motion, the amount of correction for the dynamic correction process is set to be high, whereas if it is less likely that the input device 8 is in rotational motion, the amount of correction is set to be low (steps S32 and S33). Thus, according to the present embodiment, the gravitational direction is accurately corrected when the input device 8 is in rotational motion. Furthermore, no correction is performed during periods of starting and stopping the swing of the input device 8 and during reciprocating motion, so that the gravitational direction can be accurately calculated without inaccurate correction.

[Variant of Dynamic Correction Process]

Note that in the above embodiment, the relationship between the motion acceleration and the angular rate (equation (7)) is defined estimating the input device 8 to make a rotational motion at a constant angular rate. Here, in another embodiment, the relationship between the motion acceleration and the angular rate can be defined as well estimating the input device 8 to make a rotational motion at either a constant or inconstant angular rate. A variant will be described below with respect to the case where the input device 8 makes a rotational motion (at either a constant or inconstant angular rate).

First, the relationship between the motion acceleration and the angular rate will be described with respect to the case where the input device 8 makes a rotational motion at an inconstant angular rate. Equation (5) as described above is also true for the case where the input device 8 makes a rotational motion at an inconstant angular rate. In such a case, the first term on the right-hand side of equation (5) is not "0", and therefore equation (5) is rearranged without deleting the first term on the right-hand side, resulting in equation (12) as follows.

$$VA=([V\dot{\omega}*J-V\omega^2[I]]+V\omega V\omega^T)Vr \qquad (12)$$

Equation (12) differs from equation (6) in that the parenthesized first term is added on the right-hand side. Note that this first term is a matrix representation of an outer product, which expresses a matrix (antisymetric matrix) whose computation result is the same as the outer product. As described above, the motion of moving the input device 8 can be considered to be a rotational motion, and therefore if it is assumed that a position vector Vr oriented in a direction from the position of the input device 8 to the rotation center is perpendicular to the angular rate vector Vω, the parenthesized third term on the right-hand side of equation (12) multiplied by the position vector Vr equals "0". Furthermore, equation (12) is rearranged for calculating an inner product with the vector Vω on each side, resulting in equation (13) as follows.

$$V\omega^T([V\dot{\omega}*J-V\omega^2[I]])^{-1}VA=V\omega \cdot Vr=0 \qquad (13)$$

Here, vector W is defined by equation (14) as follows.

$$W=\{([V\dot{\omega}*J-V\omega^2[I]])^{-1}\}^T V\omega \qquad (14)$$

By defining the vector W as in equation (14), the left-hand side of equation (13) can be represented as an inner product of the vector W and the vector VA, and therefore equation (13) can be expressed by equation (15) as follows.

$$W \cdot VA=0 \qquad (15)$$

Equation (15) expresses the angular rate vector Vω to be perpendicular to the vector W. Specifically, when the input device 8 makes a rotational motion, a relationship is established in which the motion acceleration vector VA and the vector W are perpendicular to each other, so that the vector W is considered as a perpendicular vector as described above. In the present variant, the CPU 10 corrects the gravitational vector based on the relationship represented by equation (15), rather than by equation (7).

Figure 20:
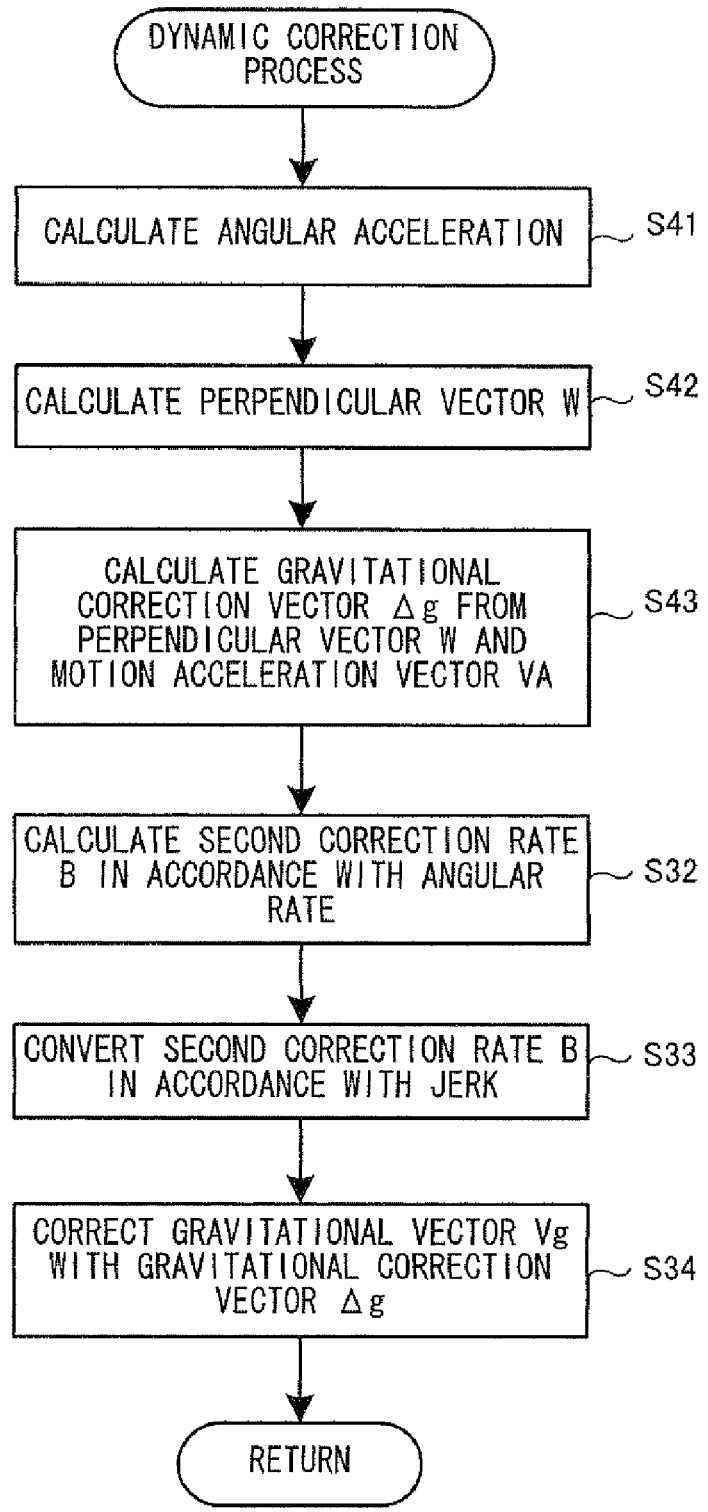
FIG. 20 is a flow chart illustrating a variation on the dynamic correction process (step S13) shown in FIG. 15.

Referring to FIG. 20, the dynamic correction process according to the above variant will be described in detail below. FIG. 20 is a flow chart illustrating a variation on the dynamic correction process (step S13) shown in FIG. 15.

Note that in FIG. 20, the same process steps as those in FIG. 17 are denoted by the same step numbers.

In the dynamic correction process of the present variant, initially, the CPU 10 calculates the angular acceleration vector of the input device 8 in step S41. The angular acceleration vector is calculated, for example, as a vector corresponding to the difference between angular rate vectors Vω calculated by the current and previous process loops. Concretely, the CPU 10 reads the angular rate data 63 and the angular rate history data stored in the main memory, and calculates an angular acceleration vector by subtracting the angular rate vector represented by the angular rate history data from the angular rate vector represented by the angular rate data 63. Data representing the calculated angular acceleration vector is stored to the main memory. Following step S41, the process of step S42 is performed.

In step S42, the CPU 10 calculates the perpendicular vector W as described above. The perpendicular vector W can be calculated based on the angular rate vector Vω and the angular acceleration vector in accordance with equation (14). Concretely, the CPU 10 reads the angular rate data 63 and data representing an angular acceleration vector stored in the main memory, and calculates the perpendicular vector W based on the angular rate vector represented by the angular rate data 63 and the angular acceleration vector in accordance with equation (14). Data representing the calculated perpendicular vector W is stored to the main memory as perpendicular vector data. Following step S42, the process of step S43 is performed.

In step S43, the CPU 10 calculates the gravitational correction vector ΔVg. While in step S31, the gravitational correction vector ΔVg is calculated based on the angular rate vector Vω and the motion acceleration vector VA, in the present variant, it is calculated based on the perpendicular vector W and the motion acceleration vector VA. Note that the specific method for calculating the gravitational correction vector ΔVg in step S43 is the same as that in step S31 except that the perpendicular vector W is used in place of the angular rate vector Vω.

In the present variant, the processes of steps S32 to S34 as described in the above embodiment will be performed after step S43. As a result, the gravitational vector Vg is corrected based on the gravitational correction vector ΔVg. According to the present variant, the gravitational vector Vg is corrected based on the relationship between the angular rate vector Vω and the motion acceleration vector VA, which takes account even of a rotational motion at an inconstant angular rate, and therefore the gravitational vector Vg can be accurately corrected as well even when the input device 8 makes a rotational motion at an inconstant angular rate. Accordingly, the CPU 10 can calculate the gravitational direction more accurately than in the above embodiment, making it possible to more accurately calculating the orientation of the input device 8.

Figure 21:
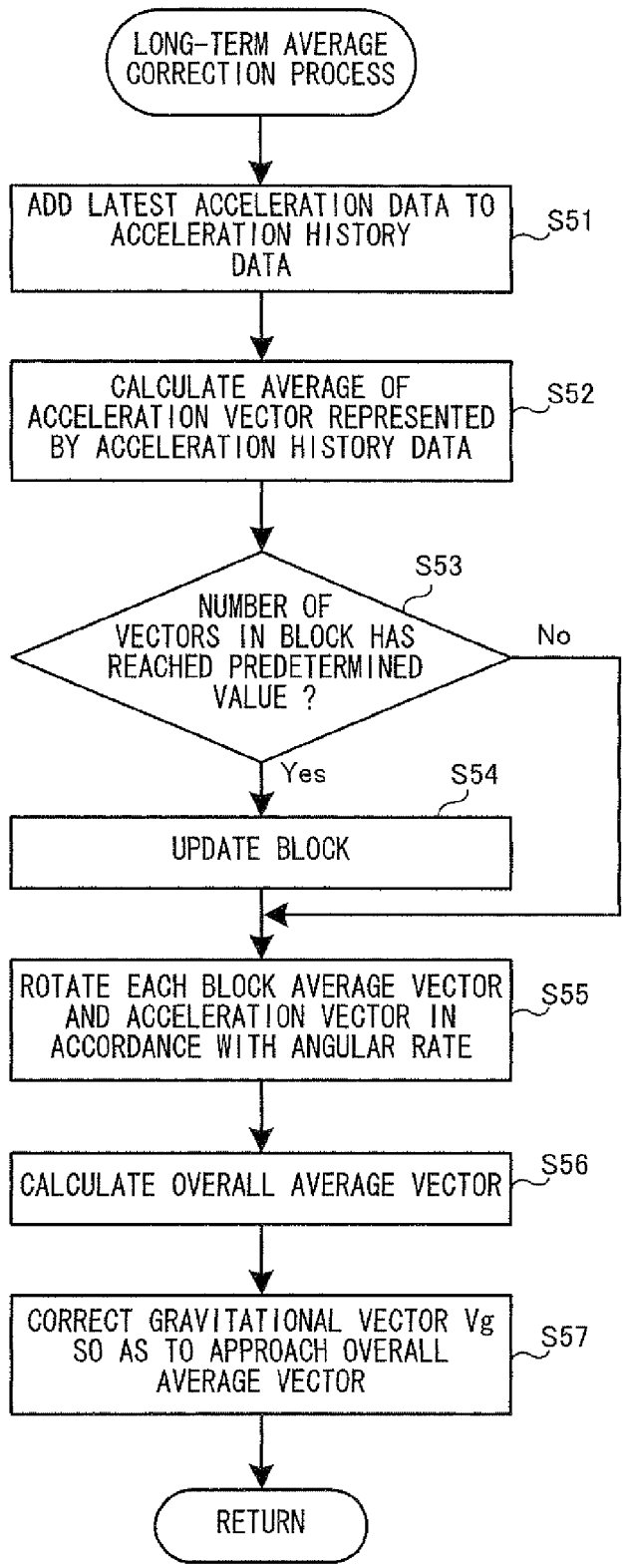
FIG. 21 is a flow chart illustrating a flow of a long-term average correction process (step S14) shown in FIG. 15.
Figure 22:
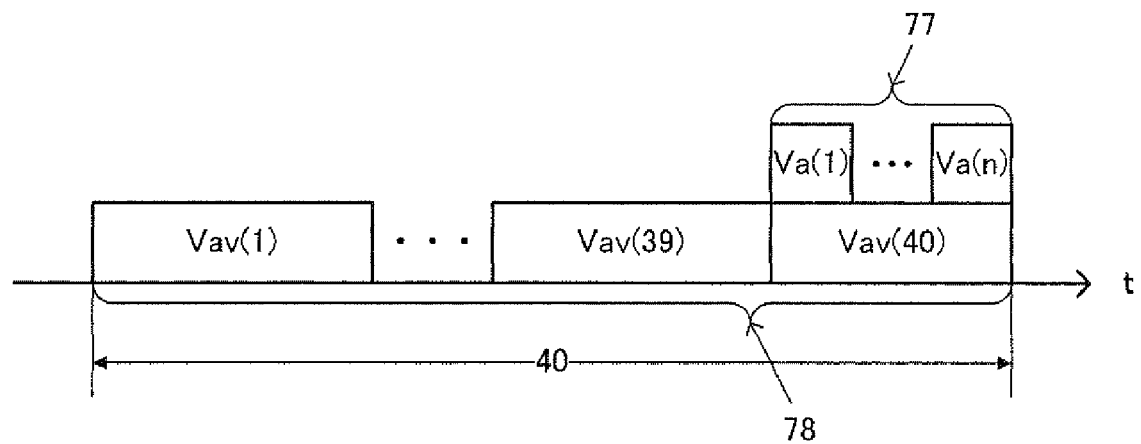
FIG. 22 is a diagram schematically illustrating acceleration history data and block average data used in the long-term average correction process.

Returning to the description of FIG. 15, in step S14, following step S13, the CPU 10 performs the long-term average correction process. The long-term average correction process is a process for correcting the gravitational vector Vg based on an average (overall average vector) of acceleration vectors detected during a relatively long period of time. Referring to FIGS. 21 and 22, the long-term average correction process will be described in detail below.

FIG. 21 is a flowchart illustrating a flow of the long-term average correction process (step S14) shown in FIG. 15. In the long-term average correction process, initially, in step S51, the CPU 10 adds the latest acceleration data to the acceleration history data 77. Specifically, the CPU 10 reads the acceleration data 64 and the acceleration history data 77 from the main memory, and adds the acceleration data 64 being read to the content of the acceleration history data 77. New acceleration history data having the content of the acceleration data 64 added thereto is stored to the main memory. That is, through the process of step S51, the acceleration history data 77 is updated by adding the acceleration data 64 thereto before being stored to the main memory. Following step S51, the process of step S52 is performed.

In step S52, the CPU 10 reads the acceleration history data 77 from the main memory, and calculates an average of one or more detected acceleration vectors indicated by the acceleration history data 77. In the present embodiment, the one or more detected acceleration vectors indicated by the acceleration history data 77 correspond to one or more detected acceleration vectors included in the latest block (see FIG. 22). That is, the process of step S52 is a process for calculating an average (block average vector) of the detected acceleration vectors in the latest block. Following step S52, the process of step S53 is performed.

In step S53, the CPU 10 determines whether or not the number of detected acceleration vectors included in the latest block has reached a predetermined value (in the present embodiment, 40). Specifically, the CPU 10 reads the acceleration history data 77 from the main memory, and determines whether or not the number of detected acceleration vectors indicated by the acceleration history data 77 has reached the predetermined value. When the determination result of step S53 is affirmative, the process of step S54 is performed. On the other hand, when the determination result of step S53 is negative, the process of step S54 is skipped, and the process of step S55 to be described later is performed.

In step S54, the CPU 10 updates each block. Specifically, the CPU 10 deletes the oldest of forty blocks, and adds a new block as the latest block. Concretely, the CPU 10 reads the block average data 78, which indicates a block average vector for each of the forty blocks, from the main memory, and updates the block average data 78 by deleting the oldest of the forty blocks. In addition, the CPU 10 clears the content of the acceleration history data 77. At this point, there will be no detected acceleration vector indicated by the acceleration history data 77, but a new detected acceleration vector will be added in step S51 of the next round. Following step S54, the process of step S55 is performed.

FIG. 22 is a diagram schematically illustrating the acceleration history data and the block average data used in the long-term average correction process. In FIG. 22, the horizontal axis is a temporal axis (t), and rectangles shown on the temporal axis represent block average vectors Vav indicated by the block average data 78. Also, squares shown on the rectangles depicting the block average data 78 represent detected acceleration vectors Va indicated by the acceleration history data 77.

As shown in FIG. 22, one or more detected acceleration vectors Va(1) to Va(n) (where n is an integer from 1 to 40, i.e., 1≦n≦40) indicated by the acceleration history data 77 correspond to one or more detected acceleration vectors included in the latest block. When the latest acceleration data is added to the acceleration history data 77 in step S51, the number of detected acceleration vectors Va(1) to Va(n) shown in FIG. 22 is incremented by 1. Then, a block average vector Vav(40) for the latest block is calculated in step S52. Accordingly, the block average vector Vav(40) for the latest block is not necessarily an average of forty detected acceleration vectors Va. In addition, when it is determined in step S53 that the number of detected acceleration vectors Va(1) to Va(n) has reached forty, each block is updated in step S54. Specifically, the block average vector Vav(1) for the oldest block is deleted.

Then, a block average vector for a new block is calculated in steps S51 and S52 to be executed during the next process loop.

Returning to the description of FIG. 21, in step S55, the CPU 10 rotates each block average vector Vav and each acceleration vector included in the acceleration history data 77 in accordance with the angular rate detected by the gyroscopes 55 and 56. Concretely, the CPU 10 reads the angular rate data 63, the acceleration history data 77, and the block average data 78 stored in the main memory. Thereafter, the block average vector Vav and the acceleration vector included in the acceleration history data 77 are corrected so as to rotate by the magnitude of the angular rate in a direction opposite to the rotation direction of the angular rate. The CPU 10 stores data representing each block average vector Vav subjected to the correction to the main memory as block average data 78, and also updates the acceleration history data 77 based on each acceleration vector included in the acceleration history data 77 subjected to the correction. Here, vector directions indicated by the block average vector Vav and the acceleration vector are expressed with respect to the input device 8 (by the XYZ-coordinate system). Therefore, in order to fix each vector relative to the space (in order to render the direction invariable in the space), it is necessary to reverse the direction of the vector by an angle corresponding to rotation of the input device 8 (it is necessary to make a rotation in a direction opposite to the rotation direction of the input device 8). In this manner, the process of step S55 is a process for correcting vector directions indicated by the block average vector Vav and the acceleration vector in accordance with the current orientation of the input device 8. Following step S55, the process of step S56 is performed.

Note that in the present embodiment, a plurality of acceleration vectors detected during a predetermined period (about eight seconds) are collectively grouped into a block for management, and therefore in step S55, the CPU 10 is simply required to perform a calculation process for vector rotation a number of times corresponding to the number of blocks (i.e., 40). On the other hand, when the same number of detected acceleration vectors are not managed in blocks (i.e., they are stored without grouping), the CPU 10 is required to perform a calculation process for vector rotation on each of about 1,600 detected acceleration vectors (because forty detected acceleration vectors are included in each block). Therefore, in the present embodiment, the detected acceleration vectors are managed in blocks, making it possible to reduce load on the calculation process of step S55. Note that in another embodiment, the number of blocks and the number of acceleration vectors per block may vary, and in particular, when there is no need to reduce load on the calculation process, an average of all detected acceleration vectors may be calculated.

In step S56, the CPU 10 calculates an overall average vector Vall, which is an average of all block average vectors Vav. Specifically, the CPU 10 reads the block average data 78 stored in the main memory. Each block average vector Vav indicated by the block average data 78 is normalized. Furthermore, the CPU 10 calculates an average of the normalized block average vectors Vav as the overall average vector Vall. When calculating the average, each block average vector Vav is weighted in accordance with the number of acceleration vectors included in the block, such that the calculation results in the same as in the case where an average of all detected acceleration vectors is actually calculated. Specifically, for each block (blocks Vav(1) to Vav(39) shown in FIG. 22) other than the latest block, a weight of 40 equivalent to the number of acceleration vectors in the block is assigned, and as for the latest block (the block Vav(40) shown in FIG. 22), a weight is assigned in accordance with the current number of acceleration vectors in the block (in FIG. 22, the number of acceleration vectors is n, hence a weight of n). Thereafter, data representing the calculated overall average vector Vall is stored to the main memory as overall average data 69. Following step S56, the process of step S57 is performed.

In step S57, the CPU 10 corrects the gravitational vector Vg so as to approach the overall average vector Vall. Concretely, the CPU 10 reads from the main memory the gravitational direction data 69 representing the gravitational vector Vg and the overall average data 79 representing the overall average vector Vall. Thereafter, the gravitational vector Vg is corrected so as to approach the overall average vector Vall by a predetermined rate C3. The correction can be performed by the same method as in step S27. Specifically, when an angle between the pre-correction gravitational vector Vg and the overall average vector Vall is θ3 [deg], the CPU 10 calculates a post-correction gravitational vector Vg' by rotating the pre-correction gravitational vector Vg by "C3·θ3[deg]" in a direction of the overall average vector Vall. Note that as in step S27, any method can be employed to calculate the post-correction gravitational vector Vg'. In another embodiment, the post-correction gravitational vector Vg' may be obtained by, for example, calculating and normalizing a vector having an end point at which a line segment connecting from an end point of the pre-correction gravitational vector Vg to an end point of the overall average vector Vall is internally divided at a ratio of C3:(1−C3).

Note that in the present embodiment, the predetermined rate C3 for step S57 is set to be lower than both the maximum value of the first correction rate A for the static correction process and the maximum value of the second correction rate B for the dynamic correction process. For example, while the maximum values of the first and second correction rates A and B are "0.03" (see equation (4) in step S26 for the first correction rate A and step S31 for the second correction rate B), the predetermined rate C3 is set to "0.001". On the one hand, the long-term average correction process is a process for performing correction regardless of the kinetic state of the input device 8, and on the other hand it is characterized in that, due to a motion applied to the acceleration sensor during a period in which an average calculation is carried out, a motion acceleration during that period might not be completely cancelled out or some error might occur. Specifically, on the one hand, it is possible to constantly perform correction which is reliable to some extent, and on the other hand, the process is not suitable for strict correction. Therefore, in the present embodiment, the predetermined rate C3 is set to be lower than the maximum values of the first and second correction rates A and B, so that the long-term average correction process is used as a supplementary to the static correction process and the dynamic correction process. As a result, when the long-term average correction process results in inaccurate correction, the correction is prevented from being deeply reflected in the orientation of the input device 8. Thus, the game apparatus 3 makes it possible to accurately correct/calculate the orientation of the input device 8 in various situations.

Data representing the post-correction gravitational vector Vg obtained by the process of step S57 is stored to the main memory as gravitational direction data 69. Thus, the gravitational vector Vg is corrected in the long-term average correction process. Following step S57, the CPU 10 ends the long-term average correction process.

Returning to the description of FIG. 15, in step S15, following step S14, the CPU 10 calculates a correction matrix Ma based on the gravitational vector corrected by the static correction process, the dynamic correction process, and the long-term average correction process. The correction matrix Ma is a rotation matrix for correcting the first orientation of the input device 8. Concretely, the correction matrix Ma is a rotation matrix for rotating the gravitational direction determined by the current first orientation of the input device 8 so as to coincide with the direction represented by the gravitational vector Vg corrected by the static correction process, the dynamic correction process, and the long-term average correction process. Here, the gravitational direction determined by the current first orientation of the input device 8 is represented by a vector obtained by converting the gravitational direction (0,−1,0) in the space coordinate system into the controller coordinate system, i.e., a vector (−Xy,−Yy,−Zy) obtained by rotating the direction (0,−1,0) by the first orientation matrix M1 (see equation (1)).

Concretely, in the process of step S15, the CPU 10 initially reads the first orientation data 68 stored in the main memory, and calculates a vector Vh by converting the gravitational direction (0,−1,0) in the space coordinate system into the controller coordinate system using the first orientation matrix M1 represented by the first orientation data 68. Next, the CPU 10 reads the gravitational direction data 69 stored in the main memory, and calculates as a correction matrix Ma a rotation matrix for rotating the vector Vh so as to coincide with the gravitational vector Vg represented by the gravitational direction data 69. The calculated correction matrix Ma is stored to the main memory as correction matrix data 76. Following step S15, the process of step S16 is performed.

In step S16, the CPU 10 corrects the first orientation (first orientation matrix M1) of the input device 8 using the correction matrix Ma. Concretely, the first orientation data 68 and the correction matrix data 76 stored in the main memory are read, and the pre-correction first orientation matrix M1 represented by the first orientation data 68 is rotated using the correction matrix Ma represented by the correction matrix data 76, thereby calculating a post-correction first orientation matrix M1'. At this time, the CPU 10 may multiply the correction matrix Ma by a predetermined constant C2, thereby adjusting the amount of correction. The constant C2 is preset in the range of $0 < C2 \leq 1$, e.g., C2=0.3. Data representing the post-correction first orientation matrix M1' is stored to the main memory as new first orientation data 68. In this manner, by step S16, the first orientation of the input device 8 is corrected in the acceleration-based correction process. Following step S16, the CPU 10 ends the acceleration-based correction process.

As described above, in the acceleration-based correction process, the gravitational direction is corrected by the static correction process (step S12), the dynamic correction process (step S13), and the long-term average correction process (step S14), and the first orientation of the input device 8 is corrected based on the post-correction gravitational direction. In this manner, by performing both the static correction process and the dynamic correction process, the first orientation can be corrected based on a detection result by the acceleration sensor 37 regardless of whether the input device 8 is either at rest or in motion.

Also, in the present embodiment, the long-term average correction process (step S14) is performed in addition to the static correction process and the dynamic correction process. In the static correction process and the dynamic correction process, the rate at which the correction is reflected in the orientation of the input device 8 varies in accordance with the kinetic state of the input device 8. Therefore, neither the static correction process nor the dynamic correction process might be performed depending on the kinetic state of the input device 8 (e.g., when the jerk J is constantly high), or even if either is performed, it might be inaccurate. On the other hand, the correction by the long-term average correction process is reflected in the orientation of the input device 8 always at a constant rate regardless of the kinetic state of the input device 8. Accordingly, by performing the long-term average correction process, it becomes possible to constantly correct the orientation of the input device 8 even if neither the static correction process nor the dynamic correction process is performed. That is, the long-term average correction process makes it possible to increase opportunities to correct the orientation of the input device 8, so that the orientation (gravitational direction) of the input device 8 can be more accurately calculated.

Also, in the present embodiment, the game apparatus 3 performs two acceleration-based correction processes for the gravitational direction (the orientation of the input device 8) calculated from the angular rate, one being a correction process using a gravitational direction calculated based on acceleration data obtained during a relatively short period of time, the other being a correction process (long-term average correction process) using a gravitational direction calculated based on (plural pieces of) acceleration data obtained during a relatively long period of time. The former process is either the static correction process using as the gravitational direction the direction of an acceleration represented by the latest acceleration data or the dynamic correction process using a gravitational direction estimated from the latest angular rate data and the acceleration data based on a predefined relationship between the acceleration and the angular rate. On the other hand, the latter process is the long-term average correction process using as the gravitational direction the direction of an average acceleration during a predetermined period. In this manner, the game apparatus 3 of the present embodiment employs a plurality of different methods to calculate different gravitational directions from acceleration data. Furthermore, the ratio (proportion) at which to reflect such a gravitational direction in the correction is changed in accordance with the status (kinetic state) of the input device 8. Thus, it is possible to correct the gravitational direction (orientation) of the input device 8 in various situations.

Returning to the description of FIG. 14, in step S6, following step S5, the CPU 10 performs the correction process based on a pickup image. The correction process based on a pickup image is a process for correcting the first orientation of the input device 8 using the marker coordinate data obtained from a pickup image. Hereinafter, the correction process based on a pickup image will be described in detail with reference to FIG. 23.

Figure 23:
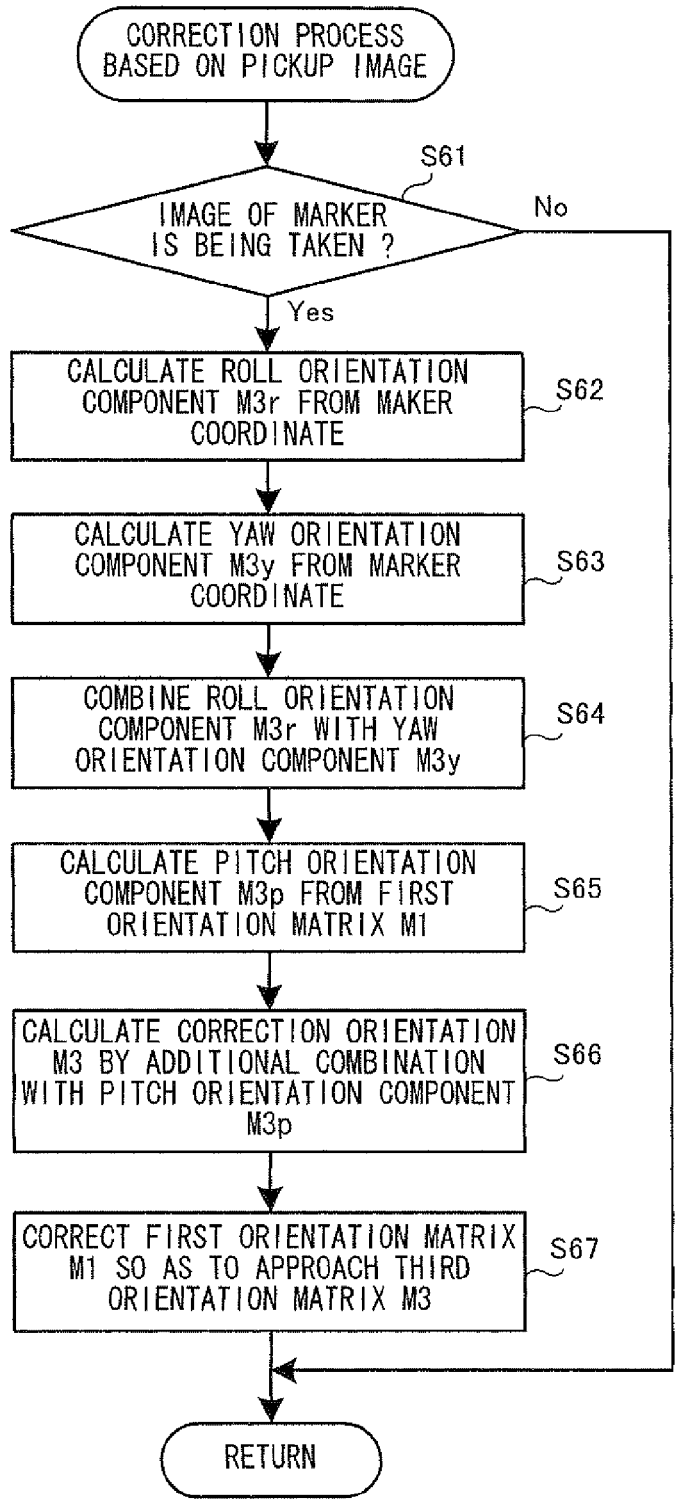
FIG. 23 is a flow chart showing a flow of a correction process based on a pickup image (step S6) shown in FIG. 14.

FIG. 23 is a flow chart showing a flow of the correction process based on a pickup image (step S6) shown in FIG. 14. In the correction process based on a pickup image, firstly, in step S61, the CPU 10 determines whether or not an image of the marker section 6 is taken by the image pickup means (the image pickup element 40) of the input device 8. The determination of step S61 can be performed by referring to the marker coordinate data 65 stored in the main memory. When the marker coordinate data 65 represents two marker coordinate points, it is determined that the image of the marker section 6 is taken, and when the marker coordinate data 65 only represents one marker coordinate point, or when the marker coordinate point is not obtained, it is determined that the image of the marker section 6 is not taken. When the determination result of step S61 is affirmative, the processes of subsequent steps S62 to S67 are performed. On the other hand, when the determination result of step S61 is negative, the processes of subsequent steps S62 to S67 are skipped, and the CPU 10 ends the correction process based on a pickup image. Thus, when the image of the marker section 6 is not taken by the image pickup element 40, the orientation of the input device 8 cannot be calculated using data obtained from the image pickup element 40. Therefore, in this case, the correction is not made in the correction process based on a pickup image.

In step S62, the CPU 10 calculates the roll orientation component M3$r$ based on the marker coordinate data. The roll orientation component M3$r$ is calculated based on the direction of the marker section 6 in the pickup image, that is, based on a tilt of a line connecting between two marker coordinate points represented by the marker coordinate data 65. Hereinafter, an exemplary method for calculating the roll orientation component M3$r$ will be described with reference to FIG. 24.

Figure 24:
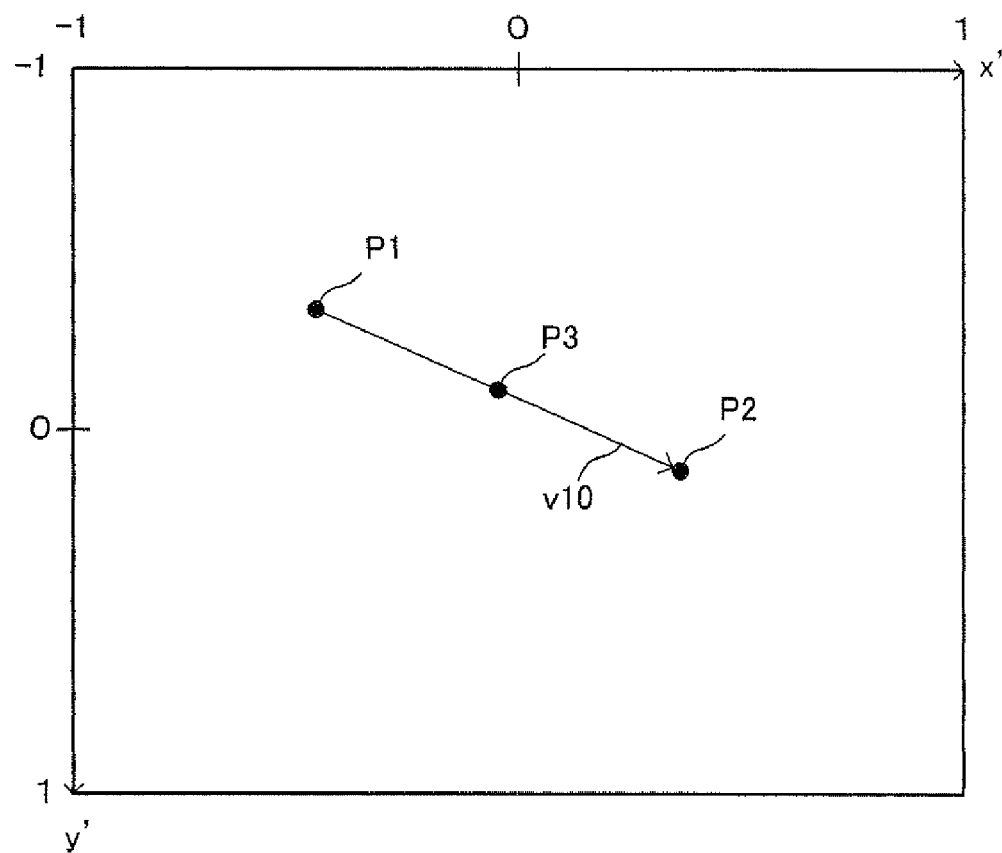
FIG. 24 is a diagram illustrating a two-dimensional coordinate point corresponding to a pickup image.

FIG. 24 is a diagram illustrating a two-dimensional coordinate system for the pickup image. As shown in FIG. 24, in the present embodiment, in a two-dimensional coordinate system (x'y' coordinate system) for representing positions in the pickup image, the range of the pickup image is represented so as to satisfy $-1 \leq x' \leq 1$, and $-1 \leq y' \leq 1$. In the x'y' coordinate system, when the input device 8 is in the reference orientation (an orientation in which the imaging direction of the input device 8 is toward the center of the marker section 6, and the button surface of the controller 5 is oriented to the vertically upward direction), the vertically downward direction in the pickup image corresponds to the y'-axis positive direction, and the rightward direction therein corresponds to the x'-axis positive direction. Further, a point P1 and a point P2 shown in FIG. 24 represent marker coordinate positions, and a point P3 is a middle point between the point P1 and the point P2. The vector v10 shown in FIG. 24 is a vector starting from the point P1 and ending at the point P2.

In order to calculate the roll orientation component M3$r$, the CPU 10 firstly reads the marker coordinate data 65, and calculates the vector v10 based on the two marker coordinate points represented by the marker coordinate data 65. Further, a vector (hx,hy) obtained by normalizing the vector v10 is calculated. The vector (hx,hy) represents the x'-axis positive direction when the input device 8 is in the reference orientation, and changes its direction in accordance with the input device 8 rotating in the roll direction. The vector (hx,hy) represents the orientation associated with the roll direction, and the roll orientation component M3$r$ can be calculated based on the vector (hx,hy). Specifically, the CPU 10 calculates the roll orientation component M3$r$ in accordance with equation (16) as follows.

$$M2r = \begin{bmatrix} hx & -hy & 0 \\ hy & hx & 0 \\ 0 & 0 & 1 \end{bmatrix} \quad (16)$$

Data representing a matrix calculated in accordance with equation (16) is stored to the main memory as the roll orientation component data 80. Following step S62, the process of step S63 is performed.

In step S63, the CPU 10 calculates the yaw orientation component M3$y$ based on the marker coordinate data. The yaw orientation component M3$y$ is calculated based on the direction and the position of the marker section 6 in the pickup image. Hereinafter, an exemplary method for calculating the yaw orientation component M3$y$ will be described with reference to FIG. 24.

Firstly, the CPU 10 reads the marker coordinate data 65, and calculates a middle point between the two marker coordinate points represented by the marker coordinate data 65. In the present embodiment, the middle point represents the position of the marker section 6. Further, the CPU 10 calculates a coordinate point (px,py) by rotating a coordinate point representing the calculated middle point, by a rotation angle associated with the roll direction of the input device 8, around the origin of the x'y' coordinate system (in the direction opposite to the rotation direction of the input device 8). In other words, the coordinate point representing the middle point is rotated around the origin such that the vector (hx,hy) represents the x-axis positive direction. When the input device 8 and the marker section 6 are positioned at the same lateral (the x-axis direction) position (that is, the input device 8 is in front of the marker section 6), the orientation associated with the yaw direction can be calculated from the coordinate point (px,py) obtained through the rotation described above.

Next, the CPU 10 calculates the rotation angle θy associated with the yaw direction based on the coordinate point (px,py) obtained by rotating the middle point, and an angle (limit angle) θy', in the yaw direction, which is obtained when the marker section 6 is at the edge in the x'-axis direction. The limit angle θy' and an x-coordinate value px' which corresponds to the limit angle θy' and is obtained by rotating the middle point, can be obtained in advance. Therefore, the rotation angle θy associated with the yaw direction can be calculated taking advantage of equality between the ratio of px to px' and the ratio θy to θy'. Specifically, the rotation angle θy associated with the yaw direction can be calculated using equation (17) as follows.

$$\theta y = px \times \theta y' / px' \quad (17)$$

When the length of the marker section 6 in the lateral direction is not considered, the limit angle θy' may be ½ of the angle of view of the controller 5, and the value of the px' may be "1".

Finally, the CPU 10 calculates, as the yaw orientation component M3$y$, the rotation matrix for performing rotation by the angle θy calculated using equation (17). Specifically, the yaw orientation component M3$y$ is calculated in accordance with equation (18) as follows.

$$M2y = \begin{bmatrix} \cos\theta y & 0 & -\sin\theta y \\ 0 & 1 & 0 \\ \sin\theta y & 0 & \cos\theta y \end{bmatrix} \quad (18)$$

Data representing the matrix calculated in accordance with equation (18) is stored to the main memory as the yaw orientation component data 81. Following step S63, the process of step S64 is performed.

In step S64, the CPU 10 combines the roll orientation component M3$r$ with the yaw orientation component M3$y$. That is, the roll orientation component data 80 and the yaw orientation component data 81 are read from the main memory, and multiplies the roll orientation component M3$r$ represented by the data 80, by the yaw orientation component M3$y$ represented by the data 81. Following step S64, the process of step S65 is performed.

In step S65, the CPU 10 calculates the pitch orientation component M3$p$ based on the first orientation. It is possible to calculate the pitch orientation component M3$p$ based on the y-coordinate value of the coordinate point (px,py) in the same manner as that used for the yaw orientation component M3$y$ although the manner is not used in the present embodiment. However, the method for calculating the orientation in the yaw direction (the pitch direction) using the coordinate point (px,py) can be used when the input device 8 and the marker section 6 are positioned at the same lateral (vertical in the case of the pitch direction) position. In the game system 1 of the present embodiment, the player may operate the input device 8 almost straight in front of the marker section 6 (the television 2) in the lateral direction, and therefore it is possible to calculate the orientation in the yaw direction in the manner used in step S63 based on the assumption that "the input device 8 and the marker section 6 are positioned on the same lateral position". On the other hand, the player may stand or sit to operate the input device 8, and further the marker section 6 may be positioned above or below the screen of the television 2. Therefore, in the game system 1 of the present embodiment, it is not always assumed that "the input device 8 and the marker section 6 are positioned at the same vertical position", and therefore the orientation in the pitch direction may not necessarily be calculated using the coordinate point (px,py).

In the present embodiment, the orientation after the acceleration-based correction (step S5) is used as it is for the pitch orientation component M3p (therefore, in the correction process based on a pickup image, no correction is made for the pitch direction). Specifically, the CPU 10 reads the first orientation data 68 from the main memory. The rotation angle θp associated with the pitch direction is calculated in accordance with equation (19) using components of the first orientation matrix M1 represented by the first orientation data 68.

$$\cos(\theta p)=(Zx \times Zx+Zz \times Zz)^{1/2}$$

$$\sin(\theta p)=Zy \qquad (19)$$

Variables Zx, Zy, and Zz in equation (19) represent the components of the first orientation matrix M1 represented in equation (1). The first orientation matrix M1 used here is the first orientation matrix M1 obtained through the acceleration-based correction process (step S5) performed in the current process loop. Further, the CPU 10 calculates a matrix of the pitch orientation component M3p using cos(θp) and sin(θp) calculated in equation (19), in accordance with equation (20).

$$M2p = \begin{bmatrix} 1 & 0 & 0 \\ 0 & \cos\theta p & \sin\theta p \\ 0 & -\sin\theta p & \cos\theta p \end{bmatrix} \qquad (20)$$

Data representing the matrix calculated by equation (20) is stored to the main memory as the pitch orientation component data 82. Following step S65, the process of step S66 is performed.

In step S66, the CPU 10 calculates the third orientation matrix M3 based on the orientation components of the roll direction, the yaw direction, and the pitch direction. The third orientation matrix M3 is obtained by further combining the pitch orientation component M3p with the combination result of the roll orientation component M3r and the yaw orientation component M3y. Specifically, the CPU 10 reads the pitch orientation component data 82 from the main memory, and multiplies the matrix calculated in step S64 by the pitch orientation component M3p represented by the pitch orientation component data 82. Data representing the resultant third orientation matrix M3 is stored to the main memory as the third orientation data 83. Following step S66, the process of step S67 is performed.

In step S67, the CPU 10 corrects the first orientation (first orientation matrix M1) of the input device 8 using the third orientation matrix M3. The correction of step S67 is made such that the first orientation matrix M1 approaches the third orientation matrix M3 at a predetermined rate (constant C4 described below). The CPU 10 reads the first orientation data 68 and the third orientation data 83 from the main memory. The correction is made using the first orientation matrix M1 represented by the first orientation data 68 and the third orientation matrix M3 represented by the third orientation data 83, in accordance with equation (21).

$$M1=(M3-M1') \times C4+M1' \qquad (21)$$

In equation (21), variable M1' represents an uncorrected first orientation matrix. Further, constant C4 is preset to a value in the range of 0<C4≦1, for example, 0.1. Data representing the corrected first orientation matrix M1 calculated in accordance with equation (21) is stored to the main memory as an update to the first orientation data 68. Following step S67, the CPU 10 ends the correction process based on a pickup image.

As described above, in the correction process based on a pickup image, the third orientation is calculated based on a pickup image, and the first orientation obtained based on an angular rate is corrected so as to approach the third orientation. Through this correction, the first orientation can be corrected so as to represent a more accurate value. Although in the present embodiment the third orientation only associated with the roll direction and the yaw direction is calculated from the pickup image, the third orientation associated with the pitch direction can be calculated from the pickup image as described above, and, in another embodiment, the third orientation associated with the roll direction, the yaw direction, and the pitch direction may be calculated from the pickup image. Further, in the correction process based on a pickup image, the third orientation associated with at least one of the roll direction, the yaw direction, and the pitch direction may be calculated.

Note that in another embodiment, the correction process based on a pickup image may be performed only when the input device 8 is estimated to have taken an image of the marker section 6. Concretely, before performing the correction process based on a pickup image, the CPU 10 determines whether or not the input device 8 (image pickup means) is oriented in a direction allowing an image of the marker section 6 to be taken. This determination can be made based on an orientation obtained before performing the correction process based on a pickup image. For example, a determination may be made regarding whether the orientation is the same as or opposite to the imaging direction of the input device 8, i.e., the direction from the input device 8 to the marker section 6. Also, the orientation used for the determination may be a final orientation obtained by the previous process loop or may be an orientation obtained by the acceleration-based correction process during the current process loop.

When the CPU 10 determines that the input device 8 is oriented to the direction in which an image of the marker section 6 can be taken, the correction process based on a pickup image is performed, and when the CPU 10 determines that the input device 8 is not oriented to the direction in which an image of the marker section 6 can be taken, the correction process based on a pickup image is skipped. Some entity other than the marker section 6 (for example, electric light in a room, or sunlight outside a window) may be erroneously detected as the marker section 6, and when the third orientation is calculated using a marker coordinate point obtained through such erroneous detection, and the correction process is performed using such a third orientation, the correction cannot be accurately performed. On the other hand, when the determination process as described above is performed, it is possible to prevent the correction process from being performed using the third orientation calculated from the marker coordinate point having been erroneously detected. Therefore, the correction process based on a pickup image can be accurately performed.

Returning to the description of FIG. 14, in step S7, following step S6, the CPU 10 performs the game process using the corrected orientation (first orientation matrix M1) of the input device 8. In the present embodiment, a process for controlling the orientation of a canoe paddle positioned within the game space in accordance with the orientation of the input device 8 is performed. Furthermore, a process for moving the canoe in accordance with a motion of the paddle is performed. Note that in another embodiment, this game process may be any process so long as the first orientation matrix M1 representing the corrected orientation of the input device 8 is reflected in game results as an input value. For example, in the process, an object in a virtual game space may be controlled and displayed such that the object has an orientation represented by the first orientation matrix M1, or such that the object is moved at a rate corresponding to an angle between a predetermined orientation and the orientation represented by the first orientation matrix M1. Following step S7, the process of step S8 is performed.

In step S8, the CPU 10 determines whether or not the game is to be ended. The determination of step S8 is performed based on, for example, whether or not the game has been cleared, whether or not the game is over, or whether or not the player has given an instruction to stop the game. When the determination result of step S8 is negative, the process of step S3 is performed again. Thereafter, the process loop of steps S3 to S8 is repeated until it is determined in step S8 that the game is to be ended. On the other hand, when the determination result of step S8 is affirmative, the CPU 10 ends the game process shown in FIG. 14. This is the end of the description of the game process.

As described above, in the present embodiment, the first orientation of the input device 8 is calculated based on the angular rates detected by the gyroscopes 55 and 56 (step S4), and the first orientation is corrected in the acceleration-based correction process (S5) and the correction process based on a pickup image (S6). The game process is performed using the corrected first orientation (step S7), and therefore the CPU 10 is allowed to perform the game process based on an accurate orientation of the input device 8. Therefore, for example, the orientation of the input device 8 can be accurately reflected in the orientation of an object in a game space, thereby enhancing the operability of the game.

[Variants]

Note that in the above embodiment, the gravitational vector corrected by the dynamic correction process is used for correcting the orientation of the input device 8 calculated based on an angular rate detected by the gyroscopes 55 and 56. That is, in the game apparatus 3 of the above embodiment, the first orientation of the input device 8 calculated prior to the dynamic correction process is corrected based on the gravitational vector, thereby calculating the orientation of the input device 8. Here, the gravitational vector does not have to be used for correcting the previously calculated orientation, and the gravitational vector may be used for calculating the orientation of the input device 8. For example, in another embodiment, the game apparatus 3 allows the orientation of the input device 8 to be calculated by the following processes (1) to (4).

(1) A gravitational vector Vg is calculated based on a detected acceleration vector Va (the detected acceleration vector Va being converted into the gravitational vector Vg).

(2) A motion acceleration vector VA is calculated based on the gravitational vector Vg and the detected acceleration vector Va, as in step S24.

(3) The gravitational vector Vg is corrected as in the dynamic correction process.

(4) An orientation of the input device 8 corresponding to the corrected gravitational vector Vg is calculated. According to the processes (1) to (4), the orientation of the input device 8 can be calculated based on the gravitational vector corrected by the dynamic correction process without the need to calculate in advance the orientation of the input device 8 based on the angular rate detected by the gyroscopes 55 and 56, etc.

Also, in the above embodiment, the gravitational vector to be corrected in the dynamic correction process is calculated based on the first orientation calculated from the angular rate data 63. Here, in another embodiment, a gravitational vector to be corrected in the dynamic correction process may be calculated based on outputs (i.e., operation data) from various sensors included in the input device 8, e.g., the gravitational vector may be calculated based on the detected acceleration vector Va, as in the process (1). Furthermore, any method can be employed to calculate the gravitational vector to be corrected in the dynamic correction process so long as the correction is performed in a manner different from the dynamic correction process.

Also, in the above embodiment, a gravitational direction (gravitational vector) is calculated, and thereafter an orientation of the input device 8 is calculated based on the calculated gravitational direction. Here, the gravitational direction represents an orientation of the input device 8, and therefore in another embodiment, an orientation does not have to be calculated in addition to the gravitational direction, and the gravitational direction (gravitational vector) itself may be used as the orientation of the input device 8.

As described above, example embodiments of the present invention are intended to, for example, accurately calculate an orientation of an input device using a gyroscope, and can be used as, for example, a game apparatus or program in which the game process is performed in accordance with the orientation of the input device.

While the invention has been described in detail, the foregoing description is in all aspects illustrative and not restrictive. It is understood that numerous other modifications and variations can be devised without departing from the scope of the invention.

What is claimed is:

1. An orientation calculation apparatus for calculating an orientation of an input device based on operation data acquired from the input device, the input device including at least an angular rate sensor and an acceleration sensor, the operation data including angular rate data and acceleration data, the apparatus comprising:

a gravitational direction calculation unit configured to calculate based on the operation data a gravitational vector representing a gravitational direction viewed from the input device;

a motion acceleration calculation unit configured to calculate a motion acceleration vector based on an acceleration represented by the acceleration data and the gravitational vector, wherein the motion acceleration vector represents an acceleration applied by a motion of the input device;

a first correction unit configured to correct the gravitational vector such that the motion acceleration vector approaches a motion acceleration satisfying a relationship with the angular rate represented by the angular rate data, the relationship being predefined between the motion acceleration and the angular rate for the input device making a predetermined motion; and a first orientation unit configured to calculate an orientation of the input device corresponding to the gravitational vector corrected by the first correction unit.

2. The orientation calculation apparatus according to claim 1, further comprising a second orientation calculation unit configured to calculate an orientation of the input device from the angular rate data, wherein, the gravitational direction calculation unit is configured to calculate the gravitational vector based on the orientation calculated by the second orientation calculation unit, and the first orientation calculation unit is configured to correct the orientation calculated by the second orientation calculation unit, based on the gravitational vector corrected by the first correction unit, thereby calculating the orientation of the input device.

3. The orientation calculation apparatus according to claim 1, wherein, the predetermined motion is a rotational motion about a predetermined position, and the first correction unit includes:

a perpendicular vector calculation unit configured to calculate based on the angular rate data a perpendicular vector perpendicular to a direction of the motion acceleration of the input device making the rotational motion; and a vector correction unit configured to correct the gravitational vector based on the relationship between the motion acceleration and the angular rate of the input device, the relationship exhibiting the motion acceleration vector perpendicular to the perpendicular vector.

4. The orientation calculation apparatus according to claim 3, wherein the perpendicular vector calculation unit is configured to calculate an angular acceleration based on a transition of the angular rate data acquired from the input device, and also calculate the perpendicular vector based on the angular rate represented by the angular rate data and the angular acceleration.

5. The orientation calculation apparatus according to claim 3, wherein, the predetermined motion is a rotational motion about the predetermined position at a constant angular rate, and the perpendicular vector calculated by the perpendicular vector calculation unit is an angular rate vector representing a central axis of the rotational motion.

6. The orientation calculation apparatus according to claim 3, wherein the vector correction unit is configured to correct the gravitational vector such that an inner product of the perpendicular vector and the motion acceleration vector is reduced.

7. The orientation calculation apparatus according to claim 3, wherein the first correction unit is configured to correct the gravitational vector such that the lower the amount of correction of the gravitational vector is, the lower the angular rate is represented by the angular rate data.

8. The orientation calculation apparatus according to claim 7, further comprising a second correction unit configured to correct the gravitational vector so as to approach a direction of the acceleration represented by the acceleration data, wherein, the second correction unit is configured to correct the gravitational vector such that the lower the amount of correction of the gravitational vector is, the higher the angular rate is represented by the angular rate data, and the first orientation calculation unit is configured to calculate the orientation of the input device based on the gravitational vector corrected by the first correction unit and the second correction unit.

9. The orientation calculation apparatus according to claim 3, wherein the first correction unit is configured to correct the gravitational vector such that the lower the amount of correction of the gravitational vector is, the higher the amount of change per unit time for the acceleration is represented by the acceleration data.

10. The orientation calculation apparatus according to claim 1, wherein the first correction unit is configured to correct the gravitational vector so as to rotate in such a direction that, when the gravitational vector is rotated by a predetermined angle, a motion acceleration vector calculated from a post-rotation gravitational vector approaches closest to the motion acceleration satisfying the predefined relationship with the angular rate represented by the angular rate data.

11. The orientation calculation apparatus according to claim 1, further comprising a second correction unit configured to correct the gravitational vector so as to approach a direction of the acceleration represented by the acceleration data, wherein the first orientation calculation unit is configured to calculate the orientation of the input device based on the gravitational vector corrected by the first correction unit and the second correction unit.

12. The orientation calculation apparatus according to claim 11, wherein the second correction unit is configured to correct the gravitational vector such that the lower the amount of correction of the gravitational vector is, the higher the angular rate is represented by the angular rate data.

13. The orientation calculation apparatus according to claim 11, wherein the second correction unit is configured to correct the gravitational vector such that the lower the amount of correction of the gravitational vector is, the higher the amount of change per unit time for the acceleration is represented by the acceleration data.

14. A non-transitory computer-readable storage medium containing instructions stored therein for causing a computer system to perform operation in an orientation calculation apparatus for calculating an orientation of an input device based on operation data acquired from the input device, the input device including at least an angular rate sensor and an acceleration sensor, the operation data including angular rate data and acceleration data, the operation comprising:

a gravitational direction calculation including calculating based on the operation data a gravitational vector representing a gravitational direction viewed from the input device;

a motion acceleration calculation including calculating a motion acceleration vector based on an acceleration represented by the acceleration data and the gravitational vector, wherein the motion acceleration vector represents an acceleration applied by a motion of the input device;

a first correction including correcting the gravitational vector such that the motion acceleration vector approaches a motion acceleration satisfying a relationship with the angular rate represented by the angular rate data, the relationship being predefined between the motion acceleration and the angular rate for the input device making a predetermined motion; and a first orientation calculation including calculating the orientation of the input device based on the gravitational vector corrected by the first correction.

15. The non-transitory computer-readable storage medium according to claim 14, wherein the operatic further comprises a second orientation calculation including calculating the orientation of the input device from the angular rate data, the gravitational direction calculation includes calculating the gravitational vector based on the orientation calculated by the second orientation calculation, and the first orientation calculation includes correcting the orientation calculated by the second orientation calculation, based on the gravitational vector corrected by the first correction, thereby calculating the orientation of the input device.

16. The non-transitory computer-readable storage medium according to claim 14, wherein, the predetermined motion is a rotational motion about a predetermined position, and the first correction includes:

a perpendicular vector calculation including calculating based on the angular rate data a perpendicular vector perpendicular to a direction of the motion acceleration of the input device making the rotational motion; and a vector correction including correcting the gravitational vector based on the relationship between the motion acceleration and the angular rate of the input device, the relationship exhibiting the motion acceleration vector perpendicular to the perpendicular vector.

17. The non-transitory computer-readable storage medium according to claim 16, wherein the perpendicular vector calculation includes calculating an angular acceleration based on a transition of the angular rate data acquired from the input device, and also calculating the perpendicular vector based on the angular rate represented by the angular rate data and the angular acceleration.

18. The non-transitory computer-readable storage medium according to claim 16, wherein, the predetermined motion is a rotational motion about the predetermined position at a constant angular rate, and the perpendicular vector calculated by the perpendicular vector calculation is an angular rate vector representing a central axis of the rotational motion.

19. The non-transitory computer-readable storage medium according to claim 16, wherein the vector correction includes correcting the gravitational vector such that an inner product of the perpendicular vector and the motion acceleration vector is reduced.

20. The non-transitory computer-readable storage medium according to claim 16, wherein the first correction includes correcting the gravitational vector such that the lower the amount of correction of the gravitational vector is, the lower the angular rate is represented by the angular rate data.

21. The non-transitory computer-readable storage medium according to claim 20, wherein, the operation further comprises a second correction including correcting the gravitational vector so as to approach a direction of the acceleration represented by the acceleration data, the second correction includes correcting the gravitational vector such that the lower the amount of correction of the gravitational vector is, the higher the amount of change per unit time for the acceleration is represented by the acceleration data, and the first orientation calculation includes calculating the orientation of the input device based on the gravitational vector corrected by the first correction and the second correction.

22. The non-transitory computer-readable storage medium according to claim 16, wherein the first correction includes correcting the gravitational vector such that the lower the amount of correction of the gravitational vector is, the higher the amount of change per unit time for the acceleration is represented by the acceleration data.

23. The non-transitory computer-readable storage medium according to claim 14, wherein the first correction includes correcting the gravitational vector so as to rotate in such a direction that, when the gravitational vector is rotated by a predetermined angle, a motion acceleration vector calculated from a post-rotation gravitational vector approaches closest to the motion acceleration satisfying the predefined relationship with the angular rate represented by the angular rate data.

24. The non-transitory computer-readable storage medium according to claim 14, wherein, the operation further comprises a second correction including correcting the gravitational vector so as to approach a direction of the acceleration represented by the acceleration data, and the first orientation calculation includes calculating the orientation of the input device based on the gravitational vector corrected by the first correction and the second correction.

25. The non-transitory computer-readable storage medium according to claim 24, wherein the second correction includes correcting the gravitational vector such that the lower the amount of correction of the gravitational vector is, the higher the angular rate is represented by the angular rate data.

26. The non-transitory computer-readable storage medium according to claim 24, wherein the second correction includes correcting the gravitational vector such that the lower the amount of correction of the gravitational vector is, the higher the amount of change per unit time for the acceleration is represented by the acceleration data.

27. An orientation calculation apparatus for sequentially calculating a gravitational vector representing a gravitational direction viewed from an input device based on angular rate data and acceleration data sequentially acquired from the input device, the input device including at least an angular rate sensor and an acceleration sensor, the apparatus comprising:

a computer processing system, including at least one computer processor, configured to:

calculate the gravitational vector based on an angular rate represented by the angular rate data;

perform a first correction for correcting the gravitational vector so as to approach at a first rate an acceleration vector represented by the acceleration data;

perform a second correction for correcting the gravitational vector so as to approach at a second rate a gravitational direction estimated based on a relationship between the acceleration data and the angular rate data, the relationship being predefined for the input device making a predetermined motion; and perform a third correction for correcting the gravitational vector so as to approach at a third rate an average of acceleration vectors during a predetermined period.

28. The orientation calculation apparatus according to claim 27, wherein the first correction sets the first rate such that the higher the first rate is, the closer the magnitude of the acceleration represented by the acceleration data is to the magnitude of the gravitational acceleration.

29. The orientation calculation apparatus according to claim 27, wherein the computer processing system is further configured to calculate a motion acceleration vector based on the acceleration data and the gravitational vector, the motion acceleration vector representing an acceleration applied by a motion of the input device, wherein,
the second correction corrects the gravitational vector so as to approach at the second rate a gravitational vector allowing the predefined relationship to be satisfied between the angular rate represented by the angular rate data and the motion acceleration vector.

30. The orientation calculation apparatus according to claim 27, wherein the third correction sets the third rate to a value lower than maximum values of the first and second rates.

31. The orientation calculation apparatus according to claim 27, wherein,
the first correction changes the first rate in accordance with at least one of the acceleration data and the angular rate data;
the second correction changes the second rate in accordance with at least one of the acceleration data and the angular rate data; and
the third correction sets the third rate as a fixed value.

32. The orientation calculation apparatus according to claim 27, further comprising:
acceleration data storage memory for sequentially storing acquired acceleration data; and
wherein the computer processing system is further configured to calculate a block average vector being an average of acceleration vectors represented by a block of acceleration data, the block comprising plural pieces of acceleration data, wherein,
the third correction corrects the gravitational vector so as to approach at the third rate an overall average vector being an average of block average vectors for a predetermined number of blocks in reverse chronological order.

33. The orientation calculation apparatus according to claim 32, wherein the computer processing system is further configured to update each of the block average vectors by rotating the block average vector in a direction opposite to the angular rate represented by the angular rate data, wherein,
the third correction calculates the overall average vector based on the block average vectors updated by the updating.

34. A non-transitory computer-readable storage medium containing computer instructions stored therein for causing a computer system to perform operation in an orientation calculation apparatus for sequentially calculating a gravitational vector representing a gravitational direction viewed from an input device based on angular rate data and acceleration data sequentially acquired from the input device, the input device including at least an angular rate sensor and an acceleration sensor, the operation comprising:
calculating the gravitational vector based on an angular rate represented by the angular rate data;
performing a first correction for correcting the gravitational vector so as to approach at a first rate an acceleration vector represented by the acceleration data;
performing a second correction for correcting the gravitational vector so as to approach at a second rate a gravitational direction estimated based on a relationship between the acceleration data and the angular rate data, the relationship being predefined for the input device making a predetermined motion; and
performing a third correction for correcting the gravitational vector so as to approach at a third rate an average of acceleration vectors during a predetermined period.

35. The non-transitory computer-readable storage medium according to claim 34, wherein the first correction sets the first rate such that the higher the first rate is, the closer the magnitude of the acceleration represented by the acceleration data is to the magnitude of the gravitational acceleration.

36. The non-transitory computer-readable storage medium according to claim 34, wherein,
the operation further comprises calculating a motion acceleration vector based on the acceleration data and the gravitational vector, the motion acceleration vector representing an acceleration applied by a motion of the input device, and
the second correction includes correcting the gravitational vector so as to approach at the second rate a gravitational vector allowing the predefined relationship to be satisfied between the angular rate represented by the angular rate data and the motion acceleration vector.

37. The non-transitory computer-readable storage medium according to claim 34, wherein the third correction includes setting the third rate to a value lower than maximum values of the first and second rates.

38. The non-transitory computer-readable storage medium according to claim 34, wherein,
the first correction includes changing the first rate in accordance with at least one of the acceleration data and the angular rate data;
the second correction includes changing the second rate in accordance with at least one of the acceleration data and the angular rate data; and
the third correction includes setting the third rate as a fixed value.

39. The non-transitory computer-readable storage medium according to claim 34, wherein
the operation further comprises sequentially storing acquired acceleration data; and
the operation further comprises calculating a block average vector being an average of acceleration vectors represented by a block of acceleration data, the block comprising plural pieces of acceleration data, and
the third correction includes correcting the gravitational vector so as to approach at the third rate an overall average vector being an average of block average vectors for a predetermined number of blocks in reverse chronological order.

40. The non-transitory computer-readable storage medium according to claim 39, wherein,
the operation further comprises updating each of the block average vectors by rotating the block average vector in a direction opposite to the angular rate represented by the angular rate data, and
the third correction includes correcting the overall average vector based on the block average vectors updated by the updating.

41. A method of calculating an orientation of an input device based on operation data acquired from the input device, the input device including at least an angular rate sensor and an acceleration sensor, the operation data including angular rate data and acceleration data, the method comprising:
calculating, using computer processing system having at least one computer processor, based on the operation data a gravitational vector representing a gravitational direction viewed from the input device;
calculating a motion acceleration vector based on an acceleration represented by the acceleration data and the gravitational vector, wherein the motion acceleration vector represents an acceleration applied by a motion of the input device;
correcting the gravitational vector such that the motion acceleration vector approaches a motion acceleration satisfying a relationship with the angular rate represented by the angular rate data, the relationship being predefined between the motion acceleration and the angular rate for the input device making a predetermined motion; and calculating the orientation of the input device based on the corrected gravitational vector.

42. A method for sequentially calculating a gravitational vector representing a gravitational direction viewed from an input device based on angular rate data and acceleration data sequentially acquired from the input device, the input device including at least an angular rate sensor and an acceleration sensor, the method comprising:

calculating, using computer processing system having at least one computer processor, the gravitational vector based on an angular rate represented by the angular rate data;

performing a first correction for correcting the gravitational vector so as to approach at a first rate an acceleration vector represented by the acceleration data;

performing a second correction for correcting the gravitational vector so as to approach at a second rate a gravitational direction estimated based on a relationship between the acceleration data and the angular rate data, the relationship being predefined for the input device making a predetermined motion; and performing a third correction for correcting the gravitational vector so as to approach at a third rate an average of acceleration vectors during a predetermined period.

* * * * *